US005970170A

United States Patent [19]

Kadashevich et al.

[11] Patent Number: 5,970,170
[45] Date of Patent: *Oct. 19, 1999

[54] CHARACTER RECOGNITION SYSTEM INDENTIFICATION OF SCANNED AND REAL TIME HANDWRITTEN CHARACTERS

[75] Inventors: A. Julie Kadashevich, Tyngsboro; Mary F. Harvey, Woburn, both of Mass.; Kenneth C. Knowlton, Merrimack, N.H.; Alexander N. Jourjine, Winchester, Mass.

[73] Assignee: Kodak Limited, Hemel Hempstead, United Kingdom

[*] Notice: This patent is subject to a terminal disclaimer.

[21] Appl. No.: 08/484,630

[22] Filed: Jun. 7, 1995

[51] Int. Cl.$^6$ .............................. G06K 9/00; G06K 9/42; G06K 9/44; G06K 9/34

[52] U.S. Cl. ......................... 382/187; 382/258; 382/229; 382/179; 382/190

[58] Field of Search ..................................... 382/187, 203, 382/186, 173, 229, 176, 185, 188, 258, 202, 177, 179, 190

[56] References Cited

U.S. PATENT DOCUMENTS

| | | | |
|---|---|---|---|
| 4,654,873 | 3/1987 | Fujisawa et al. | 382/173 |
| 5,034,989 | 7/1991 | Loh | 382/187 |
| 5,164,996 | 11/1992 | Pastor | 382/203 |
| 5,454,046 | 9/1995 | Carman, II | 382/186 |
| 5,465,309 | 11/1995 | Johnson | 382/229 |
| 5,521,985 | 5/1996 | Camp, Jr. et al. | 382/176 |
| 5,550,931 | 8/1996 | Bellegarda et al. | 382/187 |

OTHER PUBLICATIONS

Pattern Recognition, vo. 26, No. 3, Mar. 1, 1993, pp. 409–418, G. Boccignone, et al.: "Recovering Dynamic Information From Static Handwriting".

IEEE Transactions On Computers, vo. C–4, No. 2, Feb. 1975, NY, pp. 182–194, R.W. Ehrigh, et al, "Experiments in the Contextual Recognition of Cursive Script".

IEEE Transactions On Systems, Man and Cybernetics, vol. 22, No. 4, Jul. 1, 1992, pp. 755–771, Lee Sukhan, et al, "Offline Tracing and Representation of Signatures".

CVGIP Graphical Models and Image Processing, vol. 56, No. 4, Jul. 1, 1994, pp. 324–335, Abuhaiba, et al: "Processing of Off–Line Handwritten Test: Polygonal Approximation and Enforcement of Temporal Information".

IEEE Transactions On Pattern Analysis and Machine Intelligence, Jan. 1989, USA, vol. 11, No. 1, pp. 68–83, Bozinovic, et al: "Off–line Cursive Script Word Recognition".

*Primary Examiner*—Leo Boudreau
*Assistant Examiner*—Bipin Shalwala
*Attorney, Agent, or Firm*—Nelson Adrian Blish; Gary D. Clapp, Esq.

[57] ABSTRACT

A handwritten character recognition system that includes a document scanner for generating scanned images of a previously created document containing handwritten characters, and a pen and digitizing tablet for real time entry of handwritten characters by a user. The handwritten character recognition system includes an image processor connected from the document scanner for receiving the scanned image of a previously created document and generating one or more ordered cluster arrays. The ordered cluster arrays contain spatially ordered coordinate arrays of skeletal image arcs representing and corresponding to the strokes of the handwritten characters wherein the spatial order represents an induced time ordered sequence of creation of the strokes of the handwritten characters that emulates the sequence of creation of the character strokes. A low level recognition processor is connected from the time order induction processor for receiving the ordered cluster arrays and generating a sequential character array wherein the sequential character array contains a character list for each ordered cluster array and wherein each character list contains at least one character identification representing a possible interpretation of the corresponding ordered cluster array. A linguistic post processor may be connected from the low level recognition processor for receiving the sequential character array and generating an output string representing the most probable interpretation of the handwritten characters of the document.

14 Claims, 23 Drawing Sheets

100 010 001 000 000 000 000 000

010 010 010 110 011 010 010 010

000 000 000 000 000 100 010 001

FIG. 9 abc       aaaaaaaa   bbbbbbbb   cccccccc def       dddddddd   xxxxxxxx   eeeeeeee ghi       ffffffff   gggggggg   hhhhhhhh

(1) modifyrule(&trimrule, LEAVE,1,         "eee"
                                           "eee"
                                           "eee"

(2) modifyrule(&trimrule, FLIP, 1+4+16+64, "---   BB-"
                                           "-B-   BB-"
                                           "eee   ---"

FIG. 18 for each pattern of the modify( ) rule command if there is a syntax error, return an error code for each of the specified orientations for each implied pattern (each combination of e's as 0 vs1) do one, depending on the directive:

LEAVE:      store '0'

FLIP:        store '1'

BLACKEN:{ if central pixel is black, store '0' else (central pixel white) store '1'}

WHITEN:{ if central pixel is black, store '1' else (central pixel white) store '0'} end end end

```
modifyrule(&smoothrule, LEAVE,1,"eee"              /*initialize*/
                                 "eee"             /*the table*/
                                 "eee");
modifyrule(&smoothrule, FLIP, 1+4+16+64,
    "__  BB-  eBe  -B",                            /*flip isolated and projecting*/
    "-B-  BB-  B-B  -B",                           /*foreground pixels, flip also the*/
    "eee  --   eee  BBB");                         /*almost surrounded background pixels*/.

The four directional stripping tables may be described in turn by the pseudocode:
stripprep(&lefstriprule, 1);                       /*the "standard" orientation8*/
stripprep(&topstriprule, 4);                       /*the +90 degree rotation of leftrule*/
stripprep(&ritstriprule, 16);                      /*the 180 degree rotation of leftrule*/
stripprep(&botstriprule,64);                       /*the -90 degree rotation of leftrule*/
and wherein the table construction routine, described by the following pseudocode, is
defined as if stipping were done from the left:
stripprep( tableptr, orientation)
RULETABLE *tableptr;
int        orientation;
{
    modifyrule(tableptr, LEAVE, 1,                 /*initialize the*/
        "e e e",                                   /*rule table*/
        "e e e",
        "e e e");
    modifyrule(tableptr, FLIP, orientation,
        "e e e",                                   /*extend background*/
        "- B e",                                   /*rightward*/
        "e e e");                                  /*into foreground*/
    modifyrule(tableptr, LEAVE, 1+4+16+64,
        "B-e  -B-  BB-  -BB",                      /*but leave essential*/
        "-Be  -B-  -B-  -B-",                      /*foreground to foreground*/
        "eee  eee  eee  eee");                     /*bridges, and tips*/
    return;
```

TOIP 32

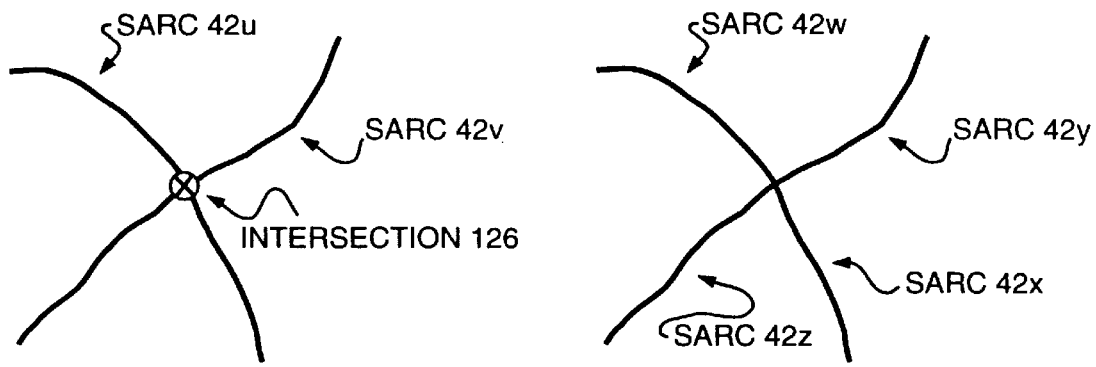
FIG. 28A
FIG. 28B
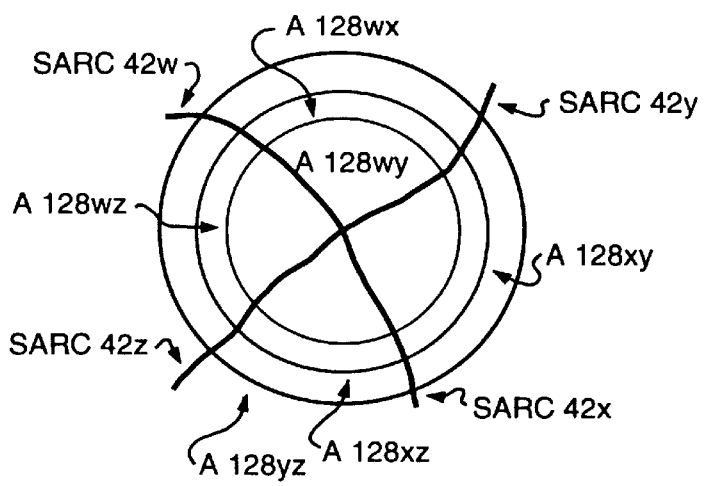
FIG. 28C
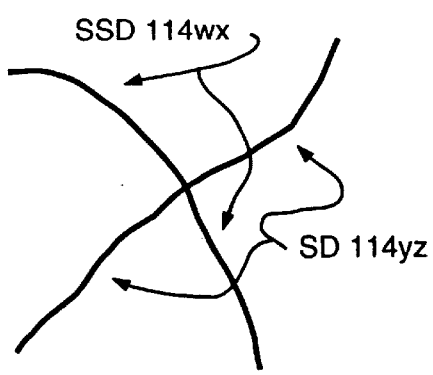
FIG. 28D

CHARACTER RECOGNITION SYSTEM INDENTIFICATION OF SCANNED AND REAL TIME HANDWRITTEN CHARACTERS

FIELD OF THE INVENTION

The present invention relates to a system for the recognition of handwritten characters and, in particular, to a system for recognition of handwritten characters contained in a scanned document, as well as real time user handwritten characters and to lexical and linguistic processing of recognized possible character combinations.

BACKGROUND OF THE INVENTION

Computer systems originally limited user input to a few standard devices capable of generating standardized and readily and clearly defined inputs, such as the keyboard and various pointing devices, such as a mouse or touchpad. More recently, however, there has been a general recognition of the need and usefulness of systems that accept less standardized user inputs, such as handwritten inputs through, for example, digitizing tablets and pens.

The common problem faced by all such systems is in developing handwritten character input processing methods and mechanisms that can rapidly and reliably recognize inputs that have no standardized characteristics. The size, spacing, orientation and even the shape of handwritten characters entered through a digitizing tablet and pen, for example, vary widely from user to user.

Various systems have been developed for handwritten character recognition, but most handwritten character recognition systems are limited in that they depend, to a great extent, upon the dynamic characteristics of the formation of characters as they are entered. That is, the order and orientation of the character strokes, and even they direction in which the strokes are formed, are all used to identify characters as they are entered.

There is still a significant problem, however, in recognizing handwritten characters when the dynamic characteristics of the characters creation is not available to be used in the recognition process. An example of such is the recognition of handwritten characters in previously created documents, such as documents that are scanned into a system as images after their creation.

Another problem is that that no handwritten character recognition system is completely capable of recognizing all handwritten character inputs with complete accuracy and reliability. Literally every handwritten character recognition system provides outputs that, for virtually every string of input handwritten characters, contains at least some ambiguous results, that is, characters or combinations of strokes, that cannot be recognized by the system. Some attempts have been made to solve this problem, for example, by use of spelling checkers, but these approaches have been generally unsuccessful.

The present invention provides solutions to these and other problems of the prior art.

SUMMARY OF THE INVENTION

The present invention is directed to a handwritten character recognition system that includes a document scanner for generating scanned images of a previously created document containing handwritten characters and, in certain implementations, a pen and digitizing tablet for real time entry of handwritten characters by a user.

The handwritten character recognition system of the present invention includes an image processor connected from the document scanner for receiving the scanned image of a previously created document and generating one or more ordered cluster arrays. The ordered cluster arrays contain spatially ordered coordinate arrays of skeletal image arcs representing and corresponding to the strokes of the handwritten characters wherein the spatial order represents an induced time ordered sequence of creation of the strokes of the handwritten characters that emulates the sequence of creation of the character strokes.

A low level recognition processor is connected from the time order induction processor for receiving the ordered cluster arrays and generating a sequential character array wherein the sequential character array contains a character list for each ordered cluster array and wherein each character list contains at least one character identification representing a possible interpretation of the corresponding ordered cluster array.

Finally, a linguistic post processor may be connected from the low level recognition processor for receiving the sequential character array and generating an output string representing the most probable interpretation of the handwritten characters of the document.

According to the present invention, the image processor may be implemented to include a segmentor for receiving a scanned image of a document and identifying one or more segments of each handwritten character stroke appearing in the scanned image. A thinning processor connected, in turn, from the segmentor and operates to reduce each segment to one or more skeletal images wherein each skeletal image represents one or more strokes of a handwritten characters in the scanned image and wherein each skeletal image includes one or more skeletal image arcs wherein each skeletal image arc is a single pixel wide image representing the corresponding one or more strokes of a handwritten character.

A time order induction processor is connected from the thinning processor and receives the skeletal image arcs and generates the ordered cluster arrays by ordering the skeletal image arcs into a spatial sequence representing an induced time ordered sequence of handwritten generation of the skeletal images. A transcriber is connected from the time order induction processor and reads the coordinates of points along the skeletal image arcs and generates the ordered cluster arrays that are the output of the image processor.

In a further implementation of the present invention, the time order induction processor operates to join selected ones of the skeletal image arcs by a ballistic motion emulation of handwritten character generation to generate skeletal image arcs comprised of two or more skeletal image arcs and thereby emulating the handwritten creation of strokes having certain characteristics that indicate that they were originally parts of a single stroke when created by hand.

According to the present invention, the low level recognition processor may be implemented to include a stroke feature recognizer for extracting stroke recognition features from the coordinate arrays representing the skeletal image arcs and assigning a meaning to each skeletal image arc of each ordered cluster array. The stroke feature recognizer is followed by a cluster recognizer connected from the stroke feature recognizer that is responsive to the meaning assigned to each skeletal image arc for recognizing and assigning at least one character identification to each ordered cluster array. A character array generator connected from the cluster recognizer then generates a sequential character array containing a character list for each ordered cluster array wherein each character list contains at least one possible character identification representing a possible interpretation of the corresponding ordered cluster array.

In further embodiments of the present invention, the low level recognition processor further may include a real time handwritten character processor connected from a digitizing tablet and pen that is used by a user to generate handwritten character inputs. The real time handwritten character processor is in turn connected to the stroke feature recognizer for providing stroke descriptor information representing real time handwritten characters to the stroke feature recognizer. The stroke feature recognizer and the following portions of the character recognition system then operate upon the real time handwritten character inputs in the same way as they operate upon the handwritten character information scanned from a previously created document.

In the embodiment of the present invention, the low level recognition processor may be implemented with a pen input detector for detecting and indicating user inputs through the tablet and pen, the user inputs including pen strokes and pen states, and an input buffer connected from the pen input detector for storing stroke descriptor information of a current stroke as the current stroke is entered by the user. The stroke feature recognizer is connected from the input buffer and is responsive to the pen states for extracting stroke recognition features from the stroke descriptor information of the current stroke and assigning a meaning to the current stroke. The cluster recognizer is connected in turn from the stroke feature recognizer and is responsive to the meaning assigned to each stroke for recognizing and assigning a character identification to each cluster of strokes.

Finally, the handwritten character recognition system of the present invention may include a linguistic post processor for performing linguistic and lexical processor of the character identifications provided from the low level recognition processor to determine the most probable interpretation of the character identifications based upon linguistic and lexical principles. According to the present invention, the linguistic post processor includes a linguistics analyzer for receiving the character lists, assembling the character lists into character strings, and performing a linguistic analysis on the character strings to determine the most probable correct combinations of characters in each character string. The linguistic processor is connected to a lexical processor that then performs a lexical analysis of each combination of characters to determine the most probable meaning of each character of each character string and generate an output string representing the most probable interpretation of the handwritten characters of the document.

According to the present invention, the linguistic processor receives a sequential character array wherein a sequential contains a character list for each cluster of strokes in a document and representing a handwritten character and wherein each character list contains at least one possible character identification representing a possible interpretation of the corresponding cluster of strokes. The linguistic processor includes a linguistic analyzer that assembles the character lists into character strings and performs a linguistic analysis on each character string to determine the most probable correct combinations of characters in each character string. A lexical analyzer may then be invoked to perform a lexical analysis of each combination of characters in each character string to determine the most probable meaning of each character of each character string, and the linguistic processor then generates an output string representing the most probable interpretation of the handwritten characters of the document.

Further according to the present invention, the linguistic analyzer reads the character lists to select a character string of character lists having a predetermined initial length, performs a first linguistic analysis upon a pair of character lists occurring at the beginning of the initial character string and a pair of character lists occurring at the ending of the initial character string, and selects the beginning or ending pair of character lists having a high probability of correct identification of the corresponding handwritten characters. The linguistic analyzer then performs a second linguistic analysis upon subsequent pairs of character lists of the initial character string, each subsequent pair of character lists being selected starting with one character of the selected beginning or ending pair of character lists and preceding along the character string away in steps of one character list.

Other features, objects and advantages of the present invention will be understood by those of ordinary skill in the art after reading the following descriptions of a present implementation of the present invention, and after examining the drawings, wherein:

BRIEF DESCRIPTION OF THE DRAWINGS

FIG. 9 is an illustration of pixel configurations in the thinning process;

FIG. 10 is an illustration of a pixel index array;

FIG. 11 is an illustration of a pixel array used in the thinning process;

FIG. 12 is an illustration of a pixel index array used in the thinning process;

FIG. 13 is an illustration of a pixel array for accelerated processing;

FIG. 14 is an illustration of a pixel array defining a thinning rule;

FIG. 15 is an illustration of rotation and reflection codes;

FIGS. 16 and 17 are illustrations of extended pixel arrays;

FIG. 18 is an illustration of program commands for generating thinning rule tables;

FIG. 19 represents exemplary code illustrating nested reiterations of thinning steps;

FIG. 20 is an illustration of an index array;

FIG. 21 is an illustration of a 2×2 pixel array;

FIG. 22 is an illustration of a pixel pattern of a thinning rule;

FIGS. 23 and 24 are illustrations of pixel patterns illustrating thinning rules;

FIG. 25 is a pseudocode listing illustrating the thinning process;

FIGS. 28A, 28B, 28C and 28D are diagrammatic representations of stranding;

DESCRIPTION OF THE INVENTION

A. General Description (FIGS. 1 and 2)

Figure 1:
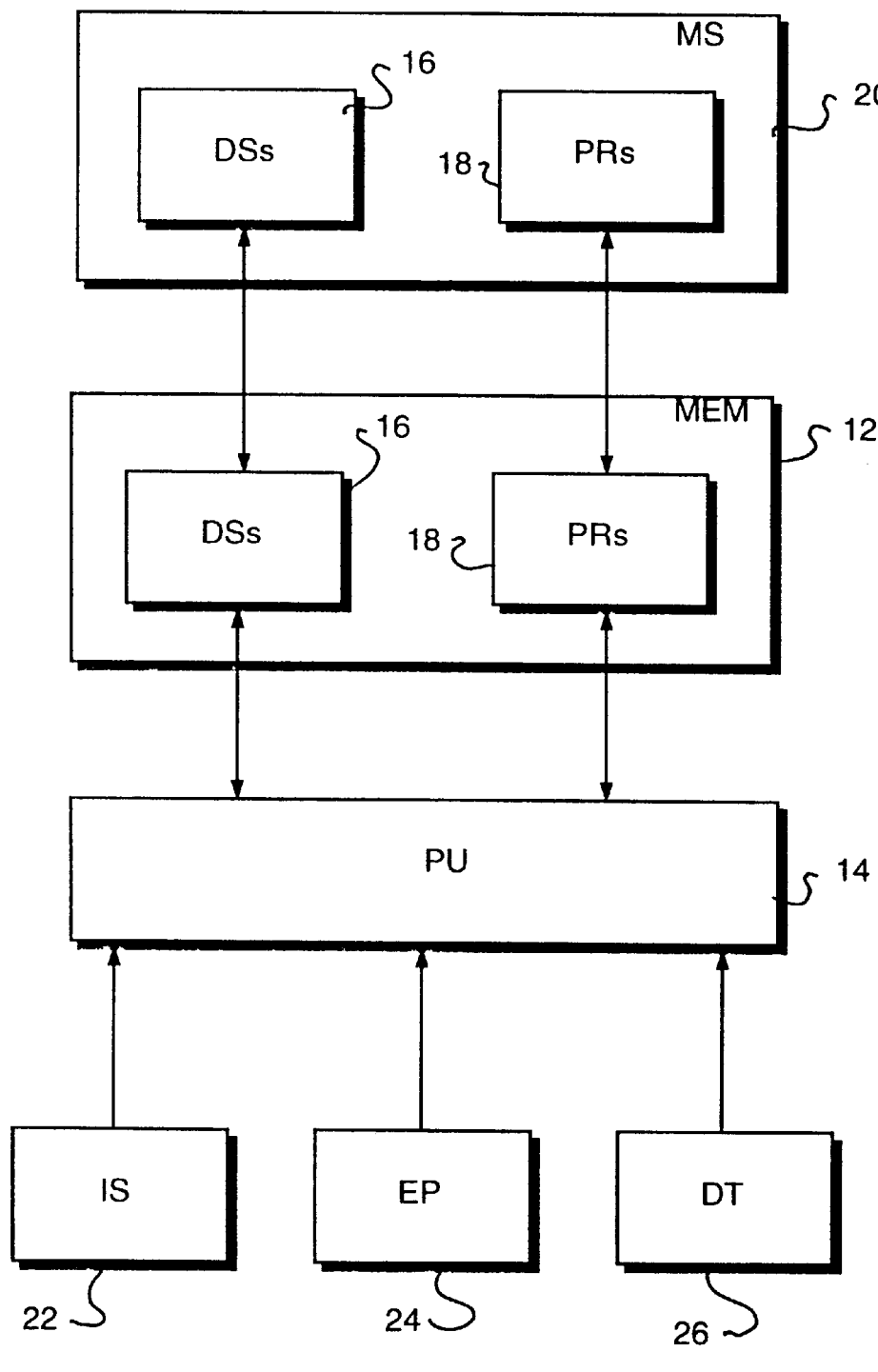
FIG. 1 is a block diagram of a system in which the present invention is implemented.

Referring to FIG. 1, therein is illustrated a block diagram of a System 10 comprised of a Memory (EM) 12 and a Processing Unit (PU) 14 for respectively storing and operating upon Data Structures (DSs) 16 under control of a plurality of Processing Routines (PRs) 18 executing on PU 14 and including a Mass Storage (MS) 20 for storing and providing DSs 16 and PRs 18 to be operated upon by PU 14 in MEM 12. As shown, System 10 further comprises an Image Scanner (IS) 22 for providing a first input comprising scanned images of characters and a second, real time input comprising images of characters as represented by the sampled positions of an Electronic Pen (EP) 24 over a Digitizing Tablet (DT) 26.

DSs 16 and PRs 18 executing on System 10 comprise a Character Recognition System (CRS) 28 for recognition of both the scanned images of characters, for example, from a document scanned by IS 12, and the real time recognition of characters provided as an input of EP 24 and DT 26. Each of PRs 18 control the operation of PU 14 to perform a specific character recognition operation, each PR 18 thereby transforming PU 14 into corresponding, dedicated purpose processor for performing a corresponding character recognition operation, while DSs 16 comprise the data structures constructed by PRs 18 and PU 14 in performing the character recognition operations.

Figure 2:
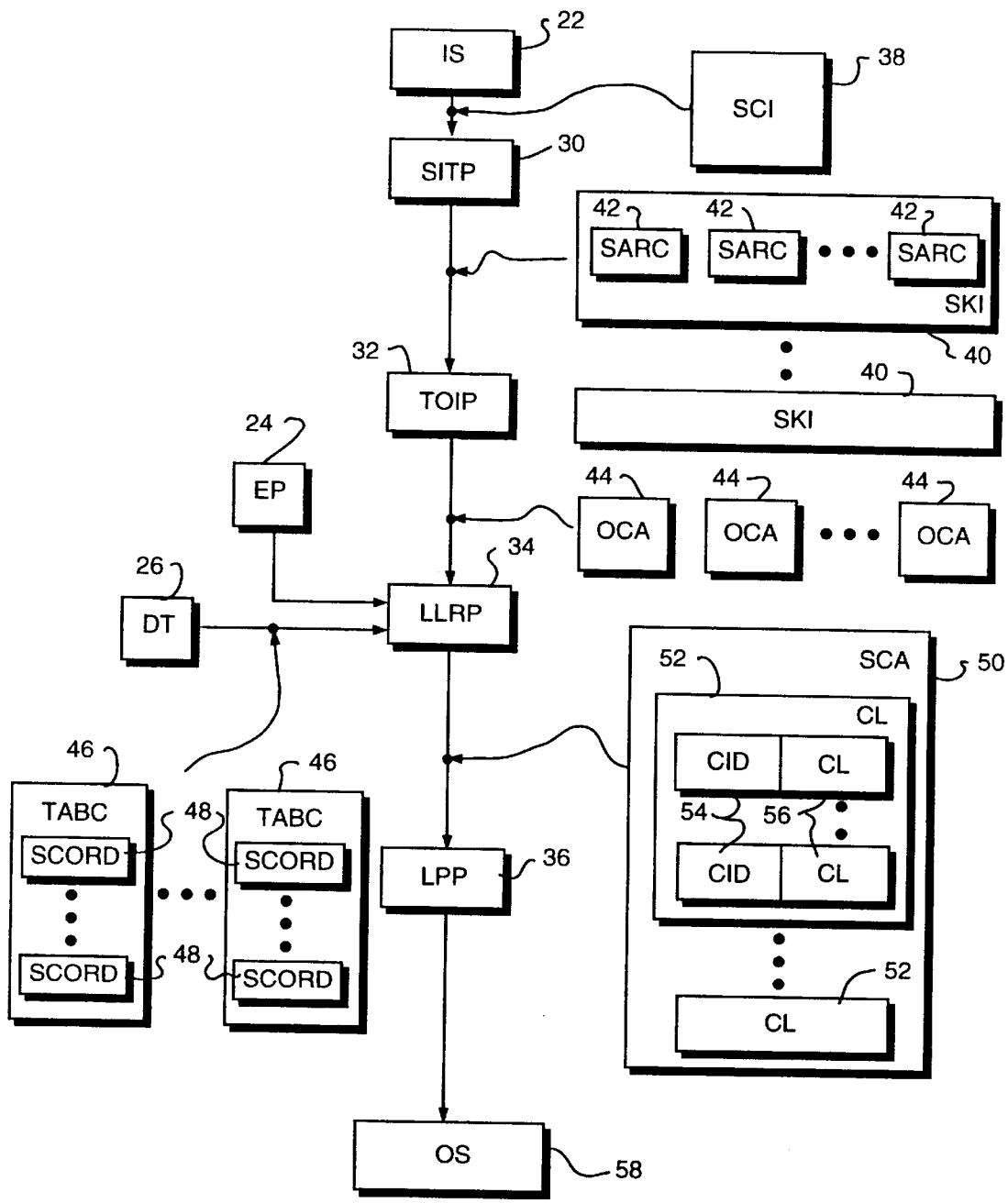
FIG. 2 is a diagrammatic representation of the character recognition system of the present invention.

As represented in FIG. 2, CRS 28 is comprised of four major functional elements, respectively identified as Scanned Image Thinning Processor (SITP) 30, Time Order Induction Processor (TOIP) 32, Low Level Recognition Processor (LLRP) 34 and Linguistic Post Processor (LPP) 36. It will be noted that in the present implementation of the present invention, each of SITP 30, TOIP 32, LLRP 34 and LPP 36 are implemented as a process, or group of routines, executing on PU 14 and operating upon the following described DSs 16 residing in MEM 12.

SITP 30 is connected from IS 22 to receive scanned images of characters, identified as Scanned Character Images (SCIs) 38, wherein each Scanned Character Image (SCI) 38 represents a document, a page of a document or a portion of a page, and functions in a reiterative manner to reduce the Scanned Character Images (SCIs) 38 to one or more equivalent Skeletal Images (SKIs) 40. Each Skeletal Image (SKI) 40 represents a handwritten stroke or group of handwritten strokes appearing in an Scanned Character Image (SCI)) 38, such as a symbol or character, and is comprised of one or more Skeletal Image Arcs (SARCs) 42. Each Skeletal Image Arc (SARC) 42 is comprised of a one pixel wide image representing a stroke, that is, a line of a character, such that the topological and geometric semblance between the handwritten strokes appearing in an Scanned Character Image (SCI) 38 and the Skeletal Image Arc (SARC) 42 of the Skeletal Images (SKIs) 40 corresponding to the Scanned Character Image (SCI) 38 is preserved.

TOIP 32 receives the Skeletal Image Arcs (SARCs) 42 of the Skeletal Images (SKIs) 40, orders the Skeletal Image Arcs (SARCs) 42 into clusters in a spatial sequence simulating the time ordered generation of handwritten strokes, and joins the ends of selected ones of the Skeletal Image Arcs (SARCs) 42 in such a manner as to emulate a real time handwritten character input, such as may be provided from EP 24 and DT 26. The joining of Skeletal Image Arcs (SARCs) 42 is performed by a ballistic motion approximation which induces the minimum change in the angle between each pair of joined arcs, that is, each pair of joined Skeletal Image Arcs (SARCs) 42, to emulate the natural hand motion occurring in the creation of handwritten characters. TOIP 32 then generates Ordered Cluster Arrays (OCAs) 44 corresponding to one or more Scanned Character Images (SCIs) 38 wherein each Ordered Cluster array (OCA) 44 is an ordered array of coordinates defining and corresponding to points along the Skeletal Image Arcs (SARCs) 42 in such a manner as to simulate and correspond to the sampled coordinates that would be received from a digitizing tablet for an equivalent handwritten character image.

LLRP 34 is connected from EP 24 and DT 26 to receive Tablet Characters (TABCs) 46 from DT 26 and EP 24, wherein each Tablet Character (TABC) 46 is comprised of a set of Sampled Coordinates (SCORDs) 48 defining and corresponding to points along the lines forming the Tablet Characters (TABCs) 46. LLRP 34 is further connected from TOIP 32 to receive the Ordered Cluster Arrays (OCAs) 44 wherein, as described, each Ordered Cluster Array (OCA) 44 is an ordered array of coordinates defining and corresponding to points along the Skeletal Image Arc (SARC)s 42 representing the Scanned Character Images (SCIs) 38 in a manner simulating the sampled coordinates received from EP 24 and DT 26. The Tablet Character (TABC) 46 and Ordered Cluster Array (OCA) 44 inputs to LLRP 34 are thereby equivalent, both being comprised of sets or arrays of coordinates defining the lines forming input characters.

LLRP 34 then generates a Sequential Character Array (SCA) 50 which includes a Character List (CL) 52 for each character representation from either input, that is, from IS 22 or from EP 24 and DT 26, wherein each Character List (CL) 52 contains one or more Character Identifications (CIDs) 54, each of which represents a character that is a possible interpretation of the corresponding input character as represented by a Tablet Character (TABC) 46 or an Ordered Cluster Array (OCA) 44. Each Cluster Identification (CID) 54 is accompanied by a Confidence Level (CL) 56, which is a measure of the likelihood, or probability, that the corresponding Cluster Identification (CI) 54 represents a true interpretation of the corresponding handwritten character.

Finally, LPP 36 receives each Character List (CL) 50 from LLRP 34, assembles the Character Lists (CL)s 50 into character strings of two or more characters, and performs linguistic and lexical processing operations upon the character strings to determine the most probable correct interpretation of the handwritten input characters as elements or components of words. LPP 36 then generates a corresponding Output String (OS) 58 representing the most probable interpretation of the handwritten input characters as words, characters or symbols.

B. Description of Scanned Image Thinning Processor (SITP) 30

1. General Description

Hand written alphanumeric text, whether scanned or created in "real time", may be regarded as characterized by connected or otherwise spatially related groups of strokes or lines. That is, messages or text is comprised of words and groups of characters or numbers, words and numbers are comprised of characters, and characters are comprised of topologies and geometry's of connected pieces, that is, strokes or lines, which are created in directions and orders, or sequences, that are constrained according to the rules of construction of the characters.

Documents containing handwritten information provide the general topologies and geometry's of the strokes comprising the characters, but lack two properties that are helpful in automatic recognition of the characters. The first is geometric precision, that is, the strokes comprising the characters will vary in geometry and width from the fact of being hand formed and because various implements will be used in forming the strokes. The second lack is the time order of creation of the strokes comprising the characters when the characters are scanned from a previously created document as, in this instance, only the final result of the character creation process is available. SITP 30 of the present invention addresses the first lack by providing a method and apparatus for idealizing hand written characters by reducing the character strokes to one pixel wide images as if the characters had been drawn with a one pixel wide pen, thereby providing a degree of geometric precision and allowing the characters to be described as probability related groups of strokes in terms of their locations and geometry's and the topology of the interconnections of the strokes. Other mechanisms of the character recognition system of the present invention then infer the time order of creation and directions of the strokes and use other character recognition methods to further analyze this reconstructed data.

SITP 30 accordingly performs three operations upon input characters and it should be noted that, although SITP 30 is implemented in CRS 28 specifically for the analysis of scanned characters, the operations of SITP 30 may also applied to "real time" characters, that is, as characters are entered with a pen and tablet. These operations are the initial segmentation of a character or characters into connected objects comprised of strokes, the thinning of character strokes to skeletal form at various image resolutions, and the transcribing of the skeletalized strokes as topological and geometric entities.

a. Segmentation

First considering the initial segmentation of a character or characters or parts of a character into connected objects comprised of strokes, that is, lines or arcs, a stroke is defined herein as comprised of foreground, or "black" pixels, as opposed to background, or "white" pixels. A connected object is comprised of one or more strokes and is further defined herein as a collection of foreground, or "black", pixels each of which can be reached from another foreground pixel through a path of successive steps across adjacent foreground pixels wherein each step may be in any one of eight directions, that is, to any one of the eight pixels adjoining a given central pixel in a square three by three array. A connected object may comprise a complete character, or a part of a character, or a combination to two or more characters or parts of a character and it can be expected, given data from scanners or pens and tablets of sufficient quality, that a connected object will frequently have come from a single pen-down to pen-up stroke or a combination of touching or intersecting stokes.

Segmentation of the data from a scanned page into connected objects thus represents a first approximation at dividing a page of data into manageable and possibly meaningful parts or components by identifying those portions of the page comprised of connected objects comprised of foreground data. The initial segmentation of Scanned Character Image (SCI) 38 data into connected objects further allows the objects thus created to be analyzed at various resolutions, that is, in various representations, thus providing groups of alternate data sets for subsequent analysis, each of which has been derived from the same data subset, that is, connected object.

Segmentation is accomplished by a process which takes as its input a Scanned Character Image (SCI) 38 and lists, for each connected object found therein, the spans of contiguous foreground pixels comprising the connected objects wherein a connected object is defined herein as a group of set of intersecting or connected lines of pixels. The segmentation process recognizes the joining and separation of collections or groups of foreground pixels into objects, determines when the page has been completely scanned, and writes the resulting data into an output file for subsequent processing. This step thereby generates data representing the connected objects appearing on the page, and in a useable spatial order. This step also provides a significant data compression for many text pages, which usually contain a large proportion of background space.

As described, Scanned Character Image (SCI) 38 may comprise a scanned image of a page or a portion of a page and segmentation may be performed upon an entire Scanned Character Image (SCI) 38 or upon a portion of the image data in a Scanned Character Image (SCI) 38. Segmentation may therefore be effectively accomplished in the manner most effective for the scanning and segmentation processes themselves and for the subsequent processes described below, such as a single "pass" across a page, for example, from top to bottom, or in several passes across a page, but accumulates data for all objects currently to be processed.

Finally, a Scanned Character Image (SCI) 38 is preferably a high resolution representation of the image, for example, at 302 dots per inch (dpi), to facilitate the generation and processing of representations of the Scanned Character Image (SCI) 38 at various resolutions as described below.

Figure 3:
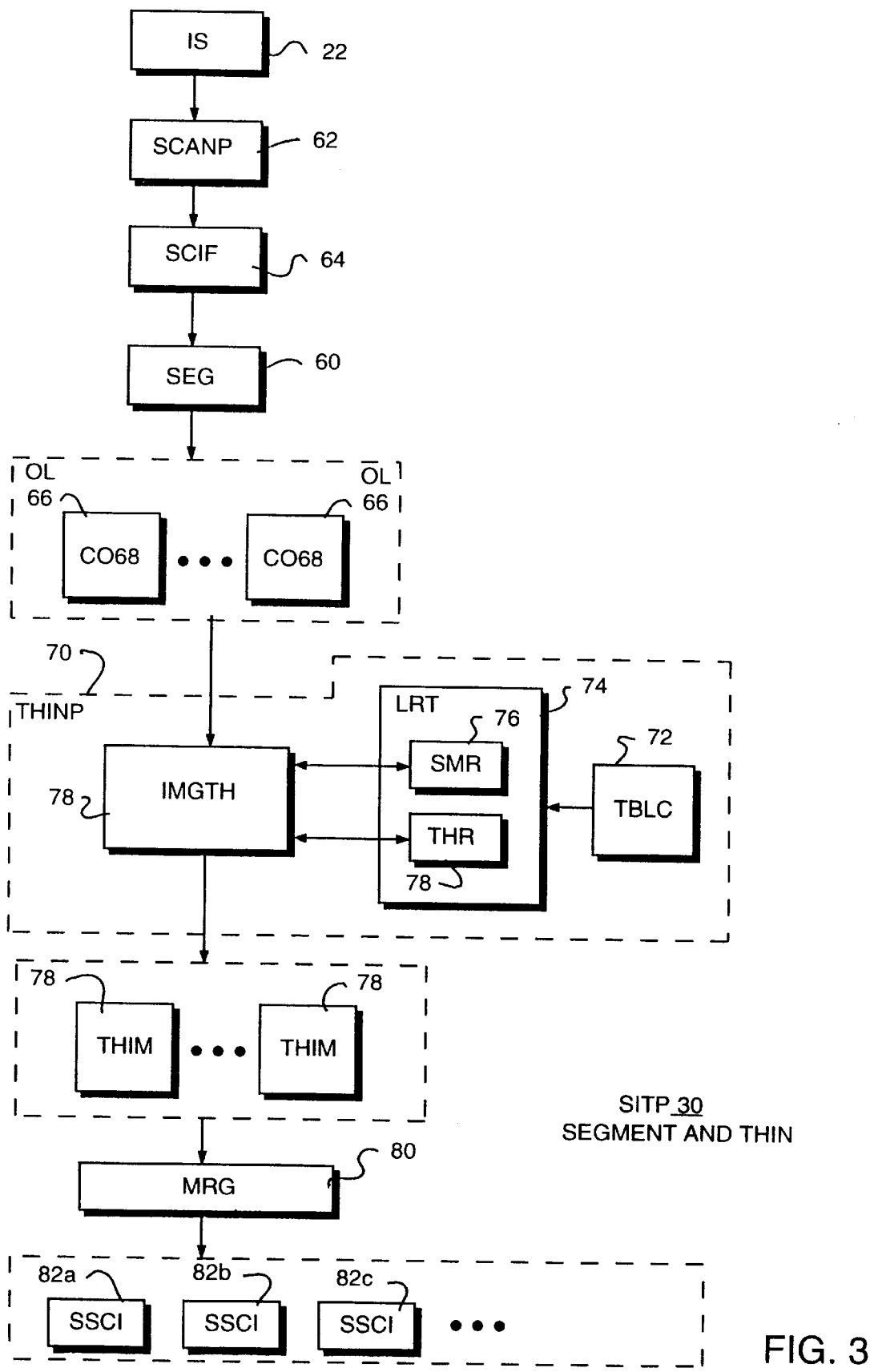
FIG. 3 is a diagrammatic representation of the segmentation process.

The segmentation process is illustrated in FIG. 3, wherein Segmentor (SEG) 60 receives a current Scanned Character Image (SCI) 38 from Scanning Processor (SCANP) 62 as an Scanned Character Image (SCI) File (SCIF) 64 wherein each Scanned Character Image File (SCIF) 64 is a data structure storing information identifying the foreground and background pixels of the scanned image. A Scanned Character Image File (SCIF) 64 data structure can assume one of several different forms, depending upon which form is most efficient for processing by Segmentor (SEG) 60. For example, an Scanned Character Image File (SCIF) 64 may be a bitmap array wherein each bit in the array represents a pixel of the Scanned Character Image (SCI) 38 image, with the state of bit (0 or 1) representing whether the corresponding pixel is a background or foreground pixel and the location of the bit in the array representing the coordinates of the corresponding pixel in the image.

Segmentor (SEG) 60 then scans the current Scanned Character Image File (SCIF) 64 to identify foreground pixels and, as described below in descriptions of the smoothing and thinning processes, associated background pixels, defining the context of each foreground pixel. Segmentor (SEG) 60 also identifies, for each foreground pixel, all associated contiguous foreground pixels and generates, for each Scanned Character Image (SCI) 38, a set of Object Lists (OL) 66 wherein each Object List (OL) 66 corresponds a Connected Object (CO) 68 wherein a Connected Object (CO) is defined as a group of contiguous foreground pixels, that is, as a stroke or connected group of strokes of the image represented by the Scanned Character Image (SCI) 38.

Again, Object Lists (OLs) 66 may assume one of several possible forms, depending upon the form most efficient for the implementation of the thinning process described below. For example, an Object List (OL) 66 may be comprised of a bitmap of a group of contiguous foreground pixels and the associated background pixels forming the local context of the foreground pixels and a set of coordinates identifying the location of the bitmap in the Scanned Character Image (SCI) 38. In another implementation an Object List (OL) 66 may be comprised of a list of the coordinates of the foreground pixels and contextual background pixels of the connect object, together with the states of the pixels as foreground or background pixels.

Segmentor (SEG) 60 then provides the Object Lists (OLs) 66 representing the strokes appearing in a Scanned Character Image (SCI) 38 to a Thinning Processor 70.

b. Thinning

Character strokes, whether scanned from an image or entered individually in real time through a tablet and pen, are often many pixels in width and the width of the strokes may vary significantly, both within a stroke and between strokes. The data representing the character strokes, however, are more readily processed for character recognition when the strokes have been transformed into a uniform format, or width, such as single pixel wide lines, as provided by the thinning operation of SITP 30.

The thinning operation fundamentally performs the thinning operation by "stripping away" the "outside edges", that is, the outside pixels, of a stroke, without destroying the stroke as a connected object to reduce each stroke to a line of connected, that is, adjacently located, single pixels. The thinning operation, however, should be fast because the process is inherently reiterative and must be applied to thousands of pixels and their neighborhoods and should be readily modifiable, for example, to accommodate different conditions, such as the use of recognition processes which use multiple pixel wide strokes.

The thinning operation of the present invention is thereby implemented in a cellular processing method which assumes a 3×3 data kernel, that is, the operation performed in each iteration operates upon kernels of 3×3 square arrays of pixels comprised of a central pixel and its 8 adjacent pixels. The operation as implemented is also table driven, that is, uses a look-up table to determine the thinning result for each 3×3 array of pixels, and operates upon 4 pixels and their neighborhood at a time, although this may vary from implementation to implementation. The operation as implemented is further defined and redefined by a setup process, or routine, which accepts new or modified image alteration rules to adapt to different conditions or requirements.

The thinning operation is implemented in a Thinning Processor 70, which in turn is comprised of two subprocessors implemented through PRs 18 executing on PU 14. The first is identified in FIG. 3 as Table Constructor (TBLC) 72 and controls the run-time construction of a Look-up Rule Table (LRT) 74 which embodies and defines a set of rules for smoothing and thinning of strokes, identified respectively in FIG. 3 as Smoothing Rule (SMR) 76 and Thinning Rule (THR) 78. The second, identified in FIG. 3 as Image Thinner (IMGTH) 78, reads the rules from Look-up Rule Table (LRT) 74 and performs these operations upon each Object List (OL) 66 in turn, that is, upon each Connected Object (CO) 68 of the Scanned Character Image (SCI) 38 in turn, and generates, for each connected object, a corresponding Thinned Image (THIM) 78 containing a skeletized representation of the corresponding connected objects defined defining the smoothing and thinning operations defined performs the rule defined in the table throughout a specified area of pixels, for example, upon the foreground and background pixels defining a connected object, to generate a skeletized representation of the connected object.

The fundamental operation for the thinning processing may be stated, in summary, as smoothing the edges of a connected object and then reiteratively removing one layer of pixels from each of the left, bottom, right and top sides of the connected object, so long as the removal of a pixel does not destroy the connectivity of the object, until a complete cycle has been performed without any further changes in the object. The result of the thinning operation will then be a maximally connected object wherein the only remaining foreground pixels having more than two neighboring, or adjacent, foreground pixels will be those pixels located at the junctures of otherwise one pixel wide paths or lines.

The present implementation of Smoothing Rule (SMR) 76 and Thinning Rule (THR) 78 are described in further detail in a following detailed description of SITP 30.

Lastly, it must be noted that a thinning operation may result in loss of information that is useful in recognition of characters or the retention of more information than is necessary and that the amount of information retained for each stroke after the thinning process is dependent, in part, upon the resolution in which the stroke is represented, such as 75 dpi, 150 dpi or 302 dpi. That is, an external protrusion or an internal void of a stroke may be accidental or meaningful, but the value of such information will not be known until a later point in the recognition process. In the reverse, the retention of too much information will slow the recognition process because of the need to process addition but unneeded information.

As such, SITP 30 as presently implemented generates and performs the thinning operation upon a high resolution representation of each input Connected Object (CO) 68, such as at 302 dpi, and then generates two additional representations at lower resolutions, such as 75 dpi and 150 dpi from the result of each thinning operation on a Connected Object. As indicated, this operation is performed by a Multiple Resolution Generator (MRG) 80 which, as commonly understood in the art, effectively deletes every other pixel from the 302 dpi representations to generate corresponding 150 dpi representations and three of every four pixels from the 302 dpi representations to generate corresponding 75 dpi representations. Multiple Representation Generator (MRG) 80 may also generate skeletized representations of the connected objects at other resolutions, as is also well understood in the art.

As shown, the multiple skeletized representations of each Scanned Character Image (SCI)) 38 generated by Multiple Representation Generator (MRG), at the various resolutions are stored in corresponding Skeletized Scanned Character Images (SSCIs) 82, identified respectively as SSCIs 82a, 82b and 82c for a given Scanned Character Image (SCI) 38 for subsequent operations by a Transcriber Processor 84.

c. Transcribing

Figure 4:
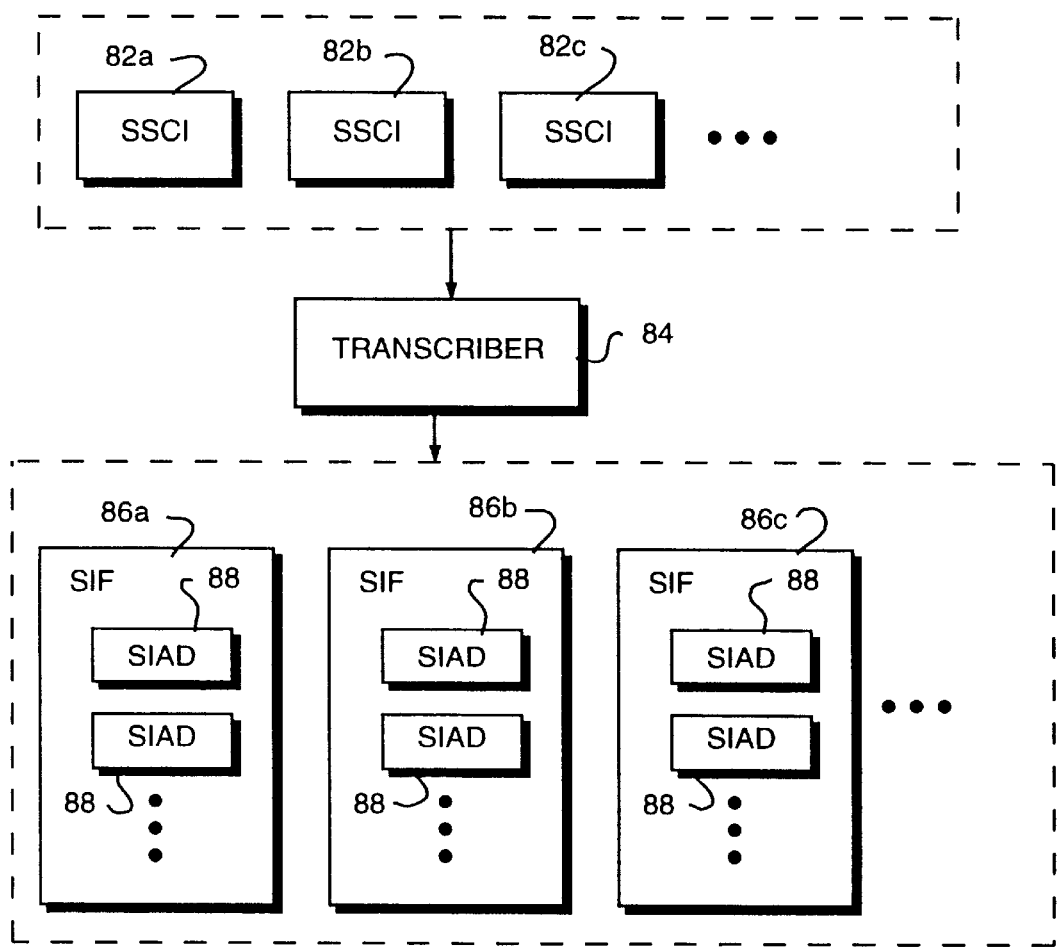
FIG. 4 is an illustration of skeletized representations of character strokes.

As shown in FIG. 4, the skeletized representations of the strokes comprising the original Scanned Character Image (SCI) 38 input images are read from Skeletized Scanned Character Images (SSCIs)s 82 and transcribed into corresponding data structures referred to as Skeletal Image Files (SIFs) 86, correspondingly identified as SIFs 86a, 86b and 86c, by a Transcriber Processor (Transcriber) 84 implemented through corresponding PRs 18 executing on PU 14.

In this process, Transcriber Processor (Transcriber) 84 will, for each Skeletized Scanned Character Image (SSCI) 82, read the coordinates of the pixels comprising the lines of the skeletized image residing in an Skeletized Scanned Character Image (SSCI) 82, will identify the Skeletal Image Arcs (SARC)s 42 of the skeletized image, will construct a Skeletal Image Arc Descriptor (SIAD) 88 for each Skeletal Image Arc (SARC) 42 in the skeletized image in the and will store the Skeletal Image Arc Descriptors (SIADs) 88 in a Skeletized Image File (SIF) 86 corresponding to the Skeletized Scanned Character Image (SSCI) 82.

Figure 5:
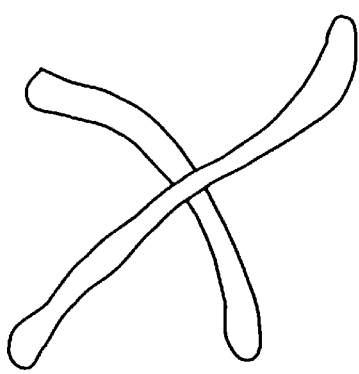
FIGS. 5 and 6 are illustrations of the segmentation, thinning and transcription processes.
Figure 6:
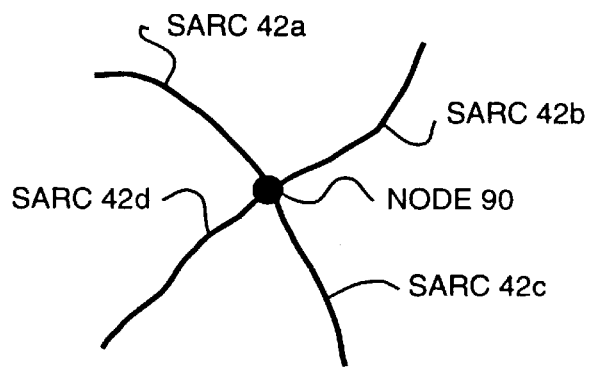

The operations of Segmentor (SEG) 60, Thinning Processor (THINP) 70 and Transcriber Processor (Transcriber) 84 are illustrated in FIGS. 5 and 6, wherein FIG. 5 represents an original scanned image of two crossed lines forming an X. FIG. 6 in turn illustrates the results of the segmentation and thinning operations whereby the original image has been segmented from other images as comprising a single Connected Object (CO) 68 and the strokes of the object have been thinned, or skeletized, to lines having a width of one pixel.

In the example shown in FIGS. 5 and 6, Transcriber Processor (Transcriber) 84 will identify this Connected Object (CO) 68 as comprised of four Skeletal Image Arcs (SARCs) 42, identified respectively in FIG. 6 as Skeletal Image Arcs (SARCs) 42a, 42b, 42c and 42d, which meet at a Node 90. As identified by the transcription operation, each of Skeletal Image Arc (SARC)s 42a through 42d is comprised of a contiguous path of pixels that begins or ends either at a junction or meeting, referred to as a Node 90, with another contiguous path of pixels comprising another Skeletal Image Arc (SARC) 42, as determined by the occurrence of a pixel that is shared by two or more Skeletal Image Arc (SARC)s 42, or in "space", that is, at a point where there are no further pixels along the contiguous path of pixels. A Skeletal Image Arc (SARC) 42 may also be regarded as having an end, and a next Skeletal Image Arc (SARC) 42 as having a beginning, at a point where a path of pixels contains a significant change in direction, whereupon the path of pixels is separated into two Skeletal Image Arc (SARC)s 42 meeting at the pixel where the change in direction occurs.

Figure 7:
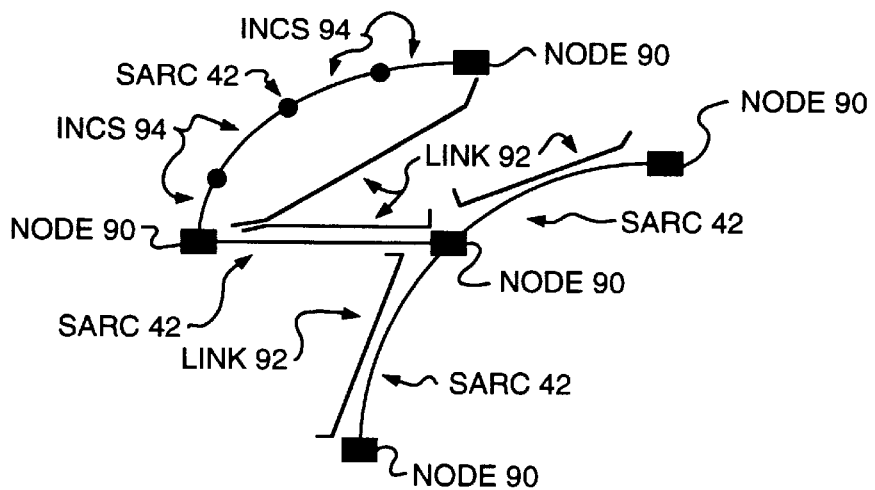
FIGS. 7 and 8 are illustrations of skeletal image arcs and skeletal image arc descriptors.
Figure 8:
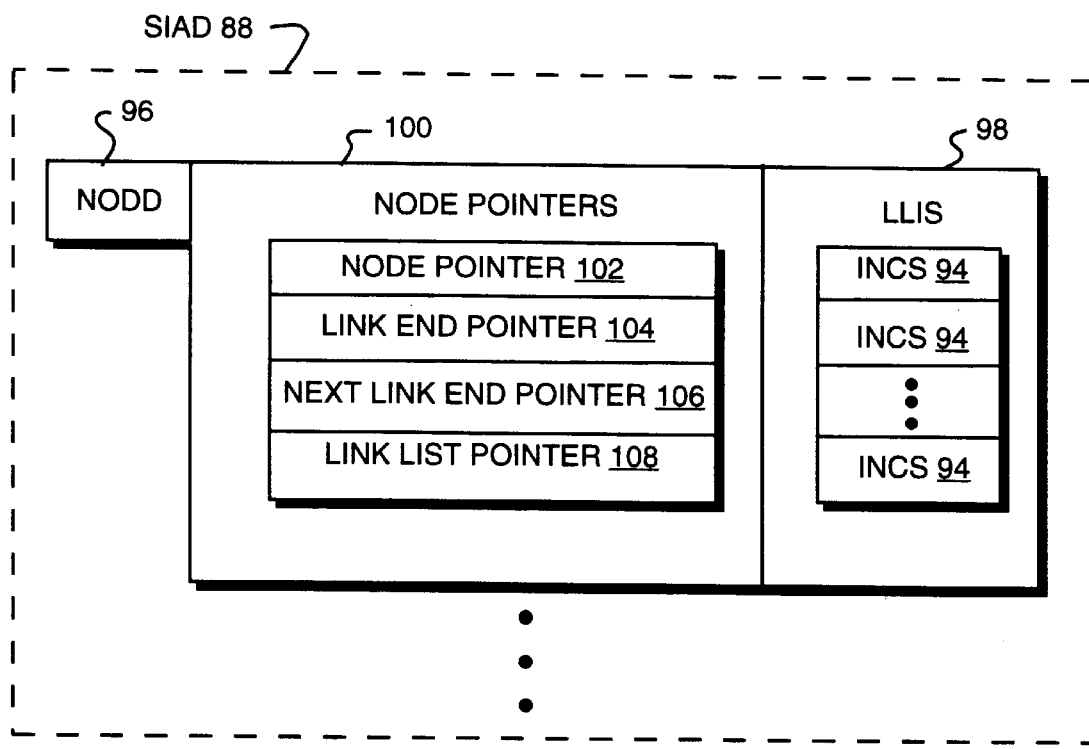

As was illustrated in FIG. 4, each Skeletized Image File (SIF) 86 includes a Skeletal Image Arc Descriptor (SIAD) 88 for and corresponding to each Skeletal Image Arc (SARC) 42 of each Connected Object (CO) 68 found in the Skeletized Scanned Character Image (SSCI) 82. As illustrated in FIGS. 7 and 8, each Skeletal Image Arc (SARC) 42 is comprised of Nodes 90, Links 92 and Incremental Steps (INCSs) 94 along Links 92 and each Skeletal Image Arc Descriptor (SIAD) 88 correspondingly includes Node Descriptors (NODDs) 96 and Link Lists of Incremental Steps (LLISs) 98 for and corresponding to each Skeletal Image Arc (SARC) 42 represented therein.

A Node 90 is a location along a Skeletal Image Arc (SARC) 42 of a Connected Object (CO) 68 and occurs, in particular, at an end of a Skeletal Image Arc (SARC) 42 where, for example, a line of a Connected Object (CO) 68 terminates or where a line connects or intersects with another line of the Connected Object, or at the point that a line of a Connected Object (CO) 68 changes direction, thereby defining the start another Skeletal Image Arc (SARC) 42. The Skeletal Image Arc Descriptor (SIAD) 88 corresponding to a given Node 90 thereby contains a Node Descriptor (NODD) 96 for each Node 90 of the corresponding Skeletal Image Arc (SARC) 42 and each Node Descriptor (NODD) % contains the coordinates of the corresponding Node 90.

A Link 92 is comprised of a path of contiguous pixels defining a Skeletal Image Arc (SARC) 42, that is, a line or stroke of a Connected Object (CO) 68, between two Nodes 90 of the Connected Object (CO) 68 and is described by a Link List of Incremental Steps (LLIS) 98 describing the Incremental Steps (INCSs) 94 along the path or line of the Link 92 wherein each Incremental Step (INCS) 94 describes the direction and location of a next contiguous pixel along the path and wherein a Link List of Incremental Steps (LLIS) 98 be read in either direction along the path to locate successive pixels of the path.

In the present implementation, each Incremental Step (INCS) 94 is of a single pixel, that is, a Link List of Incremental Steps (LLIS) 98 describes the locations and directions of successive single pixels along the path of the Link 92 and each Incremental Step (INCS) 94 is therefore required to describe only the directions to the next pixels in either direction along the path of the Link 92. In alternate embodiment, each Incremental Step (INCS) 94 may cover spans of two or more pixels at a time and will thus describe the locations of successive groups of two or more pixels; in this instance, each Incremental Step (INCS) 94 will describe the directions and distances to the next groups of two or more pixels in either direction along the path of the Link 92. Lastly, in yet another alternate implementation, each Incremental Step (INCS) 94 may contain the coordinates of a corresponding pixel of the Link 92 path and the coordinates of the next pixels or groups of pixels in either direction along the Link 92 path.

A Node Descriptor 96 and its associated Link List of Incremental Steps (LLIS) 98 of a Skeletal Image Arc Descriptor (SIAD) 88 thereby describe a Skeletal Image Arc (SARC) 42 of a Connected Object (CO) 68 represented therein. An Skeletized Image File (SIF) 86 will thereby contain a complete description, in terms of Nodes 90 and Incremental Steps (INCSs) 94, of each stroke of the skeletal representation each Connected Object (CO) 68 represented therein, that is, of each stroke and group of connected strokes originally present in the original Scanned Character Image (SCI) 38.

In the instance of a Connected Object (CO) 68 comprised of two or more connected or contiguous strokes, the Skeletal Image Arcs (SARCs) 42 of the Connected Object (CO) 68 are further connected by link pointers into a cyclically connected ring of the Nodes 90 of the Skeletal Image Arc (SARC)s 42 of the Connected Object (CO) 68. The Skeletal Image Arc Descriptor (SIAD) 88 of each such Connected Object (CO) 68 will thereby further include Node Pointers 100, which include a Node Pointer 102 to the Node Descriptor (NODD) 96 of another Node 90 of the cyclically connected ring of Nodes 90 of the Connected Object (CO) 68, usually the closest other Node 90 of the Connected Object (CO) 68, a Link End Pointer 104 to an end of the Link List of Incremental Steps (LLIS) 98 associated with that other Node 90, wherein the Link Pointers 100 of that other Node 90 will include a reverse Link End Pointer 104 to the Link List of Incremental Steps (LLIS) 98 of the Skeletal Image Arc Descriptor (SIAD) 88, a Next Link End Pointer 106 to an end of the Link List of Incremental Steps (LLIS) 98 associated with a next Node 90 along the cyclically connected ring of Nodes 90, which in turn will include a Link End Pointer 104 to an end of the Link List of Incremental Steps (LLIS) 98 of the Skeletal Image Arc Descriptor (SIAD) 88, and a Link List Pointer 108 to the Link List of Incremental Steps (LLIS) 98 of the Skeletal Image Arc Descriptor (SIAD) 88.

Transcriber Processor (Transcriber) 84 may use a variety of processes to construct a Skeletal Image Arc Descriptor (SIAD) 88 from the skeletized images residing in a Skeletized Scanned Character Image (SSCI) 82, the specific implementation of Transcriber Processor (Transcriber) 84 depending in part upon the form in which the skeletized image data is presented in Skeletized Scanned Character Images (SSCIs) 82. For example, the skeletized image data in Skeletized Scanned Character Image (SSCI) 82 may be stored as bitmaps or as sets of pixel coordinates, each bitmap or set of pixel coordinates corresponding to and representing a Connected Object (CO) 68.

Whatever representation is used, Transcriber Processor (Transcriber) 84 begins, for each Skeletal Image Arc (SARC) 42, by finding one end pixel of the Skeletal Image Arc (SARC) 42, either by finding a pixel that has only one adjacent pixel, thus representing an end of a line in "space", or a pixel that has two or more adjacent pixels, thus representing a pixel of a line at the point where that line connects with one or more other lines, or a pixel that has two adjacent pixels located orthogonally with respect to one another, thus representing a point of the line where the line has a significant change of direction and wherein one of the two adjacent pixels is thereby the first pixel of a new Skeletal Image Arc (SARC) 42. This step may be accomplished by either searching for pixels meeting these criteria directly, or by selecting a starting pixel and traversing along the path of adjacent pixels until a pixel is reached meeting these criteria.

Having found an "end" pixel, and thus a Node 90 of the Skeletal Image Arc (SARC) 42, Transcriber Processor (Transcriber) 84 will then traverse the path of pixels starting from the Node 90 pixel, constructing the associated Link List of Incremental Steps (LLIS) 98 while traversing the path, until the other "end" pixel of the line, representing the other Node 90 of the path, is reached.

If one or both of the Nodes 90 of that path is an intersection or connection with another Skeletal Image Arc (SARC) 42, that is, if the Connected Object (CO) 68 contains two or more Skeletal Image Arc (SARC)s 42, Transcriber Processor (Transcriber) 84 will continue along the next Skeletal Image Arc (SARC) 42, eventually traversing all of the Skeletal Image Arc (SARC)s 42 of the Connected Object (CO) 68 and constructing Node Pointers 100, Node Descriptors (NODDs) 96 and Link Lists of Incremental Steps (LLISs) 98 while doing so until the Skeletal Image Arc Descriptors (SIADs) 88 of the Connected Object (CO) 68 are completed. Transcriber Processor (Transcriber) 84 will then repeat this process for each Connected Object (CO) 68 represented in the Skeletized Scanned Character Image (SSCI) 82.

At this point, the handwritten characters or symbols of the original scanned image have been reduced to skeletal forms, and the skeletal forms have been separated into individual Skeletal Image Arc (SARC)s 42, with each Skeletal Image Arc (SARC) 42 and its associations with other Skeletal Image Arc (SARC)s 42 being individually described by a corresponding Skeletal Image Arc Descriptors (SIADs) 88 in a Skeletized Image File (SIF) 86.

The Skeletized Image File (SIF) 86 data structures are then provided to Time Order Induction Processor (TOIP) 32, which uses this data to infer or deduce a time order of creation of the strokes for use in subsequent character recognition, thereby generating character stroke information that is similar to and analogous to that provided by a "real time" character recognition input, such as that provided by an electronic pen and digitizing tablet.

2. Detailed Discussion of SITP 30 Smoothing and Thinning Rules a. Smoothing and Thinning Rules and Operations On Images Next considering the operation of SITP 30 in further detail, as described above SITP 30 performs operations on, for example, 3×3 kernel arrays of binary images wherein the outcome of an operation on a pixel depends upon the state of the pixel itself and its 8 surrounding neighbors. These operations may be used once or reiterative, or as part of a sequence of different operations, and may be used, for example, for the removal of "stray" pixels or noise, for smoothing of edges of the image, or, as described above, for reducing connected objects to skeletal representations for subsequent recognition based upon the resulting abstracted images. The following describes two table driven methods for performing these operations, one treating one pixel at a time and the second operating with two by two sets of pixels.

The fundamental image processing methods utilized herein basically perform the operation of turning background pixels into foreground pixels and foreground pixels into background pixels dependent upon their contexts as defined by neighboring pixels. For example, it may be desirable to change all foreground (1) pixels that have exactly one neighbor that is a foreground pixel into to background (0) pixel. Thus the central pixel in each of the following 8 configurations shown in FIG. 9 would be turned into a background pixel.

In practice, the rules for which pixels are changed in given contexts are usually more complex, but each rule states, for configurations like those illustrated above, which pixels are to change state. It will be appreciated, however, that the number of possible rules is very large as, for example, there are 512 possible configurations of a 3×3 pixel array and thus there are $512^2$ possible rules. Further complexity may arise from the use of a sequence of different processing rules, such as a rule for smoothing edges followed by the reiterative application of a rule for "removal" of edge pixels as in generating a skeletal representation of the original image.

It should be noted that the method described below is implemented for a byte oriented PU 14, such as an Intel 80486 microprocessor, but the present invention may also be implemented in a dedicated bit addressable graphics processor or in a special purpose processor which is capable of processing up to three image scan lines in parallel.

As will be described in further detail below, the following method assumes a byte oriented processor and that the image being processed is an integral number of bits wide. The method further assumes that the image is densely packed, for example, with 8 pixels to the byte, and that the represented image is surrounded by at least a single layer or boundary of implied background pixels, to establish "neighboring" pixels, that is, a group of adjacent pixels, for pixels on the edge of the image.

The method further operates upon a set of scan lines of the original image at a time, wherein the current set of scan lines are held in a temporary work buffer. The current set of scan lines preferably includes at least one line ahead of the line containing the pixel or pixels currently being operated upon, to avoid the unwanted spatial propagation of effects resulting from a current operation, and the process generates "off image" pixels for this purpose, if necessary.

Finally, during each iteration the image is processed one byte at a time and the results of the processing of each image byte are accumulated in a corresponding operation byte wherein the bits of the operation byte represent image pixels whose state is to change. The operation byte is then exclusive ORed with the image byte, if the operation byte is non-zero, to generate a modified image byte which replaces the original image byte.

To illustrate for an implementation of the present invention operating upon a single bit at a time, this implementation will create a 9 bit index array for each 3×3 local configuration of pixels, referring as a subject array, wherein the index array contains three bits from each of the line currently being processed, the line above or proceeding the line being processed and the line below or following the line being processed, which are referred to respectively as the current, above and below lines. The relationship of the index array to a current subject array being processed may be illustrated as shown in FIG. 10, wherein d e f are the pixels of the current line, a b c are the pixels of the above line and g h i are the pixels of the below line.

An index a b c d e f g h i is generated from the 3×3 pixel index array and contains the states, 1 or 0, of the index array as read in the order a b c d e f g h i and are used to index a table. The table contains an entry, referred to as an operation array, for each index wherein each operation array of the present example contains a single bit, corresponding to pixel "e", and the state of the bit of the operation array, such as "1" or "0", indicates whether the currently central pixel, that is, pixel e, is to retain its current state or to change its current state. The single bit of the operation array is then exclusive ORed with the "e" pixel to determine a modified "e" pixel which replaces the original "e" pixel.

It should be noted, with respect to the following discussions, that there are a number of methods by which the processing of the image can be accelerated when appropriate to the processing rule. For example, consider the byte x x x x x x x x in its neighborhood of 8 adjacent bytes, which may be represented as shown in FIG. 11.

The 8 pixel byte represented by x x x x x x x x may be "passed over" with detailed processing if the current processing rule accommodates any of a number of conditions. For example, if the rule directs that a background pixel will never under any conditions be transformed into a foreground pixel, then a byte having all background pixels can be passed over. Likewise, if the rule directs that a foreground pixel will never be transformed into a background pixel, then a byte having all foreground pixels can be passed over. Further, if the rule directs that a foreground pixel completely surrounded by foreground pixels never transforms into a background pixel, then a byte having all foreground pixels can be passed over if all eight neighboring bytes are also all foreground pixels. Finally, if the rule directs that a background pixel completely surrounded by background pixels never transforms into a foreground pixel, then a byte having all background pixels can be passed over if all eight neighboring bytes are also all background pixels.

It should be noted that there are other possible accelerations that may be used, again if appropriate to the current rule, but consideration must be taken of the increased processing cost necessary for conditions which require pixel by pixel examination of a neighborhood.

Finally, there may be accelerations applicable to iterative processing of the same image with the same rule. For example, if a rule operates iteratively on an image, then in any iteration after the first pixels of the image that did not change during the last iteration cannot change during the current iteration unless they are, or are neighbors of, pixels that did change during the preceding iteration.

This acceleration recognizes the principle that the effects of a process according to a given rule propagate by at most one pixel per iteration and may be implemented, as in the present invention, by a mechanism for tracking changes in image pixels during processing according to the current rule or rules.

For this reason, the change tracking mechanism generates a return array for each line of the scanned image wherein each return array indicates, for the corresponding line, the "span" defined by the leftmost and rightmost bytes that were changed in the current iteration. The mechanism initializes the return arrays to encompass the fill image at the start of the first iteration of a process and at the conclusion of the process, which is indicated by no changes occurring in the current iteration, indicates the useful end of the iterations by generating a return array having an "impossible" span having a leftmost byte that is locate to the right of the rightmost byte.

The change tracking mechanism uses the return arrays to bound the process during all iterations after the first but assumes that the current contents of each return array bind the span to be processed in the current iteration by one pixel too tightly, which is a possible result of an preceding iteration. The change tracking mechanism therefore extends, or "fattens", the span to be processed by one byte on both the right and the left of the indicated span and by one pixel along all edges parallel to the scan line, wherein the "fattening" operation is clipped, or limited, by the actual bounds of the image.

The change tracking mechanism further generates or sets a flag stating whether the changed span was null and provides a number or value representing the number of pixels that were changed in the iteration, the mechanism thereby being informed when to stop iterating because there are no more changes resulting from iterations of the process.

Finally, and as described above, SITP 30 may apply a sequential set of rules to an image, perhaps in a cyclic manner, and SITP 30 will preferable bound these processes in a like manner using return arrays to control the reiteration of the sequential set of rules. In this instance, SITP 30 will generate a return array for each rule and at the start of each new rule in the sequence of rules will pass to the new current rule a return array which is a logical union of the last iteration of the preceding rule. The union array thereby represents the results of the application of each succeeding iteration of the rules and is used as the starting return array for the first current iteration of the new current rule. The new current rule will thereby set its "left" and "right" edges at the "leftmost" and "rightmost" edges of the span resulting from the previous applications of itself and the preceding iterations of the other rules in the sequence of rules.

As has been described, the present implementation of SITP 30 is preferably table driven, wherein a table is used to store and look up the processing results for groups or sets of pixels, because of the increased processing speed that can be obtained with table driven processing. While there is no limit in principle to the sizes of the tables used in the processing, there may be limits due to memory and processing limitations.

For example, an implementation providing table driven simultaneous processing of 2×2 pixel subject arrays using an index generated from 4×4 index arrays of the image pixels may be illustrated by the array illustrated in FIG. 12, wherein the individual pixel operations for the 2×2 subject array comprising pixels F, G, J and K is to be determined using the index generated from the 4×4 index array comprising pixels A, B, C, D, E, F, G, H, I, J, K, L M, N, O and P as an index into a table. A table constructed on these arrays will provide an operation array of four bits, corresponding individually to the pixels of the input processing array and designated respectively as f, g, j and k, to be exclusive ORed with the four pixels of the 2×2 subject array to selectively "flip" or not "flip" the states of the individual pixels of the 2×2 subject array. It should be noted that this implementation can provide an operation array defining the individual operations, flip or not flip, to be performed on each of the four individual pixels of the subject array because the index array contains the information necessary to completely define the local contexts of each of the four pixels of the subject array.

This table will contain 64 Kbytes of operation array information, which may be reduced to 32 Kbytes by denser packing of the information therein. For example, the index may be reduced to 15 bits, by eliminating pixel A from the index, and each entry in the table may store two operation arrays. In each entry in the table, one operation array, identified as f-g-j-k, will apply when the state of pixel A is "1" and the other operation array, identified as f'-g'-j'-k', will apply when the state of pixel A is "0".

This implementation will process two lines of an image at a time and, after four table look-ups, will have generated two bytes of operation array which, if non-zero, will be exclusive ORed with the pixels of the original image to generate the modified pixels of the modified image.

Again, certain accelerations are available to reduce the required processing, which may be illustrated with the pixel array represented in FIG. 13.

In this example, if the rule directs that no background pixel ever turns into a foreground pixel and if both x x x x x x x x and y y y y y y y y are all background pixels, then x x x x x x x x and y y y y y y y y need not be processed. Similarly, if the rule further directs that no foreground pixel ever turns into a background pixel and if both x x x x x x x x and y y y y y y y y are both foreground pixels, then x x x x x x x x and y y y y y y y y need not be processed. If the rule directs that a background pixel completely surrounded by background pixels never turns into a foreground pixel and x x x x x x x x and y y y y y y y y are background pixels, then x x x x x x x x and y y y y y y y y need not be processed if all ten of the surrounding pixels are background pixels. Finally, if the rule directs that a foreground pixel completely surrounded by foreground pixels never turns into a background pixel and x x x x x x x x and y y y y y y y y are foreground pixels, then x x x x x x x x and y y y y y y y y need not be processed if all ten of the surrounding pixels are foreground pixels.

b. Specification of Rules

As described above, a present implementation of SITP 30 operates upon 3×3 index arrays having 1×1 subject arrays and is thus defined by a processing rule comprised of a set of 512 rules wherein each rule defines the operation to be performed on a subject array for each of the possible index arrays. The processing rule may be stored as "truth values" in a rule table or list, wherein each truth value corresponds to a rule of the processing rule, and a specific or particular processing rule may be generated by successive modifications to a basic or starting processing rule initially embodied in the rule table. The following will describe, in part by example, the construction of a processing rule table using a 2 dimension notation for defining meaningful sets of 3×3 arrays of pixels and their corresponding truth values specifying the operation to be performed on the central pixel of each 3×3 array according to the processing rule.

According to the notation used in the following, a "B" represents a black, or foreground, pixel while a "-" represents a white, or background, pixel and an "e" indicates that the pixel may be either a foreground or background pixel. Thus, considering the following patterns illustrated in FIG. 14, the left array represents an array having all foreground (black) pixels with four orthogonal background (white) pixels, regardless of the states of the states of the diagonal pixels while the right array represents an array having a background (white) pixel located vertically between two foreground (black) pixels. There are 16 possible arrays which meet the conditions expressed in the left array and 64 possible arrays which meet the conditions expressed in the right array.

A set of basic array patterns such as those illustrated just above can be extended to include the versions, variations or modifications of the basic array patterns that result from rotation or reflection of the basis array patterns, the reflections and rotations being represented or identified, for example, by numeric codes based upon the diagram illustrated in FIG. 15.

The numeric codes are based upon summations of the values of the positions of the above diagram to which a selected pixel of a basic array pattern maps for each rotation or reflection, starting with the basic array pattern superimposed on the diagram with the selected pixel in the "1" position of the diagram. Thus, the numeric code 1+128 is the sum of the values at positions 1 and 128 are indicates or represents a basic array pattern in its original position at "1" and with the pattern reflected about the vertical axis of the diagram while the numeric code 1+4+16+64 is the sum of the values at positions 1, 4, 16 and 64 and corresponds to a basic array pattern in its original position at "1", with rotations of +90 and −90 degrees, respectively to positions "4" and "64", and with a rotation of 180 degrees to the "16" position. It is apparent that numeric code values generated by use of this diagram is sufficient to express rotations of a basic array pattern of 90, 180 and 270 degrees, plus right-left and/or top/bottom reflections.

Two examples of extended basic array patterns and interpretations of the extended patterns are shown in FIG. 16, which represents all pixels, foreground or background, with only one diagonal foreground pixel, with any combination of orthogonal pixels, and FIG. 17, which represents a foreground pixel between two diametrically opposite background pixels with any combination for the remaining pixels in the array.

Finally, there are four operations that can be performed on the center pixel of a 3×3 array: the pixel can be "flipped" to its opposite state, the pixel can be transformed into a foreground pixel, the pixel can be transformed into a background pixel, or the pixel can be left in its original state. It should be noted that there are equivalence's among these operations for certain conditions, a example being to transform a pixel into a background pixel when it is already a background pixel. Such equivalencies, however, are neither meaningless nor redundant as it is the intention of the present implementation that a processing rule be developed progressively, so that such equivalencies are the outcome of the method of development of the processing rules.

Examples of rules developed as described above may be implemented through computer program type statements, or commands, wherein the first parameter in such commands would be a pointer to a particular rule table or set of rule tables. Such statements can be incorporated into routines called by higher levels of code specifying at different times the particular orientation to use or the processing rule that is to be changed. Examples of such could include the following two exemplary commands in the C language, illustrated in FIG. 18, wherein the first clears the rule table, effectively directing that neither foreground or background pixels are to be transformed or modified, regardless of their context. The second directs that isolated and projecting foreground pixels be transformed into background pixels, that is, "trimmed" from the edge of a connected object.

c. Automatic Construction of Rule Tables

As described, a rule table for operating upon a 1×1 subject array in a 3×3 index array contains 512 entries wherein the index of each entry represents a pixel bit pattern of a 3×3 index array and wherein the value of the entry, that is, the state of the single bit in the 1×1 operation array, has a value of, for example, 0, if the rule directs the subject pixel is to be unchanged and 1 if the rule directs the subject pixel to be "flipped" to the opposite state.

The modification of an existing rule table according to the previously described methods is straightforward, gaining complexity only from the generation of the multiplicity of array patterns implied by the "e" states in the array pattern and the multiplicity of orientations specified by the orientation sets specified by the numeric codes.

A multiplicity of array patterns and orientations is generated by nested iterations which may be illustrated by the pseudocode illustrated in FIG. 19. wherein: determines values of, and set the (probably four) shortcut flags and returns a no-error code.

To maintain consistency among modify rule operations, the "shortcuts" are reestablished at the end of each modify rule operation, with the resulting shortcut flags becoming an appendage to the rule table. In the instance of a 3×3 index array, there are four "shortcuts", which may be expressed as:

1) To determine whether a background pixel can ever be transformed into a foreground pixel, determine whether there is a non-zero entry in any of the rule locations *_*_*_*_1*_*_*_*, where every '*" takes a value of 0 or 1;

2) To determine whether a foreground pixel can ever be transformed into a background pixel, determine whether there is a non-zero entry in any of the rule locations *_*_*_*_1_*_*_*_*;

3) To determine whether a background pixel completely surrounded by background pixels is transformed into a foreground pixel, test whether rule location 0_0_0_0_0_0_0_0_0 is non-zero; and, 4) To determine whether a foreground pixel completely surrounded by foreground pixels is transformed into a background pixel, test whether rule location 1_1_1_1_1_1_1_1_1 is non-zero.

d. Automatic Construction of Rule Tables for Processing 2×2 Pixel
   Index Arrays A 32 K byte table for processing 2×2 index arrays contains exactly the same information as a 512 byte table, but the information is rearranged and contains redundancies to increase the speed of processing. The table for 2×2 index arrays differs from that for 3×3 index arrays, however, in that the process will set individual bits, rather than bytes, and, wherein in the 512 byte table a byte would be set to 1 or 0, the 32 K byte table will set 512 distinct bits to 1 or 0.

For example, consider the index array represented FIG. 20 wherein this index array may occupy several different positions relative to a 2×2 array of pixels and the neighborhoods of pixels of a 2×2 array, such as is illustrated in FIG. 21 wherein the any of the '*'s may assume a value of 0 or 1.

Each of these patterns represents the addresses of 128 bits in the rule table that must be set, for a total of 512 bits, for each orientation of each pattern of each modify rule command contributing to the specification of each rule. Because rule table development is thereby so deeply nested, that is, requires to many iterations, significant processing time can be required to develop a table each time it is used and it is generally preferable to pre-generate and store the table for use a required.

For this larger 32 K byte table, as for the smaller 512 byte table, it is preferable to automatically determine the truth values for possible processing shortcuts. As described above, this is done at the end of execution of the modify rule command by examining the resulting state of the rule table and the shortcuts may include, for example:

1) To determine whether a background pixel can ever be transformed into a foreground pixel, choose a specific pixel, such a 'p', in the pattern shown in FIG. 22 and determine whether there is a bit having the value 1 in any of the 256 bit locations implied by

0_0_0_0_0_*_*_*_0_*_0_*_0_*_*_*;

2) To determine whether a foreground pixel can ever be transformed into a background pixel, determine for the same pattern whether there are any bits having the value 1 in the locations implied by

0_0_0_0_0_*_*_*_0_*_1_*_0_*_*_*;

3) To determine whether a background pixel completely surrounded by background pixels is ever transformed into a foreground pixel, determine whether there is a bit having a value of 1 in the locations implied by the pattern illustrated in FIG. 23; and 4) To determine whether a foreground pixel completely surrounded by foreground pixels is ever transformed into a background pixel, determine whether there is a bit having a value of 1 in the locations implied by the pattern illustrated in FIG. 24.

e. Table Construction In Abstraction of Objects to Skeletal Form

As described, the above processing of image pixels according to rule tables is applied, in the present implementation, to operating upon bitmap images of black (foreground) lines on white (background), such as handwritten or handprinted characters to reduce the characters to one pixel wide lines. As has been described, this process is generally performed according to the present invention by first smoothing the outer contours, that is, edges, of the characters, referred to herein as objects, and then iterative stripping off a layer of pixels from the left, top, right, bottom, and so on of the objects in such a way that no foreground (black) pixel is removed which is an essential connection between to other foreground pixels, that is, in such a manner which preserves an object as a connected object. In general, this process will end when there has been no change in an object after a predetermined number of consecutive processing iterations, such as four consecutive processing iterations.

The smoothing operation, which may be executed once or several times, as required, may be defined by the pseudocode illustrated in FIG. 25 wherein certain of the terms therein have been defined and discussed above.

Finally, exemplary C programming language code listings for the construction and use of rule tables for processing 2×2 pixel arrays is illustrated and the corresponding code for the processing of one pixel at a time can readily be derived from this code by those of ordinary skill in the art.

C. Description of Time Order Induction Processor (TOIP) 32

1. General Description of TOIP 32

As described above, SITP 30 functions in a reiterative manner to reduce the input character images as represented by Scanned Character Images (SCIs) 38 to their equivalent skeletal images, referred to previously and in the following as Skeletal Images (SKIs) 40, wherein each Skeletal Image (SKI) 40 is comprised of one or more Skeletal Image Arcs (SARCs) 42, and stores the Skeletal Images (SKIs) 40 in Skeletized Image Files (SIFs) 86 as Skeletal Image Arc Descriptors (SIADs) 88. SITP 30 further generates a plurality of Skeletized Image Files (SIFs) 86 from each Scanned Character Image (SCI)) 38, each Skeletized Image File (SIF) 86 containing equivalent representations of the skeletized characters, but at different resolutions.

Figure 26:
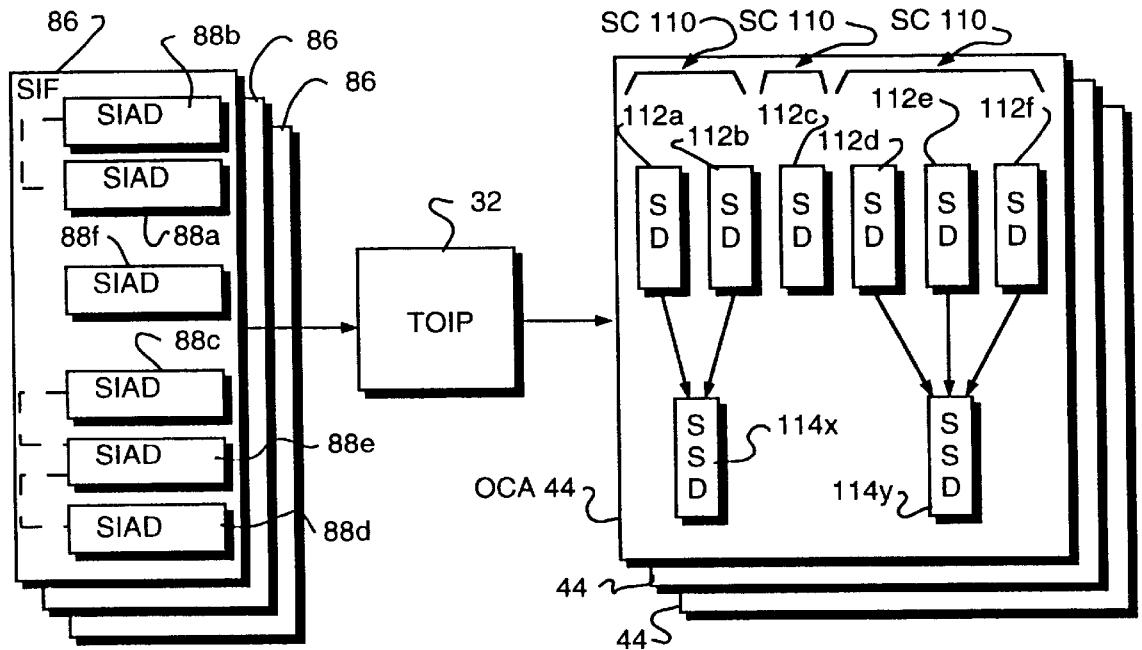
FIG. 26 is a diagrammatic representation of the time order induction processor of the present invention.

Referring to FIG. 26, it is illustrated therein that TOIP 32 operates upon each Skeletized Image File (SIF) 86 corresponding to a given Scanned Character Image (SCI) 38 to order the strokes, that is, the Skeletal Image Arcs (SARCs) 42, represented in the Skeletal Image Arc Descriptors (SIADs) 88 into Stroke Clusters (SCs) 110 wherein each Stroke Cluster (SC) 110 is a group of one or more Stroke Descriptors (SDs) 112 containing information describing Skeletal Image Arcs (SARCs) 42 having a geometric and topological relationship such that the Skeletal Image Arcs (SARCs) 42 of a Stroke Cluster (SC) 110 have potential meaning as a stroke or strokes of a character or part of a character. TOIP 32 then orders the Stroke Clusters (SCs) 110 of a Skeletized Image File (SIF) 86 into a spatial sequence representing a left to right order across a page, thereby inferring a time order of creation of the strokes represented by the Skeletal Image Arcs (SARCs) 42, and writes the Stroke Clusters (SCs) 110 into a corresponding Ordered Cluster Array (OCA) 44. Each Stroke Cluster (SC) 110 will thereby include at least one Skeletal Image Arc (SARC) 42 and may therefore represent a Connected Object (CO) 68 or a plurality of Connected Objects (COs) 68 wherein the spatial relationship of the Connected Objects (COs) 68 of a Stroke Cluster (SC) 110 is such that the Connected Objects (COs) 68 may form a meaningful stroke or group of strokes of a character or part of a character.

The process wherein TOIP 32 writes the Stroke Clusters (SCs) 110 derived from each Skeletized Image File (SIF) 86 into a corresponding Ordered Cluster Array (OCA) 44 is illustrated in FIG. 26 wherein the suffix attached to the reference numeral of each Stroke Descriptor (SD) 112 indicates the spatial relationships between the Skeletal Image Arcs (SARCs) 42 described therein. That is, Stroke Descriptor (SD) 112b contains descriptions of strokes which occur, in left to right order, before those represented in Stroke Descriptor (SD) 112c and after those represented in Stroke Descriptor (SD) 112c.

TOIP 32 then performs a stranding operation on the Skeletal Image Arc (SARC)s 42 of the Stroke Clusters (SCs) 110 in each Ordered Cluster Array(OCA) 44 wherein, in those Stroke Clusters (SCs) 110 containing two or more intersecting Skeletal Image Arcs (SARCs) 42, TOIP 32 joins the ends of selected ones of the Skeletal Image Arcs (SARCs) 42 to generate "strands" of connected strokes, that is, strands of connected Skeletal Image Arc (SARC)s 42 which are stored in corresponding Stranded Stroke Descriptors (SSDs) 114. In this regard, it will be remembered from a previous discussion that SITP 30 operates upon Connected Objects (COs) 68 comprised of two or more connected but separately identifiable paths of pixels to separate the connected paths into separately defined Skeletal Image Arcs (SARCs) 42. In the stranding operation, therefore, TOIP 32 thereby effectively rejoins selected ones of the Skeletal Image Arcs (SARCs) 42 of Connected Objects (COs) 68 originally comprised of two or more connected Skeletal Image Arcs (SARCs) 42 into corresponding single stranded Skeletal Image Arcs (SARCs) 42 and thereby effectively reconstructs, in part or in whole, the original Connected Objects (COs) 68.

TOIP 32 then writes the Stranded Stroke Descriptors (SSDs) 114 into the corresponding Ordered Cluster Arrays (OCAs) 44, that is, into the Ordered Cluster Arrays (OCAs) 44 containing the corresponding non-stranded strokes, as illustrated in FIG. 26. In FIG. 26, the dashed lines connecting Skeletal Image Arc Descriptors (SIADs) 88 represent Skeletal Image Arc Descriptors (SIADs) 88 containing Skeletal Image Arcs (SARCs) 42 which are stranded into single stranded Skeletal Image Arc (SARC)s 42 and the arrows lines connecting certain Stroke Descriptors (SDs) 112 with corresponding Stranded Stroke Descriptors (SSDs) 114 represent the stranding of corresponding Stroke Descriptors (SDs) 112 into Stranded Stroke Descriptors (SSDs) 114. As illustrated therein, Stranded Stroke Descriptor (SSD) 114x is created from Stroke Descriptors (SDs) 112a and 112b, corresponding to Stroke Skeletal Image Arc Descriptors (SIADs) 88a and 88b, and Stranded Skeletal Image Arc Descriptor (SSIAD) 112y is created from Stroke Descriptors (SDs) 112d, 112e and 112f, corresponding to Skeletal Image Arc Descriptors (SIADs) 88d, 88e and 88f.

TOIP 32 passes the Ordered Cluster Arrays (OCAs) 44 to LLRP 34 which, as will be described in a following discussion, assigns possible meanings to the strokes described therein.

2. Detailed Description of TOIP 32 a. Stroke Descriptor Generator (SDG) 116 (FIGS. 27A and 27B)

Figure 27B:
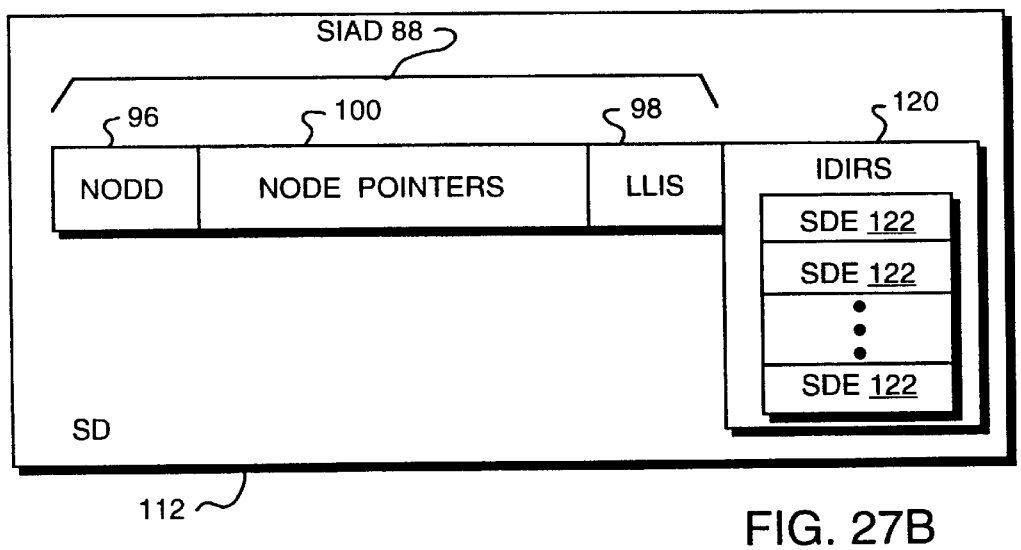
FIG. 27B is a diagrammatic representation of a stroke descriptor.
Figure 27A:
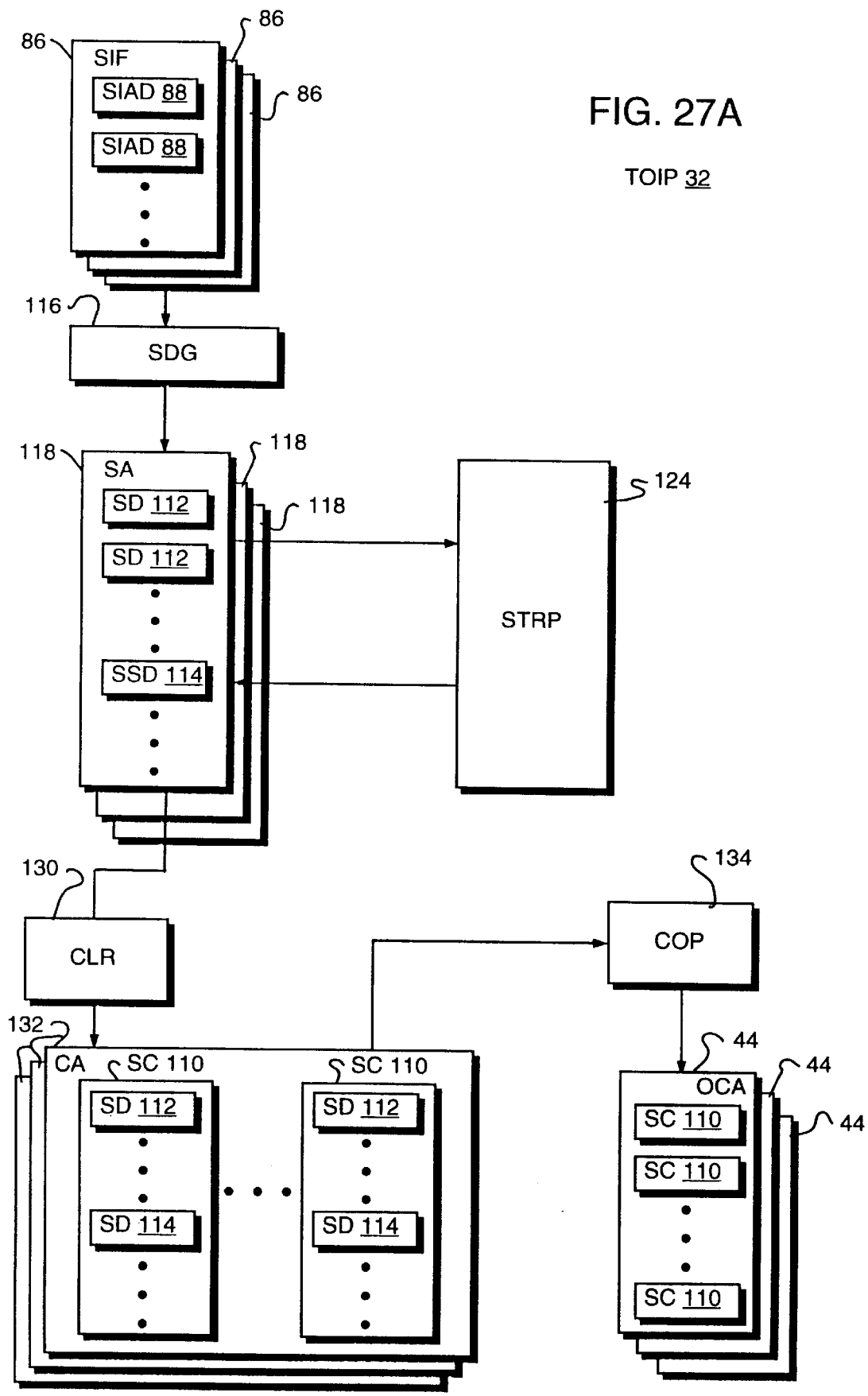
FIG. 27A is a diagrammatic representation of a stroke descriptor generator of the present invention.

Considering FIG. 27A, TOIP 32 includes a Stroke Descriptor Generator (SDG) 116 implemented as a corresponding Program Routine (PR) 18 executing on PU 14 for reading the information describing each Skeletal Image Arc (SARC) 42 of a selected Skeletal Image File (SIF) 86 and constructing a Stroke Array (SA) 118 corresponding to each Skeletal Image File (SIF) 86. Each Stroke Array (SA) 118 in turn contains a Stroke Descriptor (SD) 112 for and corresponding to each Skeletal Image Arc (SARC) 42 in the corresponding Skeletal Image File (SIF) 86.

As illustrated in FIG. 27B, each Stroke Descriptor (SD) 112, in turn, contains the Skeletal Image Arc Descriptor (SIAD) 88 of the corresponding Skeletal Image Arc (SARC) 42, including coordinates of the end Nodes 90 in the NODD 96 and the coordinates of the pixels along the Link 92 path as described in the Link List of Incremental Steps (LLIS) 98, and an Induced Direction String (DIRS) 120. As will be discussed further below, an Induced Direction String (IDIRS) 120 contains a Stroke Direction Entry (SDE) 122 for each pixel along the stroke path represented in the Stroke Descriptor (SD) 112 and represents, for each pixel represented in the Stroke Descriptor (SD) 112, an assumed direction of motion of an imaginary pen at the pixel in forming the stroke described by the corresponding Stroke Descriptor (SD) 112. The direction of motion is imposed upon each stroke under the assumed convention that the strokes of characters are formed, by most writers, top to bottom and left to right motions of a pen. This process is repeated for each Skeletal Image File (SIF) 86 corresponding to a given Scanned Character Image (SCI) 38, that is, for each resolution of representation of the skeletized image of the given Scanned Character Image (SCI) 38.

In the present implementation, Stroke Descriptor Generator (SDG) 116 determines the coordinates of each pixel along a Link 92 path by reading the Incremental Steps (INCSs) 94 of the associated Link List of Incremental Steps (LLIS) 98 along the pixel path of the Skeletal Image Arc (SARC) 42 starting from one Node 90 and converting the Incremental Steps (INCSs) 94 into corresponding x-y coordinate locations of the pixels along the path described by the Link List of Incremental Steps (LLIS) 98 by cumulatively adding the direction and distance information in the successive Incremental Steps (INCSs) 94 to the starting coordinates obtained from the staring end Node 90.

The Incremental Step (INCS) 94 information is also used to generate the corresponding Stroke Direction Entries (SDEs) 122 for the Induced Direction String (IDIRS) 120 of a Stroke Descriptor (SD) 112. In the present implementation of Stroke Descriptor Generator (SDG) 116, the imposed direction of motion of creation of the stroke is resolved to four directions, that is, left, right, up and down, and is determined either solely from the direction information from Link List of Incremental Steps (LLIS) 98 or from the pixel coordinates by determining whether the maximum change in the x-y coordinates from one pixel location to a next occurs in the x or y axis and in which direction the maximum change occurs, that is, whether the maximum change is in the + or − direction along that axis. In other implementations, the direction of motion may be resolved to higher resolutions if necessary for consistent and accurate identification of the characters and symbols. For example, and as will be well understood by those of ordinary skill in the art, the direction of motion may easily be resolved to the 8 directions comprising left, left-up, up, up-right, right, right-down, down, and down-left by noting the magnitude of change in the coordinate locations of from one pixel to the next along the x and y axis and determining the simple ratio of these magnitudes, rounded to the 90° and 45° angles comprising these directions, or, again, from the direction information from the Link List of Incremental Steps (LLIS) 98.

It has been described above that in certain implementations of SITP 30 each Incremental Step (INCS) 94 stores the coordinates of the locations of pixels or groups of pixels along each Link List of Incremental Steps (LLIS) 98 path, rather than the directions and distances to successive pixels or pixels along each Link List of Incremental Steps (LLIS) 98 path. If SITP 30 is implemented in this manner, it will not be necessary for Stroke Descriptor Generator (SDG) 116 to convert Incremental Step (INCS) 94 direction and distance information into pixel coordinates as this information will be available directly from Incremental Steps (INCS) 94, but it will then be necessary for Stroke Descriptor Generator (SDG) 116 to generate Direction Strings (DIRSs) 122 from the successive coordinates of the pixels.

b. Stranding Processor (STRP) 124 (FIGS. 27A, 28A and 28B)

TOIP 32 further includes a Stranding Processor (STRP) 124 which, as previously described, reads the Stroke Descriptors (SDs) 112 of each Stroke Array (SA) 118, identifies those strokes whose Skeletal Image Arcs (SARCs) 42 as described in the Stroke Descriptors (SDs) 112 indicate that the strokes intersect, and constructs corresponding Stranded Stroke Descriptors (SSDs) 114.

In this regard, it has been described previously that SITP 30's Transcriber Processor (Transcriber) 84 divides a pixel path of a Connected Object (CO) 68 into separate Skeletal Image Arcs (SARCs) 42 at those points where the pixel path meets another pixel path of the Connected Object (CO) 68 or where there is a significant change in direction in the pixel path. As such, what had been a single pixel path, that is, a single stroke, of a character, is transcribed as two or more separately identified and described strokes.

This process is illustrated in FIG. 28A wherein a Connected Object (CO) 68 is illustrated in its original skeletized form as comprised of two intersecting Skeletal Image Arcs (SARCs) 42, identified as Skeletal Image Arcs (SARCs) 42$u$ and 42$v$. Transcriber Processor (Transcriber) 84 operates upon such a Connected Object (CO) 68 by detecting the intersection or joining of Skeletal Image Arc (SARC) 42$u$ and Skeletal Image Arc (SARC) 42$v$ at a common pixel, indicated as Intersection 126, and, as illustrated in FIG. 28B, transcribing Skeletal Image Arc (SARC) 42$u$ and Skeletal Image Arc (SARC) 42$v$ as Skeletal Image Arc (SARC)s 42$w$, 42$x$, 42$y$ and 42$z$.

As has been described, Stroke Descriptor Generator (SDG) 116 will describe each of Skeletal Image Arcs (SARCs) 42$w$, 42$x$, 42$y$ and 42$z$ in separate Stroke Descriptors (SDs) 112 of a Stroke Array (SA) 118.

As has been briefly described above, Stranding Processor (STRP) 124 performs stranding operations upon certain of the Skeletal Image Arc (SARC)s 42 described in the Stroke Descriptors (SDs) 112 of each Stroke Array (SA) by joining the ends of selected pairs of Skeletal Image Arc (SARC)s 42 into single connected strokes, that is, joins each selected pair into a single Skeletal Image Arc (SARC) 42. The pairs of Skeletal Image Arc (SARC)s 42 are selected from pairs of intersecting Skeletal Image Arc (SARC)s 42 described in the Stroke Descriptors (SDs) 112 in each Stroke Array (SA) 118 wherein each pair is selected has having the minimum angle of intersection between the strokes at their point of intersection. This process is based upon the fact that the human hand, when writing normal text characters or symbols, follows ballistic motions that avoid sudden or acute changes in the direction of movement along a stroke, unless necessary to form the stroke. The process thereby restores certain strokes of Connected Objects (COs) 68 that have been divided into two separately identified strokes by Transcriber Processor (Transcriber) 84 into single strokes in a manner that replicates the strokes as they would be formed by a human hand writing the original image in "real time", for example, with a pen and tablet.

The process performed by Stranding Processor (STRP) 124 may illustrated with the aid of FIG. 28C wherein Stranding Processor (STRP) 124 will identify six possible pairs of intersecting strokes as actual or possible members of a Stroke Cluster (SC) 110. These pairs of strokes are represented by Skeletal Image Arc (SARC) 42$w$ with Skeletal Image Arc (SARC) 42$x$, Skeletal Image Arc (SARC) 42$w$ with Skeletal Image Arc (SARC) 42$y$, Skeletal Image Arc (SARC) 42$w$ with Skeletal Image Arc (SARC) 42$z$, Skeletal Image Arc (SARC) 42$x$ with Skeletal Image Arc (SARC) 42$y$, Skeletal Image Arc (SARC) 42$x$ with Skeletal Image Arc (SARC) 42$z$, and Skeletal Image Arc (SARC) 42$y$ with Skeletal Image Arc (SARC) 42$z$. Stranding Processor (STRP) 124 will determine the respective angles of intersection between the possible pairs of strokes, represented as Angles (As) 128$wx$, 128$wy$, 128$wz$, 128$xy$, 128$xz$, and 128$yz$. As illustrated in FIG. 28D, Stranding Processor (STRP) 124 will identify the pair comprised of Skeletal Image Arc (SARC) 42$w$ and Skeletal Image Arc (SARC) 42$x$ with angle of intersection A 128$wx$ and the pair comprised of Skeletal Image Arc (SARC) 42$y$ with Skeletal Image Arc (SARC) 42$z$ with angle of intersection A 128$yz$ as representing the joined stroke pairs having the minimum angle of intersection between the strokes of each pair. Stranding Processor (STRP) 124 will then generate a new first Stranded Stroke Descriptor (SSD) 114wx for and corresponding to the pair Skeletal Image Arc (SARC) 42w/Skeletal Image Arc (SARC) 42x and a new second Stranded Stroke Descriptor (SSD) 114yz for and corresponding to the pair Skeletal Image Arc (SARC) 42y/Skeletal Image Arc (SARC) 42z wherein the two new Stranded Stroke Descriptors (SSDs) 114 will be similar in all respects to Stroke Descriptors (SDs) 112, but will describe the strokes as joined, or stranded, single entities. That is, in each pair their end Nodes 90 at their point of intersection will be merged as another pixel point along the joined path, their Direction Strings (DIRSs) 120 will be merged into a single Induced Direction String (IDIRS) 120, and so on.

It will be noted that the above described stranding operation requires Stranding Processor (STRP) 124 to determine the angle of intersection between the pixel paths of each possible pair of Stroke Descriptors (SDs) 112 to identify the pairs of intersecting pixel paths that have the minimum angle between the directions of their paths at the point of intersection at their end Nodes 90.

Stranding Processor (STRP) 124 may determine the angles of intersection between the pixel paths of the possible pairs of strokes by determining the respective directions of the first pixels along each pixel path adjoining the pixel that forms the common end Nodes 90 of the pixel paths. This method, however, quantifies each pixel path's direction to one of only 8 possible angles and is susceptible to "noise" in the original quantizing of the document image into a pixel map by the scanner and to "noise" introduced in the thinning process.

The present implementation of Stranding Processor (STRP) 124 therefore determines the angles of the strokes relative to one another at their common, shared end Node 90 location over a greater length of each stroke. In one implementation, Stranding Processor (STRP) 124 may perform this operation by determining, for each stroke of a group of two or more intersecting strokes, the angle, relative to either a selected axis of the x-y coordinate plane or to a selected one of the strokes of the group, of a line connecting the location of the shared end Node 90 location and a point along the stroke in a direction away from the common end Node 90 location by some predetermined distance. The line connected the selected point along each stroke with the shared end Node 90 location will thereby represent an average angle of motion or direction of the stroke relative to the selected axis of the x-y coordinate plane or to the selected one of the paths, and the angles of the strokes of the group may then be compared to determine the pairs having the minimum angles of intersection at the shared end Node 90 location.

In this implementation, Stranding Processor (STRP) 124 may use a single pixel along each stroke of the group as the selected the point along the stroke. In this instance, the pixel may be selected, for example, as that at the other end Node 90 of each stroke or a pixel at predetermined distance, that is, a predetermined number of pixels, along the path away from the shared end Node 90 location, or, again, at the end Node 90 if the stroke ends before the predetermined distance. In another implementation, Stranding Processor (STRP) 124 may determine the relative angle of a stroke from the average determined from two or more pixels selected along the stroke in the direction away from the common end Node 90. These pixels may be comprised of, for example, the other end Node 90 of each stroke and a pixel located midway between the end Nodes 90 of each stroke, as identified, for example, by counting pixels along each stroke, or one or more pixels located at predetermined distances along each stroke in the direction away from the common end Node 90 location. Given the coordinate location of two or more points along the line of each stroke, one of which is the shared end Node 90 at the intersection of the strokes. Stranding Processor (STRP) 124 may then determine the angles of intersection of the strokes, either relative to the x-y coordinate plane or relative to a selected one of the strokes, by methods that are well known to those or ordinary skill in the art, but essentially by determining from the coordinates of the two or more points along the line, the change in location of the line along one of the x-y axis with respect to the change in location of the line along the other of the x-y axis.

In another and preferred implementation, Stranding Processor (STRP) 124 will determine the angle of intersection of each stroke, relative to the x-y coordinate plane or to a selected one of the strokes, by determining the incremental x or y coordinate change of the stroke path location relative to the x or y coordinate of shared end Node 90, for a predetermined incremental distance along, respectively, the y or x axis relative to the y or x coordinate of the shared end Node 90. That is, and for example, Stranding Processor (STRP) 124 will determine the y coordinate of the shared end Node 90, move a predetermined distance along the x axis, and determine the y coordinate of the stroke at that point along the x axis; the change in y coordinate location will then represent the angle of direction or movement of the stroke relative to the x axis.

As described, Stranding Processor (STRP) 124 performs the joining operation upon each pair of strokes described by a corresponding pair of Stroke Descriptors (SDs) 112 in each Stroke Array (SA) 118. Stranding Processor (STRP) 124 then writes the Stranded Stroke Descriptors (SSDs) 114 into the Stroke Arrays (SAs) 118 containing the Stroke Descriptors (SDs) 112 from which they are constructed. It is preferable, when doing so, that Stranding Processor (STRP) 124 append a stranded identifier to each Stroke Descriptor (SD) 112 that has been used in constructing a Stranded Stroke Descriptor (SSD) 114, to indicate the dual representation of the stroke described therein, and that Stranding Processor (STRP) 124 also append to each Stranded Stroke Descriptor (SSD) 114 component identifiers of those Stroke Descriptors (SDs) 112 from which it was constructed.

In an alternate embodiment, however, and dependent at least in part upon the specific implementation of LLRP 34, Stranding Processor (STRP) 124 may construct stranded Stroke Arrays (SAs) 118 by deleting from a copy of each Stroke Array (SA) 118 containing strokes that have been stranded each stroke that has been combined with another stroke to form a stranded stroke and substituting therefor the Stranded Stroke Descriptors (SSDs) 114. In this embodiment, therefore, there will be two versions of the Stroke Arrays (SAs) 118 for each Skeletized Image File (SIF) 86 having strandable strokes, that is, a non-stranded Stroke Array (SA) 118 and a stranded Stroke Array (SA) 118.

Finally, it will be noted that Stranding Processor (STRP) 124 may execute the above described process reiteratively and may thereby combine a sequence of three or more strokes into a single stroke by forming consecutive pairs of the sequential strokes into a single stroke and then combining the single strokes formed from pairs of strokes into yet further pairs of strokes. This may be illustrated by reference to the symbol # wherein each of the strokes in this symbol will have been transcribed as three separate strokes. That is, and for example, the upper horizontal stroke of this symbol will have been transcribed as a first stroke extending to the left of the leftmost upright stroke, a second stroke extending between the two upright strokes, and a third stroke extending to the right of the rightmost upright stroke. Stranding Processor (STRP) 124 will join the first and second strokes into a first joined stroke and the second and third strokes into a second joined stroke and will then combine the first and second joined strokes into a third joined stroke which represents the original upper horizontal stroke of the symbol.

c. Cluster Recognizer (CLR) 130 (FIG. 27A)

As indicated in FIG. 27A, TOIP 32 includes a Cluster Recognizer (CLR) 130, again implemented as a Program Routine (PR) 18 executing on Processor Unit (PU) 14, which identifies the Skeletal Image Arcs (SARCs) 42 in each Stroke Array (SA) 118 that are members of a group of one or more strokes which have potential significance as members of clusters of strokes, that is, as characters or parts of a character. Cluster Recognizer (CLR) 130 will form Stroke Clusters (SCs) 110 by identifying those Skeletal Image Arcs (SARCs) 42 whose paths actually connect, that is, those Stroke Descriptors (SDs) 112 that have been used to construct Stranded Stroke Descriptors (SSDs) 114, and, secondly, by identifying those Skeletal Image Arcs (SARCs) 42 whose locations and extents indicate that they are spatially related so as to probably be members of a cluster of strokes forming a character or symbol or a part of a character or symbol.

In the first instance, Cluster Recognizer (CLR) 130 will read the identifiers associated with the Stroke Descriptors (SDs) 112 that have been used in the construction of Stranded Stroke Descriptors (SDs) 114. Cluster Recognizer (CLR) 130 then writes the Stroke Descriptors (SDs) 112 of the Skeletal Image Arcs (SARCs) 42 having a common point of origin, that is, that intersect and have been incorporated into a Stranded Stroke Descriptor (SSD) 114, into a corresponding Stroke Cluster (SC) 110 that is stored in a Cluster Array (CA) 132 corresponding to the Skeletized Image File (SIF) 86 containing the stroke, and in the spatial order of their locations and extents.

In embodiments wherein the Stroke Descriptors (SDs) 112 have not been identified as having been used in the construction of Stranded Stroke Descriptors (SSDs) 114, that is, as have not been identified as intersecting with the strokes of other Stroke Descriptors (SDs) 112, Cluster Recognizer (CLR) 130 reads and compares the coordinates of the end Nodes 90 represented in each Stroke Descriptor (SD) 112 of a Stroke Array (SA) 118 with the coordinates of the end Nodes 90 of the other Stroke Descriptors (SDs) 112 of the Stroke Array (SA) 118. Cluster Recognizer (CLR) 130 identifies the Skeletal Image Arcs (SARCs) 42 having end Nodes 90 sharing identical coordinates as representing Skeletal Image Arcs (SARCs) 42 which have a common point of origin, that is, commonly located end Nodes 90, and writes their Stroke Descriptors (SDs) 112 into a Cluster Array (CA) 132 of Stroke Clusters (SCs) 110.

Cluster Recognizer (CLR) 130 will identify those strokes that do intersect but that have not been selected to constructed stranded strokes, because of selection by minimum angle of intersection, and those strokes not intersect but that have spatial locations and extents such that they probably are members of a Stroke Cluster 100 by determining and comparing the locations and extents of each Skeletal Image Arc (SARC) 42 from the information contained in and read from the corresponding Stroke Descriptors (SDs) 120 of the current Stroke Array (SA) 118. In this regard, two or more Skeletal Image Arcs (SARCs) 42 will be regarded as spatially related such that they are probably members of a cluster when the strokes overlap, or cross, or the when extents of the Skeletal Image Arcs (SARCs) 42 overlap or are sufficiently close wherein the extents of a Skeletal Image Arc (SARC) 42 are determined, in various embodiments of Cluster Recognizer (CLR) 130, by the maximum range of the x or y coordinates of the pixels and end Nodes 90 of the Skeletal Image Arc (SARC) 42.

In one embodiment, Cluster Recognizer (CLR) 130 may determine the extents of a Skeletal Image Arc (SARC) 42 as defined by the x coordinates of the end Nodes 90 of the Skeletal Image Arc (SARC) 42 wherein the x coordinates of the end Nodes 90 of a Skeletal Image Arc (SARC) 42 are the locations of the end Nodes 90 of the Skeletal Image Arc (SARC) 42 along an x axis defined as extending horizontally from left to right across a page. In this implementation, two Skeletal Image Arcs (SARCs) 42 will be regarded as members of a Stroke Cluster (SC) 100 when their x axis extents either overlap or are within a predetermined distance of one another. As has been previously described, this distance may be fixed, or may be determined, for example, as a proportion of the extents of the Skeletal Image Arcs (SARCs) 42.

It is recognized, however, that a long vertical stroke may have greater actual extents than a relatively shorter horizontal stroke, as in the character l opposed to the character e, but that the character e would be determined to have greater extents along the x axis than the character l. Extent determination by consideration of only the x axis coordinates may therefore be insufficient in certain instances and, as such, alternate embodiments of Cluster Recognizer (CLR) 130 will consider both the x and y coordinates of the end Nodes 90 of each Skeletal Image Arc (SARC) 42 to determine and compare the extents of the Skeletal Image Arc (SARC)s 42.

It is also recognized that certain strokes, such as the rightward extending loops of the characters B, D and R, may have greater actual extents that are indicated by the x and y coordinates of their end Nodes 90 and that this may be a significant factor in determining the extents of the Skeletal Image Arcs (SARCs) 42. As such, other alternate embodiments of Cluster Recognizer (CLR) 130 will determine and compare the actual, full extents of each Skeletal Image Arc (SARC) 42 by determining the maximum and minimum x and y axis coordinates of the actual Skeletal Image Arc (SARC) 42 pixel path described in the corresponding Stroke Descriptor (SD) 112.

Finally, Cluster Recognizer (CLR) 130 will write the Stroke Descriptors (SDs) 112 of those Skeletal Image Arcs (SARCs) 42 that are identified as non-intersecting but as probable members of a stroke cluster into the appropriate Stroke Cluster (SC) 110 of the Cluster Array (CA) 132, possibly together with other strokes that have been identified as members because their Skeletal Image Arcs (SARCs) 42 intersect, and again in the order of their spatial locations and extents.

d. Cluster Order Processor (COP) 134

TOIP 32 further includes a Cluster Order Processor (COP) 134, implemented as a Program Routine (PR) 18 executing on Processor Unit (PU) 14, which then reads the Stroke Descriptors (SDs) 112 and Stranded Stroke Descriptors (SSDs) 114 of the Stroke Clusters 110 of each Cluster Array (CA) 132, orders the Stroke Clusters (SCs) 110 of each Cluster Array (CA) 132 into an inferred time order of creation according to the increasing locations of the "centers of mass" of the Stroke Clusters (SCs) 110 along the x axis, and writes the ordered Stroke Clusters (SCs) 110 into a corresponding Ordered Cluster Array (OCA) 44.

The x axis used for the logical ordering of Stroke Descriptors (SDs) 112 and Stranded Stroke Descriptors (SSDs) 114 has been defined as extending horizontally across a page of a document or image and is also used in the ordering of Stroke Clusters (SCs) 110 by Cluster Order Processor (COP) 134. The x axis coordinate sequence that is imposed on the Stroke Clusters (SCs) 110 thereby simulates the time order of creation of the strokes of the original characters from left to right across a page or an image according to the most common convention for writing characters. It will be recognized, however, that any other axis and direction along an axis may be used for both the ordering of Stroke Descriptors (SDs) 112 in a Stroke Cluster (SC) 110 and the order of Stroke Clusters (SCs) 110 in an Ordered Cluster Array (OCA) 44, depending upon the convention preferred for a given document or image.

In one implementation of TOIP 32, Cluster Order Processor (COP) 134 may determine the "center of mass" of each Stroke Cluster (SC) 110 by determining the average of the x-coordinate axis extents of the Skeletal Image Arcs (SARCs) 42 described by the Stroke Descriptors (SDs) 112 and Stranded Stroke Descriptors (SSDs) 114 contained therein by reading the x coordinates of the end Nodes 90 of the Skeletal Image Arcs (SARCs) 42 from the Stroke Descriptors (SDs) 112 and Stranded Stroke Descriptors (SSDs) 114 and finding the average of the values of the maximum and minimum x coordinates found from all of the end Nodes 90 therein. It is recognized, however, that this approach may not provide an accurate representation of the center of mass of certain strokes, for example, the rightwards extending loops of characters such as B, D and R wherein there is little difference between the x coordinates of the end Nodes 90 of the Skeletal Image Arc (SARC) 42 path relative to the actual extents of the path.

For this reason, an alternate and preferred implementation of Cluster Order Processor (COP) 134 will also read the x-y coordinate locations of the pixels along all of the Skeletal Image Arc (SARC) 42 paths described by the Stroke Descriptors (SDs) 112 and Stranded Stroke Descriptors (SSDs) 114 contained in the Stroke Cluster (SC) 110 and determine the maximum and minimum values of x axis coordinates occurring among the pixel paths described by the Stroke Descriptors (SDs) 112 and Stranded Stroke Descriptors (SSDs) 114, thereby more accurately determining the "center of mass" along the x axis of the actual strokes described by the Stroke Descriptors (SDs) 112 and Stranded Stroke Descriptors (SSDs) 114.

In a further alternate implementation, Cluster Order Processor (COP) 134 will accumulate the values of the x coordinates of each of the pixels along the Skeletal Image Arc (SARC) 42 paths described by the Stroke Descriptors (SDs) 112 and Stranded Stroke Descriptors (SSDs) 114 in the Stroke Cluster (SC) 110 and will determine the "center of mass" of the path as the average of the accumulated x axis coordinates. This implementation thereby provides a still more accurate determination of the "center of mass" of the strokes of a given Stroke Cluster (SC) 110, and in particular for strokes having a more complex path, such as the character S created as a single stroke.

As described, Cluster Order Processor (COP) 134 stores the ordered Stroke Clusters (SCs) 110 in Ordered Cluster Arrays (OCAs) 44 and there will be an Ordered Cluster Array (OCA) 44 for and corresponding to each Skeletized Image File (SIF) 86. TOIP 32 then provides the Ordered Cluster Arrays (OCAs) 44 to LLRP 34, which, as described in a following discussion, assigns possible meanings to each Stroke Cluster (SC) 110, this process being repeated for each Ordered Cluster Array (OCA) 44.

Figure 29:
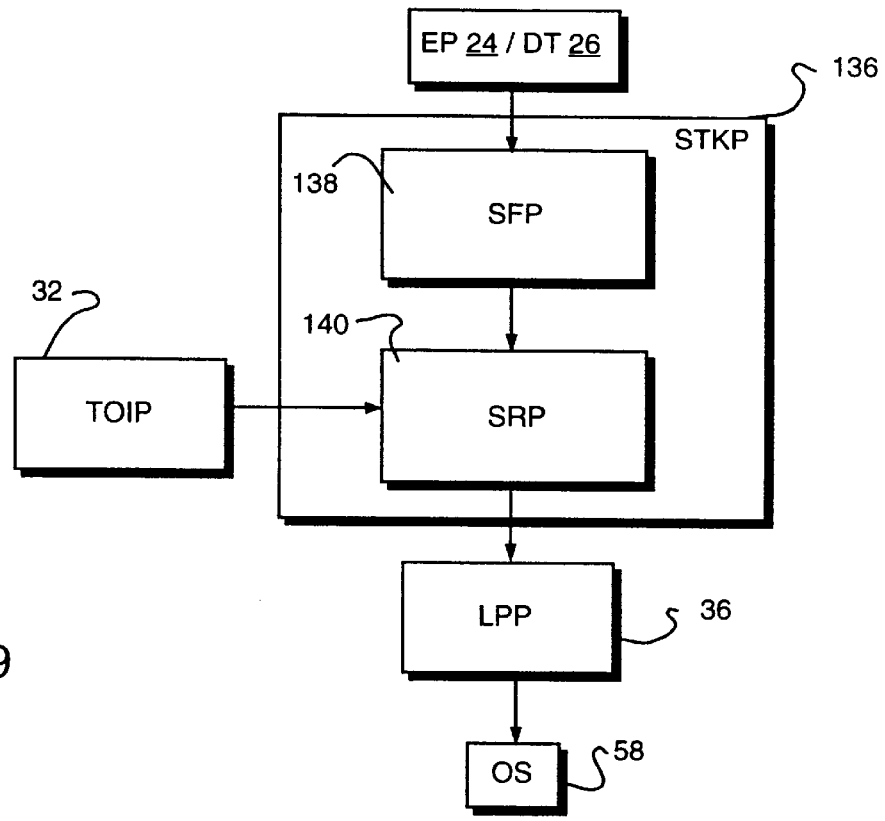
FIG. 29 is a diagrammatic representation of a low level recognition processor.

D. Description of Low Level Recognition Processor (LLRP) 34 (FIG. 29)

As has been described, LLRP 34 is connected from TOIP 32 and from EP 24 and DT 26 to receive and assign possible meanings to both Scanned Character Images from TOIP 32 and "real time" handwritten character inputs from EP 24 and DT 26 wherein the scanned character and symbol data received from TOIP 32 simulates the sampled pen writing coordinates received from EP 24 and DT 26. The possible meanings assigned to the scanned and real time character and symbol inputs are then provided to Linguistic Post Processor (LPP) 36, which generates character strings from the strokes, distinguishes and selects between the possible meanings of the scanned and real time strokes as characters and symbols, and provides as a final output representing the most probable interpretation of each scanned or real time input character.

As has been described above, TOIP 32 provides the scanned character and symbol data to LLRP 34 in the form of Ordered Cluster Arrays (OCAs) 44 wherein there will be an Ordered Cluster Array (OCA) 44 for and corresponding to each Skeletized Image File (SIF) 86. Each Ordered Cluster Array (OCA) 44 contains a Stroke Cluster (SC) 110 for and corresponding to each cluster of strokes is identified in the corresponding Skeletized Image File (SIF) 86 wherein each stroke is described by a corresponding Stroke Descriptors (SDs) 112 or Stranded Stroke Descriptors (SSDs) 114 representing an assumed and imposed direction of movement of a pen in creating the strokes represented therein.

As has also been described previously, EP 24 and DT 26 provide character and symbol data to LLRP 34 in the from of Tablet Characters (TABCs) 46 wherein each Tablet Character (TABC) 46 is comprised of a set of Sampled Coordinates (SCORDs) 48 defining and corresponding to points along the lines forming the Tablet Characters (TABCs) 46 and wherein the Sampled Coordinates (SCORDs) 48 generally correspond to Stroke Descriptors (SDs) 112 or Stranded Stroke Descriptors (SSDs) 114 from TOIP 32.

1. Low Level Recognition of "Real Time" EP 24 and DT 26 Inputs

Figure 30:
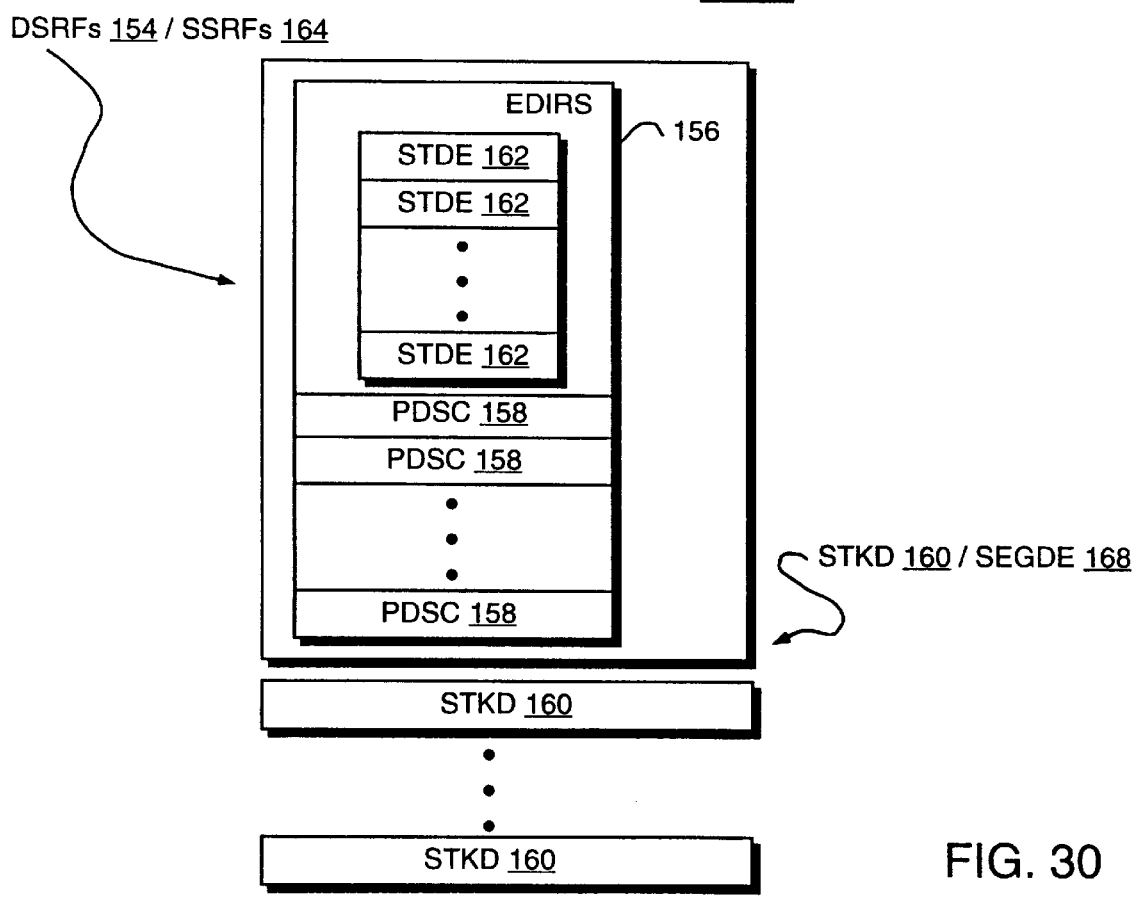
FIG. 30 is a diagrammatic representation of stroke and segment descriptors.

A. Stroke Processor 136, Real Time Character Inputs (FIGS. 29, 30, 31)

First considering the processing of "real time" inputs from EP 24 and DT 26 by LLRP 34, as indicated in FIG. 29 LLRP 34 includes a Stroke Processor (STKP) 136 comprised of a Stroke Feature Processor (SFP) 138 which extracts features to be used in recognizing strokes from the stroke inputs from EP 24 and DT 26 and constructs descriptions of the stroke features and a Stroke Recognition Processor (SRP) 140 which then assigns possible meanings to the strokes based upon the descriptions of the stroke features.

a. Stroke Feature Processor (138) (FIGS. 30 and 31)

Figure 31:
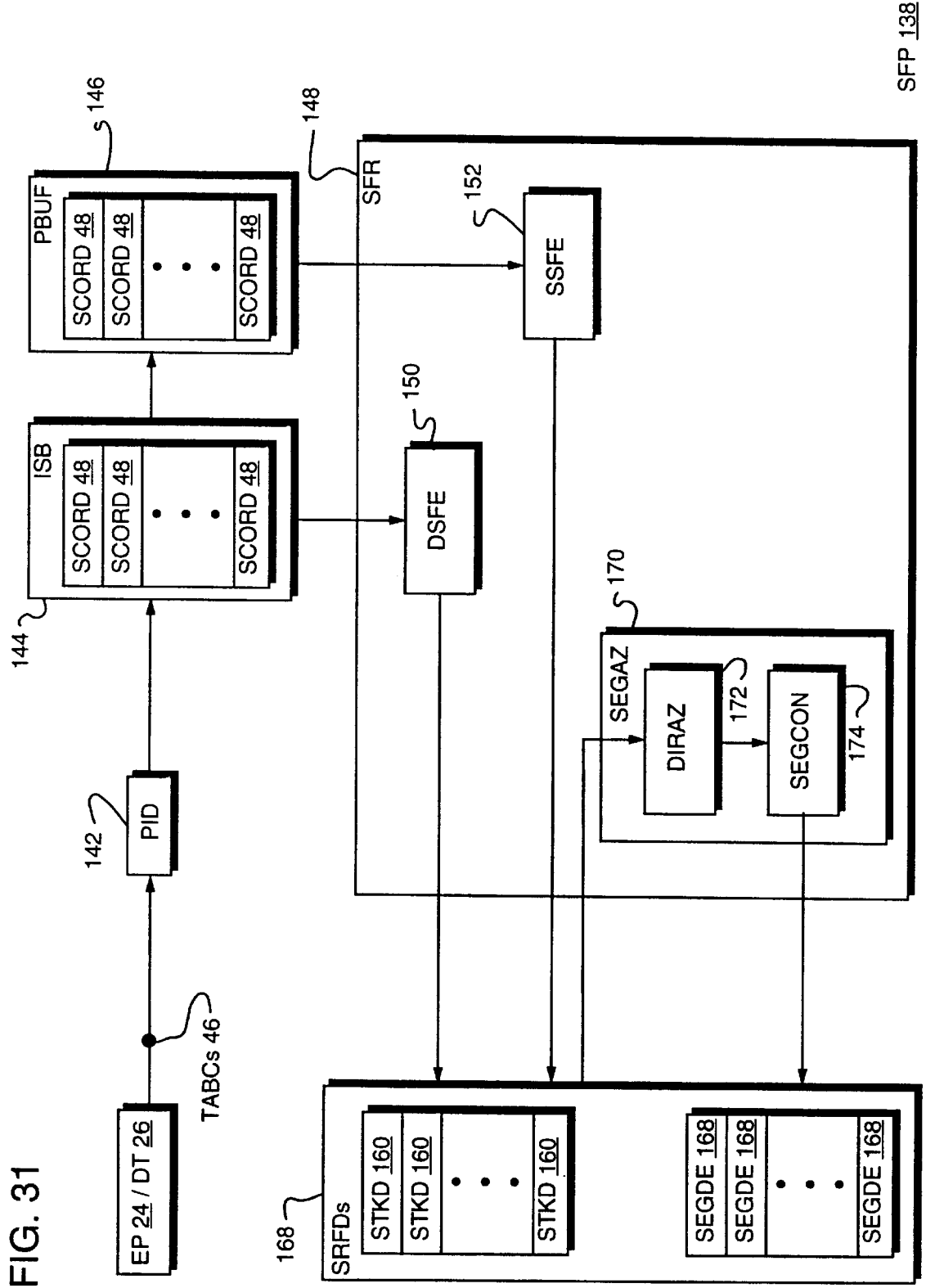
FIG. 31 is a diagrammatic representation of a stroke feature processor.

As shown in FIG. 31, Stroke Feature Processor (SFP) 138 includes a Pen Input Detector (PID) 142 connected from EP 24 and DT 26 for detecting and indicating user inputs through the tablet and pen, wherein the user inputs including pen strokes and pen states. An Input Stroke Buffer (ISB) 144 is connected from Pen Input Detector (PID) 142 for storing the Sampled Coordinates (SCORDs) 48 of TABCs 46 as strokes are entered by a user wherein each Sampled Coordinate (SCORD) 48 is comprised of a set of sampled coordinates representing successive coordinate locations of a pen stroke as the stroke is entered onto DT 26 by EP 24. A Point Buffer (PBUF) 146 is in turn connected from Input Stroke Buffer (ISB) 144 and is responsive to the pen states for transferring the Sampled Coordinate (SCORD) 48 stroke descriptor information of each current stroke into Point Buffer (PBUF) 146 to be stored therein.

Stroke Feature Processor (SFP) 138 further includes a Stroke Feature Recognizer (SFR) 148 connected from Input Stroke Buffer (ISB) 144 and Point Buffer (PBUF) 146 and responsive to the pen states of EP 24 for extracting stroke recognition features from the stroke descriptor information of the current stroke for the purpose of assigning a meaning to the current stroke. As indicated therein, Stroke Feature Recognizer (SFR) 148 includes a Dynamic Stroke Feature Extractor (DSFE) 150 connected from Input Stroke Buffer (ISB) 144 and a Static Stroke Feature Extractor (SSFE) 152 connected from Point Buffer (PBUF) 146.

Dynamic Stroke Feature Extractor (DSFE) 150 is responsive to EP 24 states, such as the pen down state, for extracting Dynamic Stroke Recognition Features (DSRFs) 154 from the stroke descriptor information of the current stroke as the current stroke is entered by the user. As represented in FIG. 30, Dynamic Stroke Recognition Features (DSRFs) 154 include those stroke descriptive features that may be extracted during entry of a stroke by a user, that is, before completion of a stroke. In a present implementation of LLRP 34, Dynamic Stroke Recognition Features (DSRFs) 154 may include, for example, at least the coordinates of the first point of the line, a sequence of points along the line, short of the last point of the line, and an Entered Direction String (EDIRS) 156, all of which are stored in a corresponding Descriptor (DESC) 218. The coordinates of the points along the line are stored in corresponding Point Descriptors (PDSCs) 158 of the Descriptor (DESC) 218 and the Entered Direction String (EDIRS) 156 of a Descriptor (DESC) 218 includes a Stroke Direction Entry (STDE) 162 for each point of the line, as entered, wherein each Stroke Direction Entry (STDE) 162 indicates the direction of movement of the line of the stroke at the point. The direction of movement of the line at each point is determined by the motion of EP 24 at the point and is determined, for example, by the incremental change in the x-y location coordinates of EP 24 at the point as EP 24 passes through that point from the preceding point to the next point. In the present implementation of Dynamic Stroke Feature Extractor (DSFE) 150, the direction of motion of EP 24 is resolved to four directions, that is, left, right, up and down, and is determined by whether the maximum change in the x-y coordinates of the EP 24 location occurs in the x or y axis and in which direction the maximum change occurs, that is, whether the maximum change is in the + or − direction along that axis. In other implementations of Dynamic Stroke Feature Extractor (DSFE) 150, the direction of motion may be resolved to higher resolutions if necessary for consistent and accurate identification of the characters and symbols. For example, and as will be well understood by those of ordinary skill in the art, the direction of motion of EP 24 may easily be resolved to the 8 directions comprising left, left-up, up, up-right, right, right-down, down, and down-left by noting the magnitude of change in the location of EP 24 along the x and y axis and determining the simple ratio of these magnitudes, rounded to the 90° and 45° angles comprising these directions.

Static Stroke Feature Extractor (SSFE) 152 is connected from Point Buffer (PBUF) 146 and is responsive to the EP 24 states, such as the pen up state, for extracting Static Stroke Recognition Features (SSRFs) 164 of the current stroke when the current stroke is completed and writing these features into the corresponding Descriptor (DESC) 218. As represented in FIG. 30, Static Stroke Recognition Features (SSRFs) 164 will include at least the coordinates of the last point along the line of the current stroke and the Stroke Direction Entry (STDE) 162 corresponding to the last point along the line of the current stroke and may include up to all of the stroke recognition features that are extracted by Dynamic Stroke Feature Extractor (DSFE) 150. That is, that Dynamic Stroke Recognition Features (DSRFs) 154 are a subset of Static Stroke Recognition Features (SSRFs) 164 and, in certain implementations of LLRP 34 Static Stroke Feature Extractor (SSFE) 152 may perform all of the stroke recognition feature extraction operations performed by Dynamic Stroke Feature Extractor (DSFE) 150. Dynamic Stroke Feature Extractor (DSFE) 150 is provided in the presently preferred embodiment of LLRP 34, however, to decrease the time required to extract the stroke recognition features from a current stroke by allowing at least some of the stroke recognition features to be extracted while the stroke is being entered, rather than waiting until after the stroke is completed.

As shown in FIG. 31, the Stroke Descriptors (STKDs) 160 generated by Dynamic Stroke Feature Extractor (DSFE) 150 and Static Stroke Feature Extractor (SSFE) 152 and comprising Dynamic Stroke Recognition Features (DSRFs) 154 and Static Stroke Recognition Features (SSRFs) 164 are stored in a Stroke Recognition Feature Data Structure (SRFDS) 166.

For purposes of following stroke recognition steps, which will described below, each stroke is then divided into one or more segments which are each described in a corresponding Segment Descriptor (SEGDE) 168 and wherein a segment of a stroke is defined herein as a portion of a stroke that is essentially straight or a relatively even curve; that is, a segment of a stroke is a portion of a stroke does not contain a change in direction of movement of the line of the stroke. A segment of a stroke is thereby a portion of a stroke that does not contain a significant or abrupt change of direction and is bounded on one or both ends by either the end of the stroke or a point wherein the stroke has a significant or abrupt change of direction.

For this reason, Stroke Feature Extractor (SFR) 148 further includes a Segment Analyzer (SEGAZ) 170 to read the Stroke Descriptors (STKDs) 160 from Stroke Recognition Feature Data Structure (SRFDS) 166, to identify segments of each stroke, and to generate corresponding Segment Descriptors (SEGDs) 166. These operations are performed by a Direction Analyzer (DIRAZ) 172 and a Segment Constructor (SEGCON) 174 contained in Segment Analyzer (SEGAZ) 170.

Direction Analyzer (DIRAZ) 172 reads the Descriptor (DESC) 218 of a current stroke and identifies changes in the direction of movement of the line of a stroke wherein a change in direction of movement of the line of a stroke occurs when an angle between any two consecutive sections of the line of the stroke as defined by the line of the stroke between and connecting three consecutive points along the line of the stroke exceeds a predetermined boundary. The boundary is defined by a boundary cone defined by boundary cone lines extending from the first one of the three points in the direction of movement of the pen at that point and the angle between the cone lines, and thus the boundary, is defined by predetermined displacements along the coordinate axis orthogonal to the coordinate axis along the direction of movement of the pen at that point.

Segment Constructor (SEGCON) 174, in turn, is responsive to Direction Analyzer (DIRAZ) 172 for dividing the line of a stroke into two segments at any point wherein there is a change of direction of the line of the stroke that exceeds the cone boundary by inserting an additional point at such a change in direction of the line of a stroke and generating corresponding Segment Descriptors (SEGDEs) 168 for each of the newly generated segments of the stroke. This additional point is located at the end point of the segment before the change in direction of the line of the stroke and operating as the beginning point of the segment following the change in direction of the line of the stroke. A Segment Descriptor (SEGDE) 168 correspondingly includes at least the coordinates of a beginning point of the segment and an end point of the segment and may include the coordinates of one or more other intermediate points along the segment, thereby including a portion of the stroke's Point Descriptor (PDSC) 158, and will include the portion of the Entered Direction String (EDIRS) 156 corresponding to the points in the segment. It is therefore apparent that, as illustrated in FIG. 30, a Segment Descriptor (SEGDE) 168 is essentially equivalent to a Descriptor (DESC) 218 or, alternately, that a Descriptor (DESC) 218 is a Segment Descriptor (SEGDE) 168 for a stroke comprised of a single segment.

The segment recognition features extracted from each current stroke are stored in a Stroke Recognition Feature Data Structure (SRFDS) 166 wherein, as described, the stroke recognition features describe each segment with variable degrees of hierarchical approximation for subsequent stroke and segment recognition processing, which will be described next below.

The hierarchical levels of stroke and segment description stored in Stroke Recognition Feature Data Structure (SRFDS) 166 therefor begin with a direction string indicating, for points along the line of the stroke or segment, the direction of movement of the line of the stroke at each point and further include the coordinates of at least the beginning and end points of the line of the stroke or segment of a stroke and an array of coordinates of all points along the line of the stroke or segment as received as input coordinates from the tablet.

Figure 32:
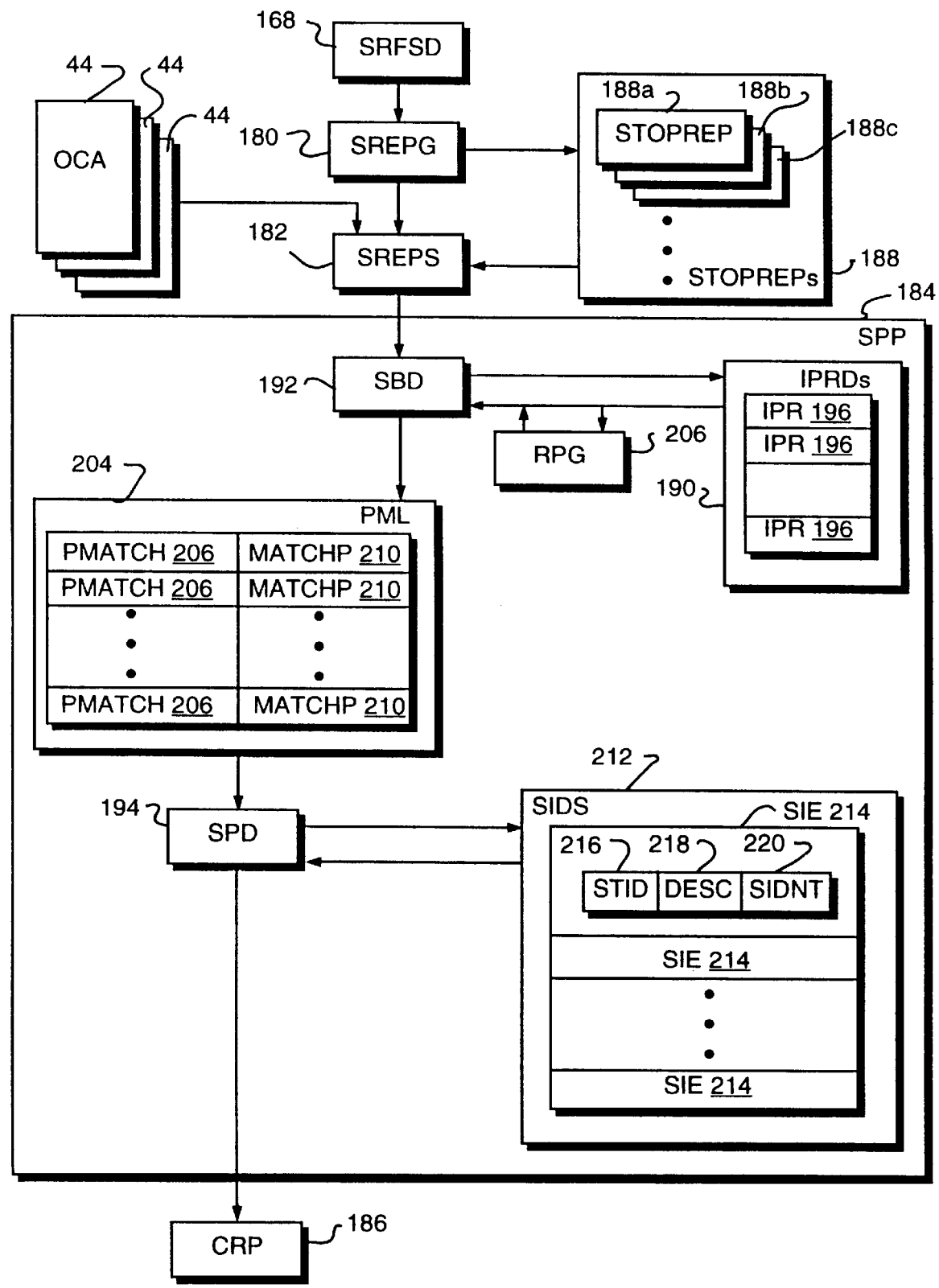
FIG. 32 is a diagrammatic representation of a stroke representation generator, a stroke representation selector and a stroke proportion discriminator.

B. Stroke Recognition Processor (SRP) 140, Real Time and Scanned Character Inputs As shown in FIGS. 29, 31 and 32 and as will be described below, the two handwritten character recognition paths of the system of the present invention, that is, the path taken by "real time" character inputs from EP 24 and DT 26 and through Stroke Feature Processor (SFP) 138 and the path followed by scanned image inputs from Image Scanner (IS) 22 and through Scanned Image Thinning Processor (SITP) 30 and Time Order Induction Processor (TOIP) 32, converge in Stroke Representation Processor (SRP) 140. Thereafter, the handwritten characters and symbols from both sources are subsequently processed in the same manner.

As represented in FIG. 32, Stroke Recognition Processor (SRP) 140 is comprised of a Stroke Representation Generator (SREPG) 180, a Stroke Representation Selector (SREPS) 182, a Stroke Proportion Processor (SPP) 184 and a Cluster Recognition Processor (CRP) 186.

As will be described below, Stroke Representation Generator (SREPG) 180 generates representations of each real time character input from stroke or segment from Stroke Descriptors (STKDs) 160 and Segment Descriptors (SEGDs) 166 from Stroke Recognition Feature Data Structure (SRFDS) 168 while Stroke Representation Selector (SREPS) 182 which receives the real time character representations from Stroke Representation Generator (SREPG) 180 and the scanned character representations from SITP 30 and TOIP 32 and selects an optimum representation of each stroke. Stroke Proportion Processor (SPP) 184 is connected from Stroke Representation Selector (SREPS) 182 and identifies possible meanings of the selected representation of each stroke or segment. Cluster Recognition Processor (CRP) 186 then assigns meanings to the strokes and segments as clusters forming characters and symbols or parts of characters and symbols and provides this information to LPP 36.

In his regard, and as will be described below, in the presently preferred implementation of LLRP 34, Stroke Representation Processor (SRP) 176, and in particular Stroke Proportion Processor (SPP) 184, stores a single copy of each of a plurality of idealized representations of strokes while Stroke Representation Generator (SREPG) 180 and TOIP 32 generate multiple versions of, respectively, each current real time input stroke and each scanned input stroke, for comparison to the idealized representations to identify possible meanings of the current real time input stroke. This method is chosen as requiring significantly less memory and data storage space than would be required for storing multiple copies of the idealized representations of each possible input stroke or segment and comparing a single copy of each input stroke or segment to the multiple, idealized representations of each possible input stroke or segment. This method also requires less processing resources and is faster than using a single copy of an input stroke and generating multiple, idealized copies of each possible input as required, that is, during the recognition process.

C. Stroke Representation Generator (SREPG) 180

Stroke Representation Generator (SREPG) 180 reads the Stroke Descriptor (STKD) 160 or Segment Descriptor (SEGD) 166 representation of each stroke or segment from Stroke Recognition Feature Data Structure (SRFDS) 168 and generates multiple representations of each input stroke or segment from the corresponding stroke and segment feature descriptions by generating a plurality of Scaled Topological Representations (STOPREPs) 188 of each stroke. Each Scaled Topological Representation (STOPREP) 188 is one of a plurality of progressively smoothed representations of the current stroke generated from the stroke representation features of the current stroke and each Scaled Topological Representation (STOPREP) 188 is generated from a preceding Scaled Topological Representation (STOPREP) 188 reduction, or combination, of the number of points representing the stroke or segment.

A first and highest resolution Scaled Topological Representation (STOPREP) 188, for example, would be comprised of the representation of a stroke or segment as originally represented in the corresponding Descriptor (DESC) 218 or Segment Descriptor (SEGD) 166 and would include the Descriptor (DESC) 218's or Segment Descriptor (SEGD) 166's Point Descriptors (PDSCs) 158, representing all of the points originally defining the stroke or segment, and the Entered Direction String (EDIRS) 156, comprising the direction string of the stroke or segment. A second and coarser Scaled Topological Representation (STOPREP) 188 would be generated, for example, by selecting every fourth point from the Descriptor (DESC) 218 or Segment Descriptor (SEGD) 166 representing the stroke or segment, but including the first and last points of the stroke or segment, and would thereby include correspondingly scaled versions of the Point Descriptors (PDSCs) 158 and the Entered Direction String (EDIRS) 156. The next coarser Scaled Topological Representation (STOPREP) 188 would then be generated from the preceding second Scaled Topological Representation (STOPREP) 188 by selecting each fourth point in that preceding second Scaled Topological Representation (STOPREP) 188, again using at least the first and often the last points of the preceding Scaled Topological Representation, and so on, and would thereby include correspondingly scaled versions of the Point Descriptors (PDSCs) 158 and the Entered Direction String (EDIRS) 156.

The present implementation of Stroke Representation Generator (SREPG) 180 generates three Scaled Topological Representations (STOPREPs) 188, represented respectively as Scaled Topological Representations (STOPREPs) 188a, 188b and 188c, with the finest resolution Scaled Topological Representation (STOPREP) 188a being comprised of all of the points of the stroke or segment as originally defined in the corresponding Descriptor (DESC) 218 or Segment Descriptor (SEGD) 166. Each succeeding Scaled Topological Representation (STOPREP) 188 will then be a progressively "smoother" and simpler representation of the stroke or segment being represented in the sense that each successive Scaled Topological Representation (STOPREP) 188 will be represented by successively fewer points and will include progressively fewer fine details of the stroke or segment.

D. Stroke Representation Selector (SREPS) 182, Joining and Selection of Real Time and Scanned Character Inputs It will therefore be apparent that the function performed by Stroke Representation Generator (SREPG) 180 is analogous to, although different in operation from, Scanned Image Thinning Processor (SITP) 30. As was described with respect to SITP 30, SITP 30 "thins" each stroke or segment a scanned character or symbol image to a width of one pixel, and then generates a plurality of representations of each such stroke or segment at differing resolutions, such as 302, 150 and 75 dpi. Each resolution of a stroke or segment provided by SITP 30 thereby provides a progressively "smoother" and simpler representation representing the stroke with progressively fewer pixels and with progressively fewer fine details. It will be noted that it is not necessary for Stroke Representation Generator (SREPG) 180 to perform a "thinning" operation as the "real time" character input from EP 24 and DT 26 is in the form of a sequence of x-y coordinate positions, so that the "real time" stroke and segment inputs are already effectively in the form of single pixel wide strokes and segments when received from EP 24 and DT 26 by LLRP 34.

Further, the stroke and segment representations provided to Stroke Representation Selector (SREPS) 182 from the two paths are similar. As described just above, Stroke Representation Generator (SREPG) 180 generates representations of each stroke or segment of the "real time" inputs, wherein each stroke or segment is represented by a corresponding Descriptor (DESC) 218 or Segment Descriptor (SEGD) 166. Each Descriptor (DESC) 218 and Segment Descriptor (SEGD) 166 is comprised of an Entered Direction String (EDIRS) 156 indicating, for points along the line of the stroke or segment, the direction of movement of the line of the stroke at each point, and Point Descriptors (PDSCs) 158, comprising the coordinates of at least the beginning and end points of the line of the stroke or segment of a stroke and an array of coordinates of points along the line of the stroke or segment.

In comparison, and as has been described previously, TOIP 32 provides the scanned character representations to LLRP 34 in the form of Ordered Cluster Arrays (OCAs) 44 wherein there will be an Ordered Cluster Array (OCA) 44 for and corresponding to each Skeletized Image File (SIF) 86. Each Ordered Cluster Array (OCA) 44 contains a Stroke Cluster (SC) 110 for and corresponding to each cluster identified in the Skeletized Image File (SIF) 86 wherein each stroke is described by a corresponding Stroke Descriptor (SD) 112 of Stranded Stroke Descriptor (SSD) 114 as an ordered array of coordinates defining and corresponding to points along the stroke, that is, by a Link List of Incremental Steps (LLIS) 98, and a corresponding Induced Direction String (IDIRS) 120 representing an assumed and imposed direction of movement of a pen in creating the stroke.

Stroke Representation Selector (SREPS) 182 examines the Scaled Topological Representations (STOPREPs) 188 of the "real time" character and symbol stroke and segment inputs from EP 24 and DT 26 and the Ordered Cluster Arrays (OCAs) 44 from TOIP 32 and selects a scaled topological representation of a stroke to provide the optimum representation of the stroke or segment wherein the optimum representation is defined as providing the "maximum signal to noise ratio". For purposes of stroke or segment recognition herein, the representation providing the "maximum signal to noise" ratio is defined is the representation which occupies the largest area of the x-y coordinate plane containing the locations of the points of the stroke or segment. In the selected representation, therefore, the pixels or points occupied by "white" background space and "black" line points is maximized with respect to the number of pixels or points occupied by minor or extraneous features or pixels and the apparent sharpness of curvature of each curved stroke or segment is reduced because the curve occupies a long space in the representation of the stroke or segment.

E. Stroke Proportion Processor (SPP) 184

As described above, Stroke Proportion Processor (SPP) 184 is connected from Stroke Representation Selector (SREPS) 182 and, as shown in FIG. 32, includes a Ideal Prototype Representation Data Structure (IPRDS) 190, a Stroke Boundary Discriminator (SBD) 192 and a Stroke Proportion Discriminator (SPD) 194 which operate to identify possible meanings of the selected representation of each stroke or segment as an element of a character or symbol.

Figure 33:
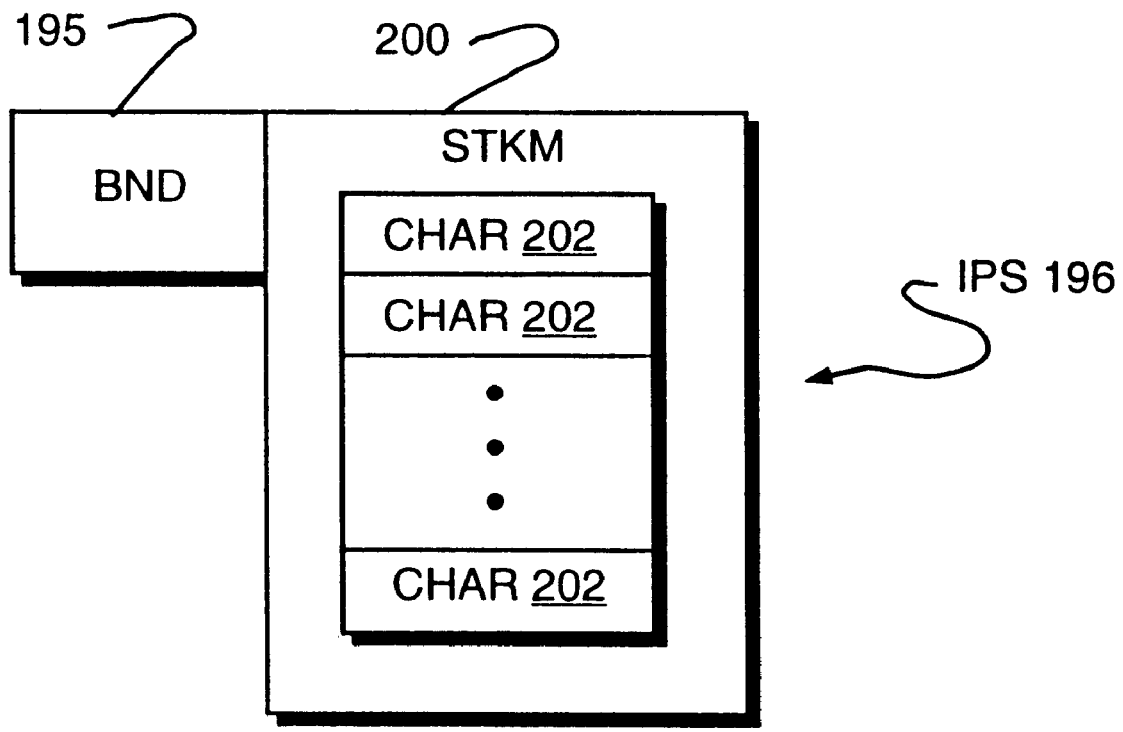
FIG. 33 is a diagrammatic representation of an ideal prototype representation.

Ideal Prototype Representation Data Structure (IPRDS) 190 stores a set of Ideal Prototype Representations (IPRs) 196 corresponding to possible meanings of each possible stroke or stroke segment as elements of characters or symbols. In the present implementation of Stroke Proportion Processor (SPP) 184, Ideal Prototype Representation Data Structure (IPRDS) 190 is implemented as a B-tree database structure wherein the nodes and leafs of the tree are indexed by Entered Direction Strings (EDIRSs) 156 of the Stroke/Segment Descriptors (STDKs 160/SEGDEs 168) and the Induced Direction Strings (IDIRSs) 120 of Stroke/Stranded Stroke Descriptors (SDs 112/SSDs 114) of the strokes and segments. As illustrated generally in FIG. 33, the tree node and leaf entries of Ideal Prototype Representation Data Structure (IPRDS) 190 that comprise Ideal Prototype Representations (IPRs) 196, each of which corresponds to an ideal prototype representation possibly matching a current stroke or segment, contain Boundary Descriptors (BNDs) 198 and corresponding Stroke Meanings (STKMs) 200 wherein each Stroke Meaning (STKM) 200 identifies one or more characters or symbols, each of which is referred to in FIG. 32 as a Character (CHAR) 202 that the corresponding stroke or segment may be an element of.

Each Boundary Descriptor (BND) 198 defines one or more linear combinations of one or more features of an ideal prototype representation of a stroke, such as a set of coordinates along the line of the ideal prototype stroke wherein each linear combination of features, in turn, is an idealized and abstracted representation of a stroke or segment. Each Boundary Descriptor (BND) 198 thereby identifies a set of "boundaries" for each idealized prototype stroke or segment wherein a "boundary" is a set of stroke or segment characteristics, expressed in terms of the coordinates of an idealized representation of a stroke or segment, defining the relative orientation, length and degree or direction of curvature of the prototype stroke or segment. The representations of the prototype strokes and segments, that is, the groups of coordinates describing the lines of the strokes and segments, are constructed to a uniform scale and coordinate system. For example, the representations of the upright strokes and loops of the characters L, R and B and l, r and b, and so on, are all sized proportionally with respect to one another and the coordinates describing the locations along the line of each prototype stroke or segment are abstracted in being relative to an origin local to the stroke or segment, such as an end point of the stroke or segment, with the coordinates of the other points along the stroke or segment being determined relative to that local origin.

Stroke Boundary Discriminator (SBD) 192 is responsive to a scaled topological representation of a current stroke, that is, to a Descriptor (DESC) 218, Segment Descriptor (SEGDE) 168, Stroke Descriptor (SD 112) or Stranded Stroke Descriptor (SSD 114) received from Stroke Representation Selector (SREPS) 182 to index Ideal Prototype Representation Data Structure (IPRDS) 190 with the Entered Direction String (EDIRS) 156 or Induced Direction Strings (IDIRSs) 120 contained therein and to construct a Possible Stroke Match List (PML) 204 of Possible Matches (PMATCHs) 206 corresponding to part or all of the Entered Direction String (EDIRS) 156 of the current stroke or segment wherein each Possible Match (PMATCH) 206 includes the Boundary Descriptors (BNDs) 198 and Stroke Meanings (STKMs) 200 with their corresponding Characters (CHARs) 202.

In this regard, it should be noted that the presently preferred embodiment of Stroke Proportion Processor (SPP) 184 further includes a Reversed Prototype Generator (RPG) 208 which generates, from and for each Ideal Prototype Representation (IPR) 196, a corresponding Reversed Ideal Prototype Representation (IPR) 210 having a reversed direction string, so that the Entered Direction String (EDIRS) 156 or Induced Direction Strings (IDIRSs) 120 of a stroke or segment received from Stroke Representation Selector (SREPS) 182 is compared to both the forward and reversed direction strings of possible matching entries in Ideal Prototype Representation Data Structure (IPRDS) 190.

Stroke Boundary Discriminator (SBD) 192 then compares the topological representation of each current stroke or segment, that is, the direction string and line point coordinates of each current stroke or segment, with the boundaries of the ideal prototype representations of the Possible Matches (PMATCHs) 206 in Possible Stroke Match List (PML) 204 and determines the degree of match between the current stroke or segment and the ideal prototype representations of Possible Matches (PMATCHs) 206.

This comparison process can be implemented in a number of ways. For example, Stroke Boundary Discriminator (SBD) 192 perform a direct comparison by scaling the topological representation of the current stroke or segment, that is, the direction string and set of point coordinates of the line of the stroke or segment, into the scale and coordinate system in which the ideal prototype representations are constructed. In this implementation, Stroke Boundary Discriminator (SBD) 192 would select an origin point of the topological representation of the current stroke or segment that most closely matches the origin point of the prototype representation, determine the ratio between maximum and minimum x and y coordinate deviations of the coordinates of the points of the topological representation of the current stroke or segment and of the prototype.

Stroke Boundary Discriminator (SBD) 192 will then convert the coordinates of the topological representation into a coordinate system centered on the selected origin point, and determine the coordinates of the topological representation relative to that origin, but scaled in proportion to the ratio between maximum and minimum x and y coordinate deviations of the coordinates of the points of the topological representation of the current stroke or segment and of the prototype. Stroke Boundary Discriminator (SBD) 192 may also scale the Entered Direction String (EDIRS) 156 of the topological representation in the same manner, inserting steps in the Entered Direction String (EDIRS) 156 so as to achieve the closest proportionate match with the direction string of the prototype.

Stroke Boundary Discriminator (SBD) 192 will then compare the scaled topological representation with each Possible Match (PMATCH) 206 and determine the degree of match between the representations. The degree of match, in turn, may be determined, for each Possible Matches (PMATCHs) 206 in the Possible Stroke Match List (PML) 204, by determining the coordinate deviation, or difference, between each coordinate point of the scaled topological representation and the closest matching coordinate point of each of a prototype representation and by comparing the number of matching steps in the two direction strings. The degree of match then represents, for each idealized prototype represented in Possible Matches (PMATCHs) 206 in Possible Stroke Match List (PML) 204, the probability that a given prototype in the Possible Stroke Match List (PML) 204 matches the current stroke or segment, and thus that the current stroke or segment has the meaning associated with that prototype.

In an alternate embodiment, Stroke Boundary Discriminator (SBD) 192 may perform a proportional comparison by identifying the end points of the topological representation, selecting an end point of the topological representation most closely matching the origin point of the prototype representation as an origin point of the topological representation, and identifying the points of the topological and prototype representations having the maximum x and y coordinate deviations. Stroke Boundary Discriminator (SBD) 192 will then scale the coordinates of these points of the topological representation into the scale and coordinate system in which the ideal prototype representations are constructed. Stroke Boundary Discriminator (SBD) 192 will then determine the relative proportions of the topological representation of the current stroke or segment and each of the idealized prototypes represented in the Possible Stroke Match List (PML) 204. The relative proportions of the topological representation and each of the idealized prototypes represented in the Possible Stroke Match List (PML) 204 are found by determining the proportionality, or ratio, between the x and y extents of the identified points of the topological representation and each prototype representation, wherein the x and y extents define a coordinate frame which in turn represents the overall length and curvature of the representations. The proportionality so determined for each prototype representation represented in the Possible Stroke Match List (PML) 204 will thereby provide one measure of the degree of match between the topological representation of the current stroke or segment and each prototype representation represented in the Possible Stroke Match List (PML) 204. Stroke Boundary Discriminator (SBD) 192 will generally also compare the direction strings of the topological representation and each prototype representation represented in the Possible Stroke Match List (PML) 204, thereby providing another measure of the degree of match between the topological representation of the current stroke or segment and each prototype representation represented in the Possible Stroke Match List (PML) 204.

The proportionality or the combination of the proportionality and the comparison of the direction strings may then be used to determine, for each prototype representation represented in the Possible Stroke Match List (PML) 204, a Match Probability (MATCHP) 210 that a given prototype in the Possible Stroke Match List (PML) 204 matches the current stroke or segment, and thus that the current stroke or segment has the meaning associated with that prototype. Stroke Boundary Discriminator (SBD) 192 then writes each Match Probability (MATCHP) 210 into the corresponding Possible Match (PMATCH) 206 in Possible Stroke Match List (PML) 204.

Stroke Proportion Discriminator (SPD) 194 then reads the Possible Matches (PMATCHs) 206 from Possible Stroke Match List (PML) 204 and determines, from the Match Probabilities (MATCHPs) 210 determined for each current stroke or segment, the one or more ideal prototypes most closely matching the current stroke or segment and assigns to the current stroke the identification of an ideal prototype representation having boundaries matching the scaled topological representation of the current stroke, an assigned identification of the matching ideal prototype representation representing a stroke meaning assigned to the current stroke.

Stroke Proportion Discriminator (SPD) 194 then constructs a Stroke Identifier Data Structure (SIDS) 212 containing a Stroke Identifier Entry (SIE) 214 for each of the Possible Matches (PMATCHs) 206 selected as most closely matching the current stroke or segment. Each Stroke Identifier Entry (SIE) 212 is identified by a Stroke Identifier (STID) 216 and includes a Descriptor (DESC) 218 the corresponding stroke's or segment's Descriptor (DESC) 218, Segment Descriptor (SEGDE) 168, Stroke Descriptor (SD 112) or Stranded Stroke Descriptor (SSD 114), and one or more Stroke Identities (SIDNTs) 220, each of which contains a Stroke Meaning (STKM) 200 with its Characters (CHARs) 202, and corresponding Match Probability (MATCHP) 210 of a stroke meaning most closely matching the corresponding current stroke or segment. The Stroke Identifier (STID) 216 of each current stroke or segment is passed, in turn, to Cluster Recognition Processor (CRP) 186.

Before proceeding to a discussion of Stroke Cluster Processor (CRP) 186, it should first be noted that it was described above that Stroke Representation Selector (SREPS) 182 selects a single optimum representation of each current stroke or segment to be passed to Stroke Proportion Processor (SPP) 184 for identification of possible meanings of the stroke or segment as an element of a character or symbol. In other applications, however, such as those dealing with less clearly defined and written characters, Stroke Representation Selector (SREPS) 182 may pass each of the Scaled Topological Representations (STOPREPs) 188 of a current stroke or segment to Stroke Proportion Processor (SPP) 184 and Stroke Proportion Processor (SPP) 184 will perform the above described meaning identification operation upon each of the plurality of scale representations of a current stroke or segment to determine both possible meanings of the current stroke or segment and the scale of the Scaled Topological Representations (STOPREPs) 188 that provides optimum identification results. In this regard, the optimum scale of the Scaled Topological Representations (STOPREPs) 188 is determined as the particular scale that provides the fewest number of highest probability matches between the current stroke or segment and the ideal prototype representations. Having identified an optimum scale of Scaled Topological Representations (STOPREPs) 188 for an initial current stroke or segment, or a sample set of initial current stroke or segments, Stroke Proportion Processor (SPP) 184 will identify the optimum scale to Stroke Representation Selector (SREPS) 182 and Stroke Representation Selector (SREPS) 182 will thereafter pass to Stroke Proportion Processor (SPP) 184 the Scaled Topological Representations (STOPREPs) 188 in that scale.

2. Cluster Recognition Processor (CRP) 186 (FIG. 34)

As described just above, Stroke Proportion Processor (SPP) 184 passes the Stroke Identifiers (STIDs) 216 of each current stroke or segment to Cluster Recognition Processor (CRP) 186. The Stroke Identifiers (STIDs) 216 are passed to Cluster Recognition Processor (CRP) 186 in the time order of their entry wherein, as has been described, the time order of entry of each current stroke may be the "real time" order of the stroke's creation through EP 24 and DT 26, or an induced time order of creation.

Figure 34:
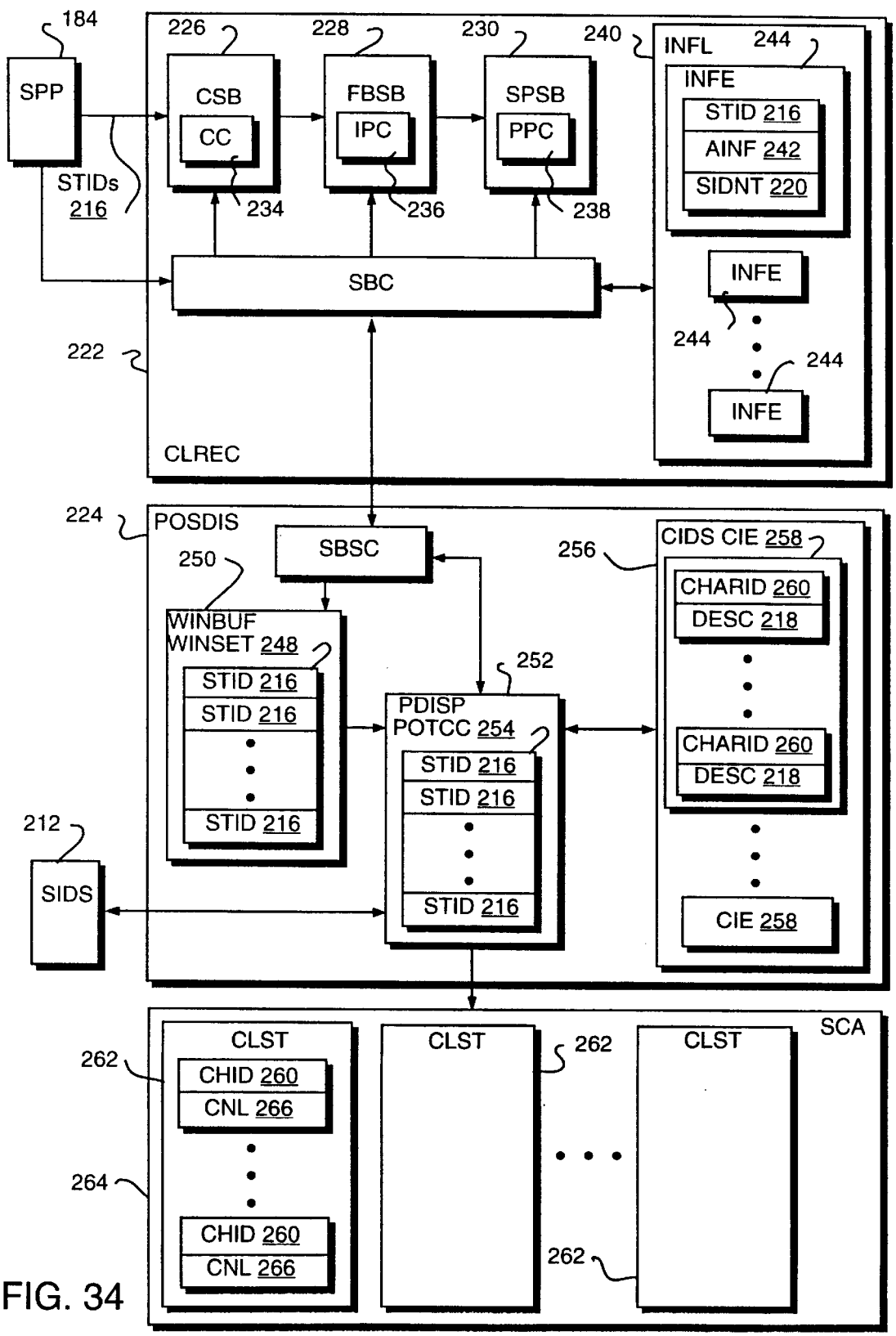
FIG. 34 is a diagrammatic representation of a cluster recognition processor.

As shown in FIG. 34, Cluster Recognition Processor (CRP) 186, in turn, includes a Cluster Recognizer (CLREC) 222 for ordering strokes in time and spatial sequence and forming meaningful clusters of strokes or segments, that is, as possible characters or symbols or parts of characters or symbols, and a Position Discriminator (POSDIS) 224, which assigns meanings to clusters of strokes as characters or symbols.

Cluster Recognizer (CLREC) 222 includes a Current Stroke Buffer (CSB) 226, a First Previous Stroke Buffer (FPSB) 228, a Second Previous Stroke Buffer (SPSB) 230 and a Stroke Buffer Controller (SBC) 232. Current Stroke Buffer (CSB) 226 is connected from Stroke Proportion Processor (SPP) 184 for receiving and storing the Stroke Identifiers (STIDs) 216 of a Current Cluster (CC) 234 of strokes in the order received from Stroke Proportion Processor (SPP) 184 wherein the number of strokes represented in a Current Cluster (CC) 234 is sufficient to comprise at least the maximum number of strokes expected to comprise a single character or symbol. First Previous Stroke Buffer (FPSB) 228, in turn, stores the Stroke Identifiers (STIDs) 216 of an Immediately Preceding Cluster (IPC) 236 of strokes, that is, a set or cluster of strokes that immediately precede the strokes represented in Current Stroke Buffer (CSB) 226 and that have been identified as actually or potentially comprising a character or symbol of the Current Cluster (CC) 234 of strokes and which comprise a cluster of one or more strokes that have been identified as actually or potentially comprising a character or symbol. Second Previous Stroke Buffer (SPSB) 230, in turn, stores the Stroke Identifiers (STIDs) 216 of an Previously Preceding Cluster (PPC) 238 of strokes, that is, a set or cluster of strokes that immediately precede the strokes represented in First Previous Stroke Buffer (FPSB) 228 and that have been identified as actually or potentially comprising a character or symbol.

Stroke Buffer Controller (SBC) 232 is connected from Stroke Proportion Processor (SPP) 184 and is responsive to each Stroke Identifier (STID) 216 received from Stroke Proportion Processor (SPP) 184 for ordering and organizing the Stroke Identifiers (STIDs) 216 of current and previous strokes among Current Stroke Buffer (CSB) 226, First Previous Stroke Buffer (FPSB) 228 and Second Previous Stroke Buffer (SPSB) 230. Stroke Buffer Controller (SBC) 232 orders the Stroke Identifiers (STIDs) 216 in Current Stroke Buffer (CSB) 226, First Previous Stroke Buffer (FPSB) 228 and Second Previous Stroke Buffer (SPSB) 230 according to the order the strokes are received from Stroke Proportion Processor (SPP) 184 and among Current Stroke Buffer (CSB) 226, First Previous Stroke Buffer (FPSB) 228 and Second Previous Stroke Buffer (SPSB) 230 according to the potential membership of the strokes in clusters that actually or potentially comprise characters of symbols.

Stroke Buffer Controller (SBC) 232 also constructs an Influence List (INFL) 240 wherein the strokes of Current Cluster (CC) 234 are ordered according to their spatial coordinates and extents, for example, from left to right along the x, or horizontal, axis of a page. Stroke Buffer Controller (SBC) 232 thereby operates to order the strokes received from Stroke Proportion Processor (SPP) 184 in time and in spatial relationship.

Upon receiving each new Stroke Identifier (STID) 216 from Stroke Proportion Processor (SPP) 184, Stroke Buffer Controller (SBC) 232 reads the Descriptor (DESC) 218 from the corresponding Stroke Identification Entry (SIE) 214 in Stroke Identifier Data Structure (SIDS) 212, determines a corresponding Area of Influence (AINF) 242 for the stroke, and constructs a corresponding Influence List Entry (INFE) 244 in Influence List (INFL) 240. In general, the Area of Influence (AINF) 242 of a stroke is determined by determining the extents of the stroke, for example, the four coordinates points defining a frame enclosing the maximum and minimum x and y coordinates of the points along the stroke or segment, including the end points and the intermediate points having the greatest x or y deviation from a straight line joining the end points.

Stroke Buffer Controller (SBC) 232 orders the Influence List Entries (INFEs) 244 in Influence List (INFL) 240 according to the spatial relationships of the extents of the strokes or segments represented by the Influence List Entries (INFEs) 244; for example, by increasing location of the leftmost point of the stroke's or segment's extents along the x axis. Each Influence List Entry (INFE) 244 includes the stroke's Stroke Identifier (STID) 216, Stroke Identities (SIDNTs) 220 and Area of Influence (AINF) 242. As will be described below, the Areas of Influence (AINFs) 242 are used to determine whether a stroke is spatially related to other strokes, by their x/y coordinates and their extents, such that they actually or potentially comprise the strokes or segments of a character or symbol.

Stroke Buffer Controller (SBC) 232 examines the Area of Influence (AINF) 242 of each new current stroke with respect to the Areas of Influence (AINFs) 242 of previously received strokes having Stroke Identifiers (STIDs) 216 residing in Current Stroke Buffer (CSB) 226. When the Area of Influence (AINF) 242 of the current stroke indicates that the current stroke is potentially a member of a Current Cluster (CC) 234, Stroke Buffer Controller (SBC) 232 writes the Stroke Identifier (STID) 216 of the current stroke into the Current Stroke Buffer (CSB) 226. When the Area of Influence (AINF) 242 of the current stroke indicates that the current stroke is probably not a member of Current Cluster (CC) 234, Stroke Buffer Controller (SBC) 232 transfers the preceding Stroke Identifiers (STIDs) 216 residing in Current Stroke Buffer (CSB) 226 into First Previous Stroke Buffer (FPSB) 228 and the Stroke Identifiers (STIDs) 216 residing in First Previous Stroke Buffer (FPSB) 228 into Second Previous Stroke Buffer (SPSB) 230 and writes the Stroke Identifier (STID) 216 of the current stroke into Current Stroke Buffer (CSB) 226 to begin a new Current Cluster (CC) 234.

Position Discriminator (POSDIS) 224 includes a Stroke Buffer Scanner (SBSC) 246 which, among other functions, scans and reads Influence List (INFL) 240. Stroke Buffer Controller (SBC) 232 is responsive to an indication from Stroke Buffer Scanner (SBSC) 246 that a current stroke has spatial coordinates or extents that are spatially located between strokes which are previous in time for reordering the Stroke Identifiers (STIDs) 216 in Current Stroke Buffer (CSB) 226, First Previous Stroke Buffer (FPSB) 228 and Second Previous Stroke Buffer (SPSB) 230 according to the spatial coordinates or extents of the current stroke, thereby reordering the time relationship of the strokes in the buffers according to their spatial relationship.

Stroke Buffer Controller (SBC) 232 will identify two strokes as potential members of a cluster when the extents of the strokes either overlap or are within a given influence distance of one another. It should be noted, this regard, that it is generally necessary for Stroke Buffer Controller (SBC) 232 to consider only those strokes that are within the same "neighborhood", that is, that have extents falling within a limited range of x/y coordinates of one another. For example, it is generally sufficient for Stroke Buffer Controller (SBC) 232 to consider two to four strokes to "either side" of a current stroke in order to determine whether the current stroke is a member of a cluster with those strokes. Also, an identification of a first stroke as a member of a cluster with a second stroke is also an identification of the second stroke as a member of the cluster with the first stroke, so that it is not necessary to repeat the cluster identification process for each stroke of each pair of strokes.

Stroke Buffer Controller (SBC) 232 determines overlap among strokes by comparison of the x-y extents of the stroke currently under consideration and each stroke in the same "neighborhood" as indicated by their positions in Influence List (INFL) 240 to determine if their respective extents overlap. For example, a stroke currently under consideration will be found to overlap a second stroke located to the "right" of a stroke currently under consideration if the "rightmost" extents of the stroke under consideration extend to the "right" of the "leftmost" extents of the second stroke.

It is generally sufficient to execute the overlap comparison process along a single coordinate dimension of the strokes, generally by examining and comparing the x coordinates of the stroke's or segment's extents, as most handwritten characters and symbols will be sufficiently oriented along the x, or horizontal axis, of a page that the order and relationship of the strokes will not be confused. In other implementations, however, the comparison may be performed according to the same principles along both the x and y coordinate axis of the strokes and the extension of this process to two dimensional comparison will be apparent to those of skill in the art.

It is also possible a stroke that does not have overlapping extents with another stroke or strokes of a cluster should be included in the cluster as having a significant probability of being part of the same character or symbol as the other strokes when the extents of the stroke under consideration are sufficiently close to the extents of the other strokes in the to be defined as "overlapping". An example of such is the character R wherein the extents of the right extending upper loop and the right extending lower right slanting line may not overlap the upright line of the character, but wherein these two strokes in fact comprise parts of the character.

Stroke Buffer Controller (SBC) 232 will include such non-overlapping strokes in a cluster when Stroke Buffer Controller (SBC) 232 determines that the extents of such strokes are separated by no more than a specified influence distance. This influence distance may be arbitrarily defined, such as a specified number of pixels or distance along the x and/or y coordinates, or may be determined dynamically. In the latter instance, Stroke Buffer Controller (SBC) 232 may, for example, determine the influence distance as a proportion of the average separation between the strokes, for example, from the coordinates of the "centers of mass" of the strokes, as the average of their extents, or as a proportion of their extents, so that the influence distance is greater for strokes and segments of relatively larger extents, and thus larger characters, and smaller for strokes having smaller extents, and thus smaller characters.

Position Discriminator (POSDIS) 224, as described above, assigns meanings to clusters of strokes as characters or symbols. Position Discriminator (POSDIS) 224's Stroke Buffer Scanner (SBSC) 246, mentioned above, scans Influence List (INFL) 240 and writes a Window Subset (WINSET) 248 of the Stroke Identifiers (STIDs) 216 residing therein into a Window Buffer (WINBUF) 250. Each current Window Subset (WINSET) 248 of Stroke Identifiers (STIDs) 216 is written into Window Buffer (WINBUF) 250 in spatial order of the corresponding strokes, for example, from left to right with respect to the horizontal x axis and thereby reflecting the order of strokes as forming a character of symbol on a page. Stroke Buffer Scanner (SBSC) 246 selects the strokes represented in Window Buffer (WINBUF) 250 according to their spatial relationships as comprising a cluster of strokes having possible meaning as a character or symbol.

It should be noted, in this regard, that Stroke Buffer Scanner (SBSC) 246 scans Influence List (INFL) 240 rather than Current Stroke Buffer (CSB) 226 to identify possible meaningful clusters of strokes because this decouples the character recognition operations from the stroke ordering operations. This, in turn, allows character identification to be performed independently of the entry of new strokes, and thus without interference from the entry of new strokes and allows new strokes to be ordered into Current Stroke Buffer (CSB) 226, First Previous Stroke Buffer (FPSB) 228, Second Previous Stroke Buffer (SPSB) 230 and Influence List (INFL) 240 regardless of the position of previous strokes.

Position Discriminator (POSDIS) 224 further includes a Position Discriminator Processor (PDISP) 252 connected from Window Buffer (WINBUF) 250 and from Stroke Identifier Data Structure (SIDS) 212 to read combinations of Stroke Identifiers (STIDs) 216 from Window Buffer (WINBUF) 250, wherein each combination of Stroke Identifiers (STIDs) 216 comprises a Potential Character Cluster (POTCC) 254 of strokes potentially forming a character or symbol, and the corresponding Stroke Identifier Entries (SIEs) 214 from Stroke Identifier Data Structure (SIDS) 212.

As described above, the corresponding Stroke Identifier Entries (SIEs) 214 read from Stroke Identifier Data Structure (SIDS) 212 are comprised of the Stroke Identifiers (STIDs) 216, Descriptors (DESCs) 218 and Stroke Identities (SIDNTs) 220 of the strokes whose Stroke Identifiers (STIDs) 216 reside in Potential Character Cluster (POTCC) 254. Position Discriminator Processor (PDISP) 252 indexes, or accesses, a Character Identifier Data Structure (CIDS) 256 with the combination of the Descriptors (DESCs) 218 of each selected combination of strokes. Character Identifier Data Structure (CIDS) 256 is comprised of a B-tree database structure which contains, in its nodes and leafs, Character Identity Entries (CIEs) 258 corresponding to combinations of Descriptors (DESCs) 218. Each Character Identity Entry (CIE) 258 includes one or more Character Identifications (CHIDs) 260 of characters or symbols corresponding to a one of the possible combinations of Descriptors (DESCs) 218, together with the corresponding Descriptors (DESCs) 218 and, when accessed with a combination of Descriptors (DESCs) 218, will provide one or more corresponding Character Identity Entries (CIEs) 258 when a match or matches are found.

Position Discriminator Processor (PDISP) 252 compares the Descriptors (DESCs) 218 read from Stroke Identifier Data Structure (SIDS) 212 and corresponding to the selected combinations of strokes from Window Buffer (WINBUF) 250 with the Descriptors (DESCs) 218 of the Character Identity Entries (CIEs) 258 read from Character Identifier Data Structure (CIDS) 256 and determines the degree of match between the combination of strokes represented in Window Buffer (WINBUF) 250 the combination of strokes represented by the Character Identity Entries (CIEs) 258. The degree of match is determined by comparison of several factors, including, for example, the relative positions and extents of the strokes. It should be noted that the Stroke Identities (SIDNTs) 220 read from Stroke Identifier Data Structure (SIDS) 214 may, in some implementations of the present invention, be used in the comparison operation.

Position Discriminator Processor (PDISP) 252 performs the accessing and comparison match operation for each combination of strokes represented in Window Buffer (WINBUF) 250 and determines the best match or matches between a combination of strokes represented in Window Buffer (WINBUF) 250 and the corresponding character identifications in Character Identifier Data Structure (CIDS) 256. Upon identifying a combination of strokes having a best match or matches, Position Discriminator Processor (PDISP) 252 generates a corresponding Character List (CLST) 262 and writes the Character List (CLST) 262 into a Sequential Character Array (SCA) 264 in a spatial sequence corresponding to the sequence in which the cluster of strokes comprising the character occur in Influence List (INFL) 240. Each Character List (CLST) 262 is comprised of at least one Character Identification (CHID) 260 with an associated Confidence Level (CNL) 266. Each Character Identifications (CHID) 26 identifies a character having a significant degree of match with the corresponding cluster of strokes and the associated Confidence Level (CNL) 266, which is determined in the comparison operation by Position Discriminator Processor (PDISP) 252, indicates the level of confidence that the corresponding character matches the cluster of strokes, that is, the degree of match. While a given Character List (CLST) 262 may contain more than one Character Identification (CHID) 26 and associated Confidence Level (CNL) 266, the included Character Identifications (CHIDs) 260 will be comprised of at least the character having the highest degree of match, together with any other characters also having significant degrees of matching when compared to the character having the highest degree of match. It is recognized that some stroke clusters may have a plurality of matching characters, none of which have a high degree of match, and in this instance a Character List (CLST) 262 may include a corresponding plurality of characters having relatively low degrees of match, that is, relatively low confidence levels.

Position Discriminator Processor (PDISP) 252 then provides the Stroke Identifiers (STIDs) 216 of the strokes in the identified combination of strokes to Stroke Buffer Controller (SBC) 232, removes the Stroke Identifiers (STIDs) 216 from Window Buffer (WINBUF) 250, and again scans Influence List (INFL) 240 to construct a new set of strokes in Window Buffer (WINBUF) 250. Stroke Buffer Controller (SBC) 232 responds to the Stroke Identifiers (STIDs) 216 identified by Position Discriminator Processor (PDISP) 252 as corresponding to a character by moving the Stroke Identifiers (STIDs) 216 from Current Stroke Buffer (CSB) 226 to First Previous Stroke Buffer (FPSB) 228 as a cluster of strokes comprising a character or symbol. Stroke Buffer Controller (SBC) 232 also moves and the Stroke Identifiers (STIDs) 216 previously residing in First Previous Stroke Buffer (FPSB) 228 to Second Previous Stroke Buffer (SPSB) 230, discarding the oldest cluster of strokes from Second Previous Stroke Buffer (SPSB) 230 if necessary.

Lastly, it has been described above that Stroke Buffer Scanner (SBSC) 246 is responsive to a current stroke newly entered into Influence List (INFL) 240 and that has spatial coordinates or extents that are spatially located between strokes which are previous in time for indicating this event to Stroke Buffer Controller (SBC) 232 and that Stroke Buffer Controller (SBC) 232 is responsive to such an indications for reordering the Stroke Identifiers (STIDs) 216 in Current Stroke Buffer (CSB) 226, First Previous Stroke Buffer (FPSB) 228 and Second Previous Stroke Buffer (SPSB) 230 according to the spatial coordinates or extents of the current stroke, thereby reordering the time relationship of the strokes in the buffers according to their spatial relationship. Stroke Buffer Scanner (SBSC) 246 is also responsive to the reordering of Current Stroke Buffer (CSB) 226 and First Previous Stroke Buffer (FPSB) 228 for re-scanning Influence List (INFL) 240 and rewriting the contents of Window Buffer (WINBUF) 250 in a corresponding new spatial order with a new set of strokes as necessary. Position Discriminator Processor (PDISP) 252, in turn, is then responsive to the rewriting of Window Buffer (WINBUF) 250 for determining a new cluster meaning from the new combinations of strokes in Window Buffer (WINBUF) 250, thereby allowing a user to write new strokes into any location along a previously entered series of strokes, or characters. Finally, Cluster Recognition Processor (CRP) 186 provides Sequential Character Array (SCA) 264 to Linguistic Post Processor (LPP) 36.

Figure 35A:
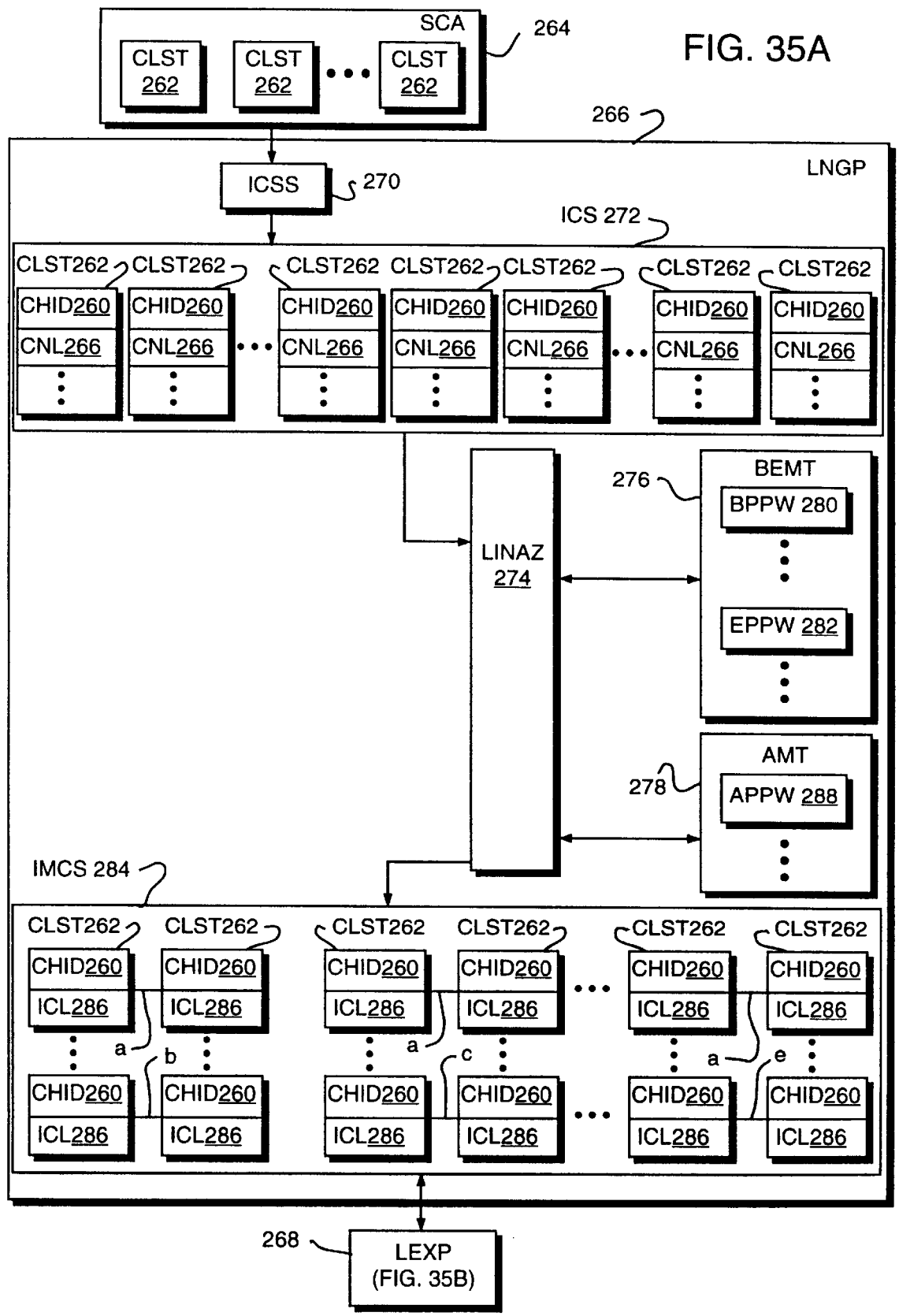
FIGS. 35A and 35B are diagrammatic representations of a linguistic post processor.
Figure 35B:
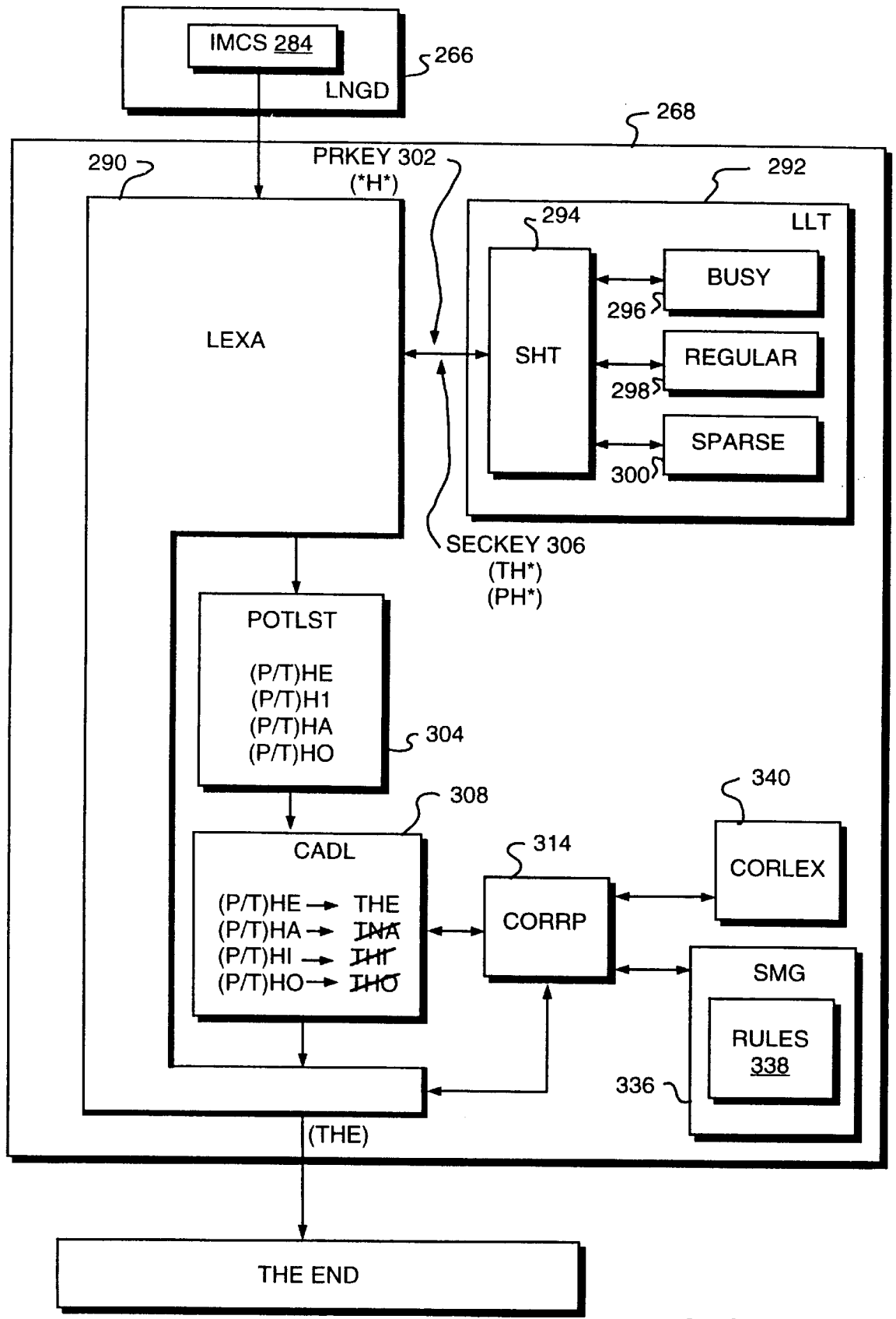
Figure 36A:
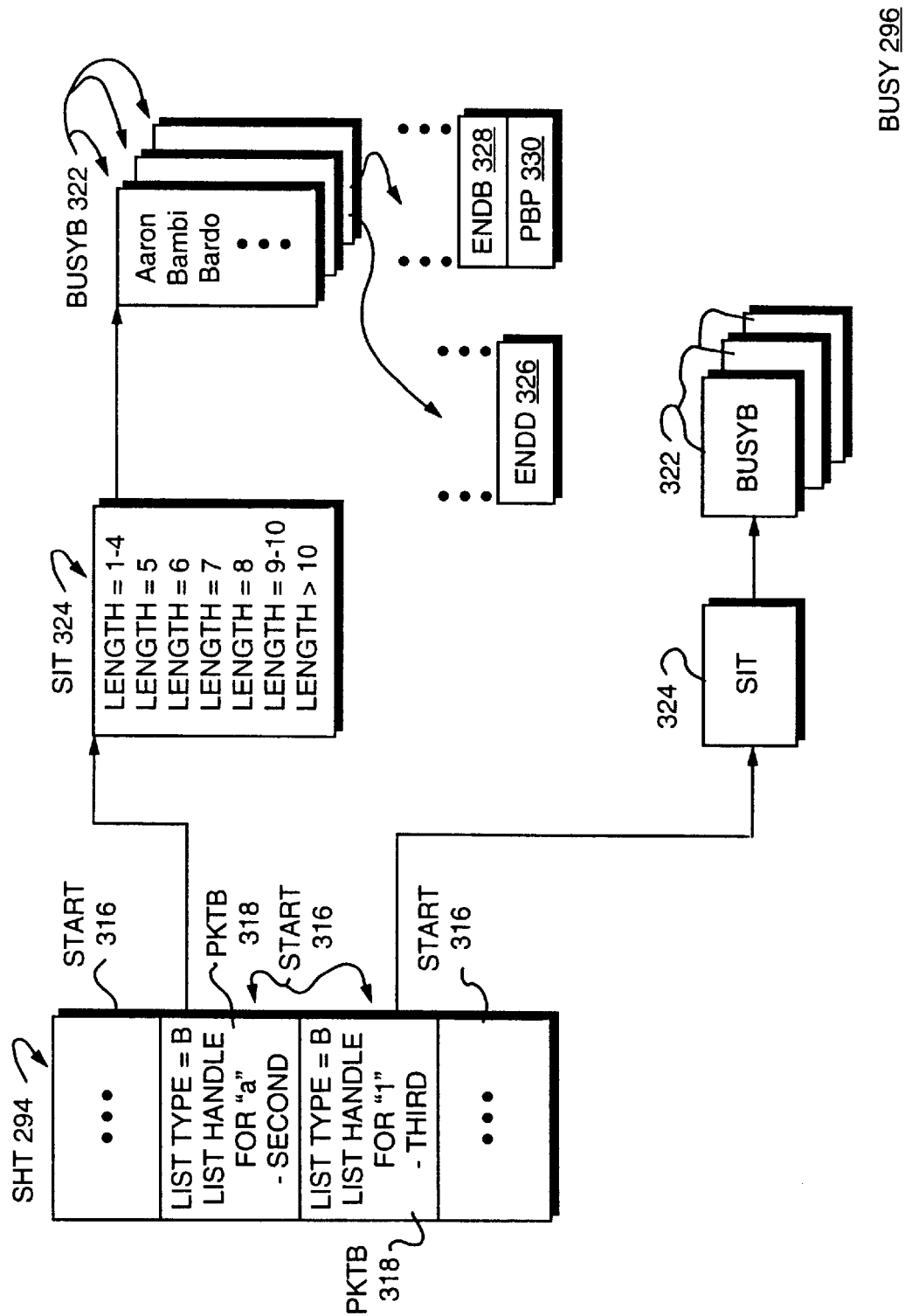
FIGS. 36A, 36B and 36C are diagrammatic representations of regular, sparse and busy letter look-up lists comprising a lexical look-up table.
Figure 36B:
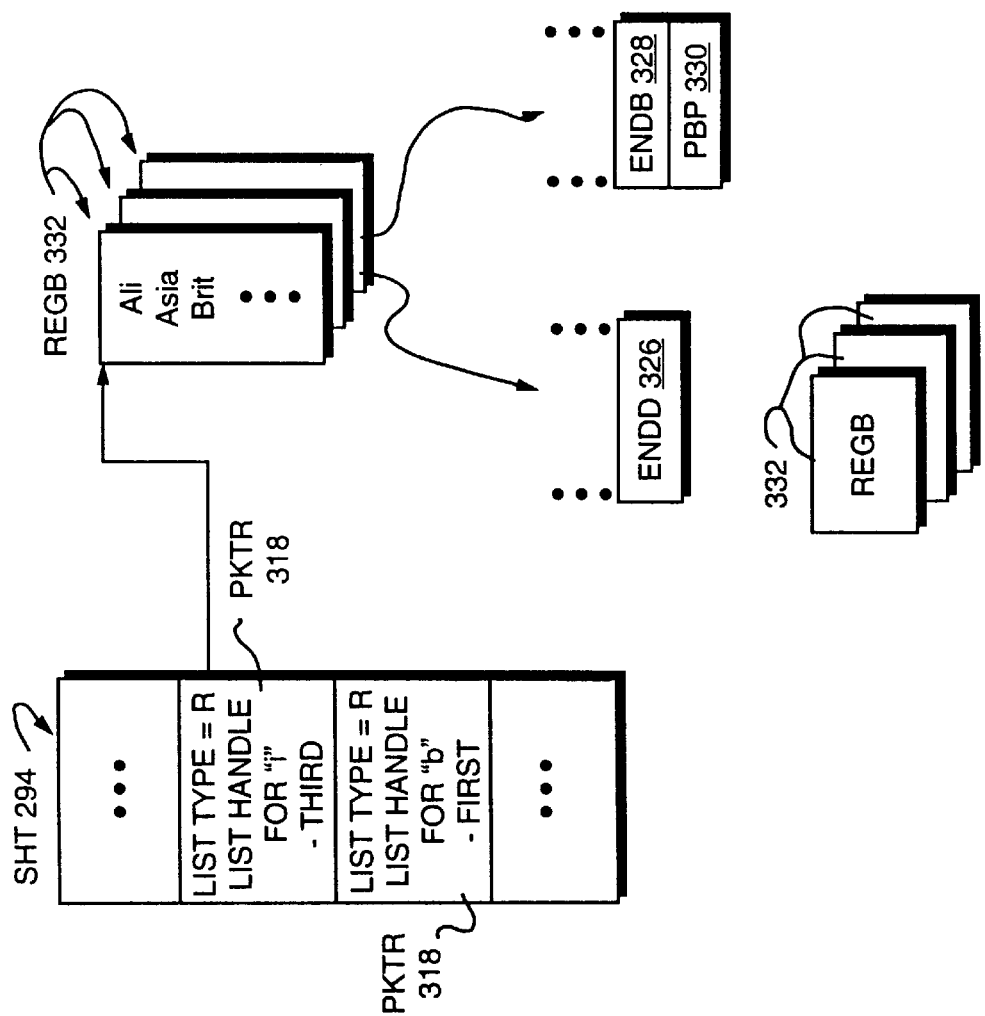
Figure 36C:
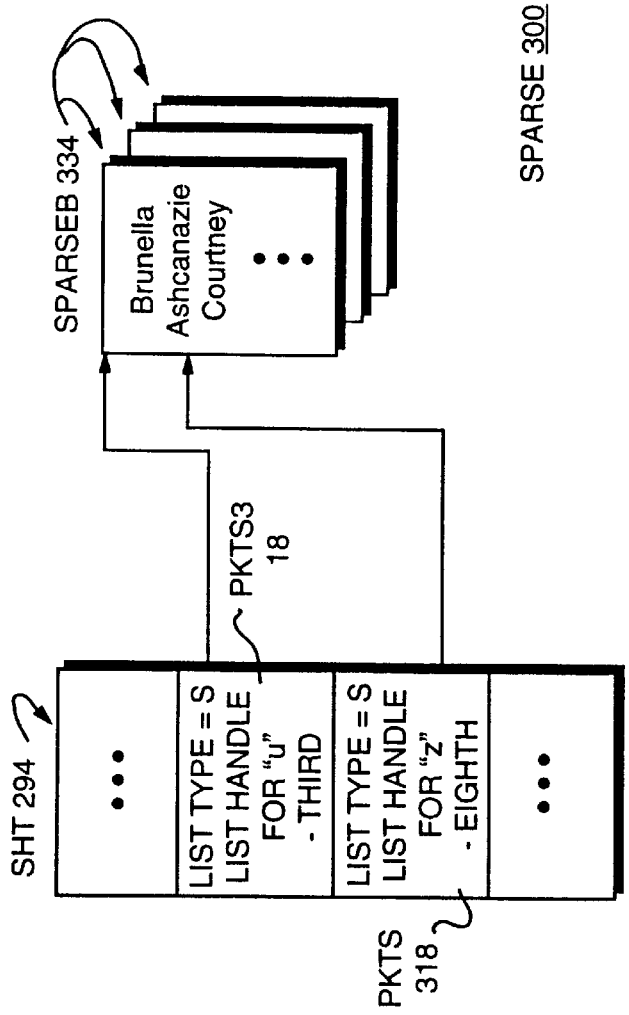
Figure 37:
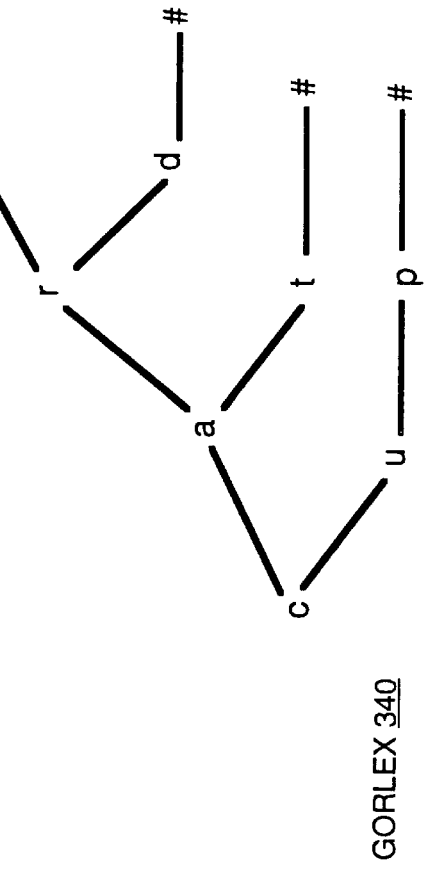
FIG. 37 is a diagrammatic representation of a correction lexicon trie structure.

E. Description of Linguistic Post Processor (LPP) 36 (FIGS. 35A and 35B)

It has been described that LPP 36 receives Sequential Character Array (SCA) 264 from LLRP 34 and assembles the Character Lists (CLSTs) 262, each of which represents one or more interpretations of a given cluster of strokes as a character or symbol, into character strings of two or more characters. LPP 36 then uses linguistic principles to select the most probable interpretations, as words, of the strings of characters represented in the Sequential Character Array (SCA) 264. LPP 36 thereby significantly enhances the accuracy of interpretation of the handwritten input characters by distinguishing between ambiguous or erroneous interpretations of handwritten input characters, as represented in a cluster of strokes comprising a character or symbol. Stroke Buffer Controller (SBC) 232 also moves and the Stroke Identifiers (STIDs) 216 previously residing in First Previous Stroke Buffer (FPSB) 228 to Second Previous Stroke Buffer (SPSB) 230, discarding the oldest cluster of strokes from Second Previous Stroke Buffer (SPSB) 230 if necessary.

Lastly, it has been described above that Stroke Buffer Scanner (SBSC) 246 is responsive to a current stroke newly entered into Influence List (INFL) 240 and that has spatial coordinates or extents that are spatially located between strokes which are previous in time for indicating this event to Stroke Buffer Controller (SBC) 232 and that Stroke Buffer Controller (SBC) 232 is responsive to such an indications for reordering the Stroke Identifiers (STIDs) 216 in Current Stroke Buffer (CSB) 226, First Previous Stroke Buffer (FPSB) 228 and Second Previous Stroke Buffer (SPSB) 230 according to the spatial coordinates or extents of the current stroke, thereby reordering the time relationship of the strokes in the buffers according to their spatial relationship. Stroke Buffer Scanner (SBSC) 246 is also responsive to the reordering of Current Stroke Buffer (CSB) 226 and First Previous Stroke Buffer (FPSB) 228 for re-scanning Influence List (INFL) 240 and rewriting the contents of Window Buffer (WINBUF) 250 in a corresponding new spatial order with a new set of strokes as necessary. Position Discriminator Processor (PDISP) 252, in turn, is then responsive to the rewriting of Window Buffer (WINBUF) 250 for determining a new cluster meaning from the new combinations of strokes in Window Buffer (WINBUF) 250, thereby allowing a user to write new strokes into any location along a previously entered series of strokes, or characters. Finally, Cluster Recognition Processor (CRP) 186 provides Sequential Character Array (SCA) 264 to Linguistic Post Processor (LPP) 36.

E. Description of Linguistic Post Processor (LPP) 36 (FIGS. 35A and 35B)

It has been described that LPP 36 receives Sequential Character Array (SCA) 264 from LLRP 34 and assembles the Character Lists (CLSTs) 262, each of which represents one or more interpretations of a given cluster of strokes as a character or symbol, into character strings of two or more characters. LPP 36 then uses linguistic principles to select the most probable interpretations, as words, of the strings of characters represented in the Sequential Character Array (SCA) 264. LPP 36 thereby significantly enhances the accuracy of interpretation of the handwritten input characters by distinguishing between ambiguous or erroneous interpretations of handwritten input characters, as represented in Sequential Character Array (SCA) 264, by selecting, for each input character and from the possible interpretations of each input character contained in the corresponding Sequential Character Array (SCA) 264, the most probable interpretation of each input character based upon the character's context as an element in a word or combination of characters.

For these purposes, LPP 36 performs two primary operations based upon the properties of letters and words in natural languages. As shown in FIGS. 35A and 35B, respectively, the first is a linguistic analysis performed by a Linguistic Processor (LNGP) 266 to select among ambiguous character possibilities based upon the linguistic relationships of characters existing in any natural language, in this instance English, thereby selecting between a plurality similarly ranked interpretations of a handwritten characters. The second operation is a lexical analysis performed by a Lexical Analyzer (LEXAZ) 290 first using a look-up table of words and similarity measures to identify and resolve possible words occurring in character string. The operations performed by Lexical Analyzer (LEXAZ) 290 further include substitution error correction, when necessary, which performs correction and verification on commonly confused letters and letter combinations to resolve instances wherein a correct character has been misidentified, that is, confused with, an incorrect character in the previous stages of handwritten character recognition.

1. General Discussion of Linguistic and Lexical Analysis

First considering linguistic analysis, it is commonly known and understood that all languages, including natural languages such as English, exhibit linguistic properties wherein the linguistic properties of a language may be generally described as the tendency for certain combinations of characters to occur in greater or lesser frequency in the words of the language. That is, certain characters are frequently followed or associated with other characters, certain letters frequently appear on combination, and certain letters and letter combinations occur more frequently, for example, at the beginning or ending or middle of words than at other places in words. For example, if there is an ambiguity between the letters "u" and "a" in the possible interpretations identified by LLRP 34, and the letter in question appears in a combination wherein they are preceded by "q" and followed by "ick", the linguistic characteristics of English will indicate that the probably correct choice is "u".

This relationship, as described below, is captured and implemented in a Markov process, of the type well known and understood in the art, wherein LPP 36 chooses among the possible interpretations of each input character from LLRP 34, and in particular among ambiguous characters, based upon a combination of likelihood measures stored in Markov tables and the confidence levels, or ratings, provided by LLRP 34 in association with each potential interpretation of a character.

Lexical analysis, in turn, is based upon the vocabulary, words, or morphemes of a language, such as the known and identifiable spelling of certain words in a language. Examples of such are the spelling of at least the common words occurring in a language, such as "cat", "rat", "boat", and the spelling of proper names, such as personal names and place names, and so on. Lexical analysis also includes the identification of certain common errors arising from the substitution, or misidentification, of certain characters for other characters, for example, the misrecognition of the strokes of "5" as the strokes of "s" or the misrecognition of the combinations "in" or "ni" as "m" or the misrecognition of "m" as the combination "iw".

2. Linguistic Processor (LNGP) 266 (FIG. 35A)

Referring to FIG. 35A, there is presented a diagrammatic representation of Linguistic Processor (LNGP) 266. As has been described LLRP 34 provides LPP 36 with a sequence of Character Lists (CLSTs) 262 in Sequential Character Array (SCA) 264, wherein each Character List (CLST) 262 corresponds to a cluster of strokes identified by LLRP 34 as having meaning, or potential meaning, as a character and wherein each Character List (CLST) 262 includes one or more Character Identifications (CHIDs) 260. Each Character Identification (CHID) 260, in turn, identifies a possible interpretation of a cluster of strokes as a character and has associated with it a Confidence Level (CNL) 266 which indicates the level of confidence that the corresponding character is a correct interpretation of the corresponding cluster of strokes.

Linguistic Processor (LNGP) 266 includes an Initial Character String Selector (ICSS) 270 which receives Character Lists (CLSTs) 262 from LLRP 34 and assembles the Character Lists (CLSTs) 262, in the sequence received, into an Initial Character String (ICS) 272 containing two or more Character Lists (CLSTs) 262 and which potentially comprises a word. It should be noted that Initial Character String Selector (ICSS) 270 will generally begin each attempt to identify a word occurring in the sequence of Character Lists (CLSTs) 262 received from LLRP 34 by selecting the next two sequential Character Lists (CLSTs) 262 occurring after the preceding identification of a word in the sequence of Character Lists (CLSTs) 262, and may assemble progressively longer sequences of Character Lists (CLSTs) 262, depending upon the outcome of the linguistic analysis for each selected Initial Character String (ICS) 272.

A Linguistic Analyzer (LINAZ) 274 reads the Character Lists (CLSTs) 262 of Initial Character String (ICS) 272 and performs two, sequential linguistic analyses, the first based upon the relative frequency of occurrence of character pairs at the beginning and ending of words and the second based upon the relative frequency of occurrence of combinations of characters occurring at any point in a character string potentially comprising a word. As indicated in FIG. 35, there are accordingly two corresponding Markov tables associated with Linguistic Analyzer (LINAZ) 274, the first designated as Beginning/Ending Markov Table (BEMT) 276 and the second designated as Anywhere Markov Table (AMT) 278.

The first analysis is based upon characters appearing at the beginning and ending of words as providing initial, additional constraints upon the possible pairing of characters in words. For example, although the character pair "lt" can appear together in a word, the probability that this character pair would occur at the beginning of a word is very low while the probability that the character pair "th" is relatively high Correspondingly, and as indicated in FIG. 35, Beginning/Ending Markov Table (BEMT) 276 contains a Beginning Character Pair Probability Weight (BPPW) 280 for each possible pair of beginning characters in a given language, such as English, and an Ending Character Pair Probability Weight (EPPW) 282 for each possible pair of ending characters in the language.

It should be noted that the initial linguistic analysis based upon the probabilities of character pairs occurring at the beginning or ending of words is also of value in identifying the beginning or ending of a given word occurring in the sequence of Character Lists (CLSTs) 262 received from LLRP 34, and thus in assembling the Character Lists (CLSTs) 262 into Initial Character Strings (ICSs) 272 which comprise words.

Linguistic Analyzer (LINAZ) 274 performs the initial beginning and ending analysis by identifying and reading from Initial Character String (ICS) 272 the first two and last two Character Lists (CLSTs) 262 occurring therein, reads the Character Identifications (CHIDs) 260 contained in each of the beginning and ending pairs of Character Lists (CLSTs) 262 and forms each possible combination of beginning Character Identifications (CHIDs) 260 and each possible pair of ending Character Identifications (CHIDs) 260. Linguistic Analyzer (LINAZ) 274 then accesses Beginning/Ending Markov Table (BEMT) 276 with each possible combination of beginning Character Identifications (CHIDs) 260 and each possible pair of ending Character Identifications (CHIDs) 260 and reads from Beginning/Ending Markov Table (BEMT) 276 a Beginning Character Pair Probability Weight (BPPW) 280 for each pair of beginning characters and an Ending Character Pair Probability Weight (EPPW) 282 for each pair of ending Character Identifications (CHIDs) 260.

Linguistic Analyzer (LINAZ) 274 then writes the selected beginning and ending Character Identifications (CHID) 260 pairs into an Intermediate Character String (IMCS) 284 in locations corresponding to their respective locations in Initial Character String (ICS) 272, together with their Character Identifications (CHIDs) 260. This processing is represented in FIG. 35A by the lines and appended suffixes, "a", "b" and so, between the Character Identification (CHID) 260 pairs of Intermediate Character String (IMCS) 284.

Linguistic Analyzer (LINAZ) 274 modifies the Confidence Level (CNL) 266 associated with each Character Identification (CHID) 260, however, with the corresponding Beginning Character Pair Probability Weight (BPPW) 280 or Ending Character Pair Probability Weight (EPPW) 282 read from Beginning/Ending Markov Table (BEMT) 276 to generate a new Intermediate Confidence Level (ICL) 286 which is associated with each Character Identification (CHID) 260. This modification may be a simple replacement of the original Confidence Level (CNL) 266 with the corresponding Beginning Character Pair Probability Weight (BPPW) 280 or Ending Character Pair Probability Weight (EPPW) 282, but may also obtained, for example, by multiplying the original Confidence Level (CNL) 266 by the corresponding Beginning Character Pair Probability Weight (BPPW) 280 or Ending Character Pair Probability Weight (EPPW) 282, so that Intermediate Confidence Level (ICL) 286 preserves the stroke cluster/character probability assessment performed by LLRP 34.

It should be noted that Linguistic Analyzer (LINAZ) 274 may find no matches between the selected beginning Character List (CLST) 262 pair or the selected ending Character List (CLST) 262, or both, and an entry in Beginning/Ending Markov Table (BEMT) 276, or may find that the matches found are all of low weights, that is, low probabilities. This may occur, for example, when the selected Initial Character String (ICS) 272 is an incomplete word, when an Initial Character String is comprised of parts of two words, or, again in this latter instance, when one of the characters in the string is a single character word, such as "A" or "I". In the first two cases, Linguistic Analyzer (LINAZ) 274 will direct Initial Character String Selector (ICSS) 270 to either assemble a next Initial Character String (ICS) 272 containing at least one additional Character List (CLST) 262 or, depending upon the number of Character Lists (CLSTs) 262 in Initial Character String (ICS) 272, to eliminate the leftmost Character List (CLST) 262 from the present a Initial Character String (ICS) 272. Linguistic Analyzer (LINAZ) 274 will repeat this beginning/ending analysis until an Initial Character String (ICS) 272 is identified as having beginning and ending character pairs having an acceptable probability of comprising the beginning and ending of a word.

In the instance of a single character word contained in the Initial Character String, this case will probably be indicated by a Character Identification (CHID) 260 as a capitol letter, such as "A" or "I" and this character will be written into Intermediate Character String (IMCS) 284 as a single character word with its Intermediate Confidence Level (ICL) 286 either being the original Confidence Level (CNL) 266 or, if obtainable from Beginning/Ending Markov Table (BEMT) 276, an Intermediate Confidence Level (ICL) 286 modified by a Beginning Character Pair Probability Weight (BPPW) 280 or Ending Character Pair Probability Weight (EPPW) 282 indicative of a single character accepted as the beginning/ending pair of a word. This, however, requires that Beginning/Ending Markov Table (BEMT) 276 contain entries corresponding to and providing weights for pairs that include an initial capital letter and have a significant probability of occurring as a single character word.

Once Linguistic Analyzer (LINAZ) 274 has achieved acceptable interpretations for the beginning and ending character pairs of an Initial Character String (ICS) 272, and generated the corresponding entries in Intermediate Character String (IMCS) 284, Linguistic Analyzer (LINAZ) 274 will perform the second linguistic analysis using Anywhere Markov Table (AMT) 278, which contains Anywhere Character Pair Probability Weights (APPWs) 288 reflecting the probabilities of occurrence of all possible character combinations occurring anywhere in a character string. In this process, Linguistic Analyzer (LINAZ) 274 first selects the Character List (CLST) 262 in Initial Character String (ICS) 272 occurring between the beginning and ending character pairs and having the highest original Confidence Level (CNL) 266, wherein it will be recognized that this initial Character List (CLST) 262 may be a member of either the beginning or ending pair, or both. Linguistic Analyzer (LINAZ) 274 then selects the Character Lists (CLSTs) 262 occurring to either side of the initial Character List (CLST) 262, forms the possible pair combinations of the Character Identifications (CHIDs) 260 of the initial Character List (CLST) 262 and the Character Identifications (CHIDs) 260 of the neighboring Character Lists (CLSTs) 262.

Linguistic Analyzer (LINAZ) 274 accesses Anywhere Markov Table (AMT) 278 with these combinations of Character Identifications (CHIDs) 260 and will read from Anywhere Markov Table (AMT) 278 an Anywhere Character Pair Probability Weight (APPW) 288 for and corresponding to each combination of Character Identifications (CHIDs) 260. Linguistic Analyzer (LINAZ) 274 then writes the Character Identification (CHID) 260 and its neighboring Character Identifications (CHIDs) 260 having the highest confidence levels into Intermediate Character String (IMCS) 284 at locations corresponding to their locations in Initial Character String (ICS) 272, again modifying each original Confidence Level (CNL) 266 according to the corresponding Anywhere Character Pair Probability Weights (APPWs) 288, in the manner described above, to generate corresponding Intermediate Confidence Levels (ICLs) 286.

Linguistic Analyzer (LINAZ) 274 will select a neighboring Character List (CLST) 262 of the initial Character List (CLST) 262 as a next Character List (CLST) 262 to form pairs with neighboring Character Lists (CLSTs) 262 and will repeat the above described process, selecting the highest successive pairs of Character Lists (CLSTs) 262 having the highest confidence levels upon each repetition of the process and proceeding from the initial Character List (CLST) 262 to the ends of Initial Character String (ICS) 272 while generating corresponding entries in Intermediate Character String (IMCS) 284 in the manner described above.

It will be noted with respect to the above described linguistic processing that the initial processing operation, that is, beginning/ending processing takes advantage of the more restrictive constraints in possible linguistic combinations of beginning and ending character combinations to provide enhanced accuracy in correctly identifying the characters appearing at those points in a word, and in identifying the beginnings and endings of words. It will also be noted that the second linguistic analysis starts with the Character List (CLST) 262 from LLRP 34 having the highest confidence level, and thus the most probably correct interpretation of a cluster of strokes by LLRP 34, uses this character as the basis to identify neighboring characters, those characters to identify further neighboring characters, and so on, thereby providing the highest probability of resolving ambiguously identified characters of the character string. Finally, it will be noted that the above linguistic processing, which has been described as operating with character pairs, may be extended to character triplets, particularly with respect to the second processing operation, in the manner well understood in the art. Linguistic processing with character pairs has been selected in the present implementation, however, as offering acceptable performance with acceptable cost in processing time and complexity and acceptable size in the Markov tables.

Lastly, at the conclusion of the linguistic analyses performed by Linguistic Processor (LNGP) 266, Intermediate Character String (IMCS) 284 is available to Lexical Analyzer (LEXAZ) 290 for lexical processing.

3. Lexical Processor (LEXP) 268 (FIG. 35B)

As described above, the lexical processing of Intermediate Character String (IMCS) 284 is performed in two stages, the second stage, illustrated in FIG. 35B is a word lexical analysis performed in Lexical Processor (LEXP) 268 by a Lexical Analyzer (LEXAZ) 292 operating in association with a Lexical Look-up Table (LLT) 292 comprised of a Start Handle Table (SHT) 294 and three "letter in position" lists respectively designated as Busy List (BUSY) 296, Regular List (REGULAR) 298 and Sparse List (SPARSE) 300, containing commonly occurring words of the language and words that are proper names, that is, of persons and places.

As has been discussed above, Intermediate Character String (IMCS) 284 is comprised of an ordered sequence or string of Character Lists (CLSTs) 262 wherein each Character List (CLST) 262 may include one or more Character Identifications (CHIDs) 260, each having an associated Intermediate Confidence Level (CNL) 266 and it is apparent that there may still be, and probably will be, ambiguities among the characters represented in Intermediate Character String (IMCS) 284, that is, that there may be more than one possible remaining interpretation for one or more of the characters represented in Intermediate Character String (IMCS) 284.

The operation performed by Lexical Analyzer (LEXAZ) 290 is referred to as a lexical lookup with uncertain input, that is, with an input having any number of characters having low confidence levels. In this regard, it must be noted that standard lexical lookup methods use the initial characters of a character string as a primary key for efficient lookup. It will be apparent, however, that in an optical or handwritten character recognition system the level of confidence in each letter varies from character to character and that the initial characters may, in fact, have lower confidence levels than other characters of the word. As a result, standard lexical lookup methods may not provide acceptable results when the confidence level of the initial characters is low. As a consequence, the lookup method used in such instances, as in the present system, must be flexible in selecting the primary key, building the primary key from those characters having the highest confidence levels regardless of the characters' relative positions in the word.

In this stage, Lexical Analyzer (LEXAZ) 290 identifies and reads from Intermediate Character String (IMCS) 284 a Primary Key Character Identification (PRKEY) 302, such as (*H*), that is word comprised of the (CHIDs) 260 therein having the highest associated Intermediate Confidence Level (ICL) 286. Lexical Analyzer (LEXAZ) 290 then accesses Lexical Look-up Table (LLT) 292 with the Primary Key Character Identification (PRKEY) 302, reads from Lexical Look-up Table (LLT) 292 all potential words therein that have the selected primary key character in the same location as in Intermediate Character String (IMCS) 284, such as (P/T)HE, (P/T)HA, (P/T)HI, and (P/T)HO, and assembles these words into a Potential List (POTLST) 304.

Lexical Analyzer (LEXAZ) 290 the identifies and reads one or more Secondary Key Character Identifications (SECKEYs) 306 from Intermediate Character String (IMCS) 284, if any, such as TH* and PH*, wherein each Secondary Key Character Identification (SECKEY) 306 is a potential word comprised of (CHIDs) 260 therein having Intermediate Confidence Levels (ICLs) 286 less than that of Primary Key Character Identification (PRKEY) 302 but higher than an acceptable threshold. Lexical Analyzer (LEXAZ) 290 then scans Potential List (POTLST) 304 using Primary Key Character Identification (PRKEY) 302 and the Secondary Key Character Identifications (SECKEYs) 306 and compares the Primary Key Character Identification (PRKEY) 302 and Secondary Key Character Identifications (SECKEYs) 306 with the characters appearing in corresponding locations in each word in Potential List (POTLST) 304. Lexical Analyzer (LEXAZ) 290 then constructs a Candidate List (CADL) 308 of Potential List (POTLST) 304 words that have the same characters occurring in the same locations as the Primary Key Character Identification (PRKEY) 302 and the Secondary Key Character Identifications (CHIDs) 260.

Finally, Lexical Analyzer (LEXAZ) 290 ranks the words of Candidate List (CADL) 308 according to their similarity with the characters represented in Intermediate Character String (IMCS) 284, such as (P/T)HE, (P/T)HA, (P/T)HI and (P/T)HO, taking into account the Intermediate Confidence Levels (ICLs) 286 associated with the characters represented in Intermediate Character String (IMCS) 284. Lexical Analyzer (LEXAZ) 290 preferably and initially uses the character represented in any given location in Intermediate Character String (IMCS) 284 having the highest Intermediate Confidence Level (ICL) 286, but considers alternative character interpretations at each location to determine the match having the highest overall confidence level.

If Lexical Analyzer (LEXAZ) 290 finds a complete match between a word of Candidate List (CADL) 308 and a combination of the characters represented by (CHIDs) 260 in Intermediate Character String (IMCS) 284, Lexical Analyzer (LEXAZ) 290 accepts this word as a correct interpretation of the corresponding original handwritten input word and writes the word into Output String (OUTS) 310 as an Identified Word (IDWORD) 312 thereof for subsequent display, storage, printing, or so on.

If a complete match is not found, then Correction Processor (CORRP) 314 is invoked to operate upon the combination of the characters represented by (CHIDs) 260 most closely matching one or more words of Candidate List (CADL) 308. If no match is found, Correction Processor (CORRP) 314 will also be invoked, but in this instance will be provided with the Candidate List (CADL) 308 entry having the Intermediate Confidence Levels (ICLs) 286, that is, the results of the linguistic analysis having the highest probability, based upon the linguistic analysis and the stroke characteristics determined by Low Level Recognition Processor (LLRP) 34.

Before proceeding to a description of Correction Processor (CORRP) 314, Figs. [Figures From LPP Disclosure] illustrate the structure of Lexical Look-up Table (LLT) 292. As described, in order to facilitate lexical lookup with uncertain input it is necessary to be able to access a lexicon, such as Lexical Look-up Table (LLT) 292, using any letter of the input word as a primary key, rather than only the initial letter or letters. This is achieved in the system of the present invention by storing the lexicon of words in "letter-in-position" lists identified in Figs. [Figures From LPP Disclosure] as Busy List (BUSY) 296, Regular List (REGULAR) 298 and Sparse List (SPARSE) 300, which are accessed, or indexed, through Start Handle Table (SHT) 294. The three types of list, busy, regular and sparse, are based upon the number of words in the lexicon, that is, in Lexical Look-up Table (LLT) 292, having a given character in a given position. In the present implementation, if the number of words having a given character in a given position is less than 10, it is considered to be "sparse" and is stored in Sparse List (SPARSE) 300. If the number of words is between 10 and 100 it is considered "regular" and stored in Regular List (REGULAR) 298 and if the number of words is greater than 100 it is considered "busy" and stored in Busy List (BUSY) 296. This structure has been implemented to maximize the efficiency of lookup and to minimize the amount of space required to store Lexical Look-up Table (LLT) 292.

As indicated in Figs. [Figures From LPP Disclosure], Start Handle Table (SHT) 294 contains a Start Entry (START) 316 for each letter of the alphabet in every possible position and each Start Entry (START) 316 includes a Primary Key Type (PKT) 318, B, R or S, identifying respectively whether the corresponding words reside in Busy List (BUSY) 296, Regular List (REGULAR) 298 or Sparse List (SPARSE) 300, and a Pointer Handle (PTRH) 320 to the corresponding entries in Busy List (BUSY) 296, Regular List (REGULAR) 298 or Sparse List (SPARSE) 300 wherein the Primary Key Type (PKT) 318 determines which list the Pointer Handle (PTRH) 320 is pointing to.

In Busy List (BUSY) 296, words with the same length and same primary key are blocked together, in a Busy Block (BUSYB) 322, and a Secondary Index Table (SIT) 324 determines which partition, or Busy Block (BUSYB) 322, belongs to. For example, and as illustrated, an "a-in-the-second-position for names 5 characters long" links "Aaron" to "Bambi" to "Bardo" and so on. Words with less common lengths, however, are blocked together in a single Busy Block (BUSYB) 322.

It should be noted that the letter-in-position list of Busy List (BUSY) 296 contains the words each followed by either an End of Data Marker (ENDD) 326 at the end of the last Busy Block (BUSYB) 322 or an End of Block Marker (ENDB) 328 followed by a Previous Block Pointer (PBP) 330 to the start of the previous Busy Block (BUSYB) 322 for Busy Blocks (BUSYBs) 322 other than the last Busy Block (BUSYB) 322. It should also be noted that the list does not have to be sorted or organized alphabetically because all of the matched strings must be returned to Lexical Analyzer (LEXAZ) 290.

For Regular Lists (REGULARs) 298 the lengths of the words are not a factor in organizing the list. Words of any length with a specific primary key designated as "regular" are stored together in a Regular Block (REGB) 332 and there is, accordingly, no Secondary Index Table (SIT) 324 associated with a Regular List (REGULAR) 298. The format of the letter-in-position blocks in a Regular List (REGULAR) 298 is otherwise the same as in a Busy List BUSY) 296.

Finally, in Sparse Lists (SPARSEs) 300 neither the length nor the letter position of the of the words are used in organizing the list and all words with primary keys designated as "sparse" are blocked together in a Sparse Block (SPARSEB) 334. For example, "u-in-the-third-position" and "z-in-the-eighth-position" are in the same Sparse Block (SPARSEB) 334 and, again, there is, accordingly, no Secondary Index Table (SIT) 324 associated with a Sparse List (SPARSE) 300.

4. Correction Processor (CORRP) 314

As described above, if a complete match is not found between an interpretation of the of Intermediate Character List (CLST) 262 and a word of Candidate List (CADL) 308, then Correction Processor (CORRP) 314 is invoked to operate upon the combination of the characters represented by (CHIDs) 260 most closely matching one or more words of Candidate List (CADL) 308.

As also discussed previously, the errors that appear in recognition of handwritten characters are different from the typographical errors that appear in text that has been typed in that most handwritten character errors are substitution errors, that is, replacement of a letter by another letter due to a misidentification of their shape and form. The use of a spelling type corrector is therefore not effective in recognition of handwritten characters.

As indicated in FIG. 35, Correction Processor (CORRP) 314 reads the combination of the characters represented by (CHIDs) 260 most closely matching one or more words of Candidate List (CADL) 308 and identifies the mismatching characters. Correction Processor (CORRP) 314 then accesses a Smudge Table (SMG) 336, which contains a compilation of list of common mistakes in character recognition and Correction Rules (RULEs) 338 for amending such errors, such as (P/T), to determine whether there exists in Smudge Table (SMG) 336 a Correction Rule (RULE) 338 that is applicable to a mismatching character.

In a recursive process Correction Processor (CORRP) 314 attempts the substitutions into the mismatching characters of Intermediate Character String (IMCS) 284 that are indicated by the applicable Correction Rules (RULEs) 338 and accesses, or indexes, a Correction Lexicon (CORLEX) 340 with the resulting corrected versions of Intermediate Character String (IMCS) 284, such as THE, THA, THI and THO. Corrections that result in words unknown in Correction Lexicon (CORLEX) 340, such as THA, THI and THO result in no match and are eliminated (THA, THI and THO) from consideration while corrected versions of Intermediate Character String (IMCS) 284 that are matched by one or more words in Correction Lexicon (CORLEX) 340 are identified as potentially correct versions of Intermediate Character String (IMCS) 284, such as THE. Correction Processor (CORRP) 314 accepts the corrected version of Intermediate Character String (IMCS) 284 having the highest aggregate confidence level, as determined from the Intermediate Confidence Levels (ICLs) 286 associated with the characters of the corrected versions of Intermediate Character String (IMCS) 284 as a correct interpretation of the corresponding original handwritten input word and writes the word, such as THE, into Output String (OUTS) 310 as an Identified Word (IDWORD) 312 thereof for subsequent display, storage, printing, or so on.

Referring finally to Fig. [Figure From LPP Disclosure], Correction Lexicon (CORLEX) 340 is represented therein as comprised of a letter trie structure. As described, the correction processes uses the data from Smudge Table (SMG) 336 to evaluate possible character string substitutions, that is, possible corrections, wherein the string substitutions are evaluated against the words in Correction Lexicon (CORLEX) 340 and this trie structure allows Correction Processor (CORRP) 314 to analyze and correct all common word substrings at the same time. In particular, as the trie is traversed with a substitution version of character string, all invalid paths are automatically rejected as invalid corrections while all valid paths are considered as possible correct corrections. If Correction Processor (CORRP) 314 reaches the end of a path with the substitution indicated by Smudge Table (SMG) 336 in place, the corrected version of the word is considered to be successfully corrected. As has been described, however, this process may result in more than one possible successful correction and Correction Processor (CORRP) 314 may use other criteria, such as confidence levels or similarity comparisons between the corrected versions and the original versions of Intermediate Character String (IMCS) 284 to reach a final decision.

While the invention has been particularly shown and described with reference to preferred embodiments of the apparatus and methods thereof it will be also understood by those of ordinary skill in the art that various changes, variations and modifications in form, details and implementation may be made therein without departing from the spirit and scope of the invention as defined by the appended claims. Therefore, it is the object of the appended claims to cover all such variation and modifications of the invention as come within the spirit and scope of the invention.

What is claimed is:

1. A handwritten character recognition system, comprising:

a document scanner for generating scanned images of a document containing handwritten characters, an image processor connected from the document scanner for receiving the scanned image of a document and generating one or more ordered cluster arrays, the ordered cluster arrays containing spatially ordered coordinate arrays of skeletal image arcs representing and corresponding to a dynamic characteristic of the strokes by tracing the strokes of the handwritten characters and the spatial order representing an induced time ordered sequence of the strokes of handwritten characters of the document, the image processor including a time order induction processor for receiving the skeletal image arcs by tracing the strokes of the character and generating the dynamic characteristics of the strokes as the ordered cluster arrays by ordering the skeletal image arcs into a spatial sequence representing an induced time ordered sequence of handwritten generation of the skeletal images, a low level recognition processor connected from the time order induction processor for receiving the ordered cluster arrays and generating a sequential character array containing a character list for each ordered cluster array, each character list containing at least one character identification representing a possible interpretation of the corresponding ordered cluster array, and a linguistic post processor connected from the low level recognition processor for receiving the sequential character array and generating an output string representing the most probable interpretation of the handwritten characters of the document, the linguistic post processor including a linguistics analyzer for determining the most probable correct combinations of characters in each character string, and a lexical analyzer for determining the most probable meaning of each character of each character string.

2. The handwritten character recognition system of claim 1, wherein the image processor further comprises:

a segmentor for receiving a scanned image of a document and identifying one or more segments of each handwritten character stroke appearing in the scanned image, a thinning processor connected from the segmentor for reducing each segment to one or more skeletal images wherein each skeletal image represents one or more
  strokes of a handwritten characters in the scanned image and
  wherein each skeletal image includes one or more skeletal image arcs wherein each skeletal image arc is a single pixel wide image representing a corresponding one or more strokes of a handwritten character, the time order induction processor being connected from the scanned image thinning processor for receiving the skeletal image arcs and generating the ordered cluster arrays by ordering the skeletal image arcs into a spatial sequence representing an induced time ordered sequence of handwritten generation of the skeletal images, and a transcriber for reading the coordinates of points along the skeletal image arcs and generating the ordered cluster arrays.

3. The handwritten character recognition system of claim 2, wherein the time order induction processor further:

joins selected ones of the skeletal image arcs by a ballistic motion emulation of handwritten character generation to generate skeletal image arcs emulating strokes of handwritten characters.

4. The handwritten character recognition system of claim 1, wherein the low level recognition processor further comprises:

a stroke feature recognizer for extracting stroke recognition features from the coordinate arrays representing the skeletal image arcs and assigning a meaning to each skeletal image arc of each ordered cluster array, and a cluster recognizer connected from the stroke feature recognizer and responsive to the meaning assigned to each skeletal image arc for recognizing and assigning at least one character identification to each ordered cluster array, and a character array generator for generating a sequential character array containing a character list for each ordered cluster array, each character list containing at least one possible character identification representing a possible interpretation of the corresponding ordered cluster array.

5. The handwritten character recognition system of claim 1 wherein:

the linguistics analyzer receives the character lists assembles the character lists into character strings, and performs linguistic analysis on the character strings to determine the most probable correct combinations of characters in each character string, and the lexical analyzer performs a lexical analysis of each combination of characters to determine the most probable meaning of each character of each character string, and generates the output string representing the most probable interpretation of the handwritten characters of the document.

6. The handwritten character recognition system of claim 4 wherein the handwritten character recognition system is adapted for real time handwritten character recognition, wherein the low level recognition processor further comprises:

a real time handwritten character processor connected from a tablet and pen for generating handwritten character inputs and to the stroke feature recognizer for providing stroke descriptor information representing real time handwritten characters to the stroke feature recognizer.

7. The handwritten character recognition system of claim 6, wherein the real time handwritten character processor comprises:

a pen input detector for detecting and indicating user inputs through the tablet and pen, the user inputs including pen strokes and pen states, and an input buffer connected from the pen input detector for storing stroke descriptor information of a current stroke as the current stroke is entered by the user, wherein the stroke feature recognizer is connected from the input buffer and responsive to the pen states for extracting stroke recognition features from the stroke descriptor information of the current stroke and assigning a meaning to the current stroke, and the cluster recognizer connected from the stroke feature recognizer is responsive to the meaning assigned to each stroke for recognizing and assigning a character identification to each cluster of strokes.

8. A method for recognizing handwritten characters contained in a previously created document, comprising the steps of:

scanning the document with a document scanner to generate scanned images of the document containing handwritten characters, by operation of an image processor connected from the document scanner receiving the scanned image of a document, and generating one or more ordered cluster arrays, the ordered cluster arrays containing spatially ordered coordinate arrays of skeletal image arcs representing and corresponding to a dynamic characteristic of the strokes by tracing the strokes of the handwritten characters and the spatial order representing an induced time ordered sequence of the strokes of handwritten characters of the document, including, by operation of a time order induction processor, receiving the skeletal image arcs by tracing the strokes of the character and generating the dynamic characteristics of the strokes as the ordered cluster arrays by ordering the skeletal image arcs into a spatial sequence representing an induced time ordered sequence of handwritten generation of the skeletal images, by operation of a low level recognition processor connected from the time order induction processor receiving the ordered cluster arrays and generating a sequential character array containing a character list for each ordered cluster array, each character list containing at least one character identification representing a possible interpretation of the corresponding ordered cluster array, and by operation of a linguistic post processor connected from the low level recognition processor receiving the sequential character array performing a linguistic analysis of the character identifications in the character lists of the sequential character array, and generating an output string representing the most probable interpretation of the handwritten characters of the document, including performing a linguistics analysis for determining the most probable correct combinations of characters in each character string, and performing a lexical analysis for determining the most probable meaning of each character of each character string.

9. The method for recognizing handwritten characters of claim 8, wherein the step of generating the order cluster arrays further comprises the steps of:

by operation of a segmentor identifying one or more segments of each handwritten character stroke appearing in the scanned image, by operation of a thinning processor connected from the segmentor reducing each segment to one or more skeletal images wherein each skeletal image represents one or more strokes of a handwritten characters in the scanned image and wherein each skeletal image includes one or more skeletal image arcs wherein each skeletal image arc is a single pixel wide image representing a corresponding one or more strokes of a handwritten character, by operation of the time order induction processor connected from the thinning processor receiving the skeletal image arcs and generating the ordered cluster arrays by ordering the skeletal image arcs into a spatial sequence representing an induced time ordered sequence of handwritten generation of the skeletal images, and by operation of a transcriber, reading the coordinates of points along the skeletal image arcs and generating the ordered cluster arrays.

10. The method for recognizing handwritten characters of claim 9, wherein the steps of generating the skeletal image arcs further comprises the step of:

joining selected ones of the skeletal image arcs by a ballistic motion emulation of handwritten character generation to generate skeletal image arcs emulating strokes of handwritten characters.

11. The method for recognizing handwritten characters of claim 8, wherein the step of generating the sequential character array further comprises the steps of:

by operation of a stroke feature recognizer, extracting stroke recognition features from the coordinate arrays representing the skeletal image arcs and assigning a meaning to each skeletal image arc of each ordered cluster array, and by operation of a cluster recognizer connected from the stroke feature recognizer in response to the meaning assigned to each skeletal image arc for recognizing, assigning at least one character identification to each ordered cluster array, and by operation of a character array generator, generating a sequential character array containing a character list for each ordered cluster array, each character list containing at least one possible character identification representing a possible interpretation of the corresponding ordered cluster array.

12. The method for recognizing handwritten characters of claim 8 wherein the steps of performing a linguistic analysis and generating on output string further comprised the steps of:

by operation of the linguistics analyzer receiving the character lists, assembling the character lists into character strings, and performing the linguistic analysis on the character strings to determine the most probable correct combinations of characters in each character string, and by operation of the lexical analyzer performing the lexical analysis of each combination of characters to determine the most probable meaning of each character of each character string, and generating the output string representing the most probable interpretation of the handwritten characters of the document.

13. The method for recognizing handwritten characters of claim 11, wherein the step of generating the sequential character array further includes the steps for recognition of real time generated characters, comprising the steps of:

generating handwritten character inputs by means of a tablet and pen and by operation of a real time handwritten character processor connected from the tablet and pen, providing stroke descriptor information representing real time handwritten characters to the stroke feature recognizer.

14. The handwritten character recognition system of claim 13, wherein the step of providing stroke descriptor information further comprises the steps of:

by operation of a pen input detector
  detecting and indicating user inputs through the tablet and pen, the user inputs including pen strokes and pen states, and by operation of an input buffer connected from the pen input detector
  storing stroke descriptor information of a current stroke as the current stroke is entered by the user, wherein
  the stroke feature recognizer is responsive to the pen states for extracting stroke recognition features from the stroke descriptor information of the current stroke and assigning a meaning to the current stroke.

* * * * *